(12) United States Patent
Jang et al.

(10) Patent No.: US 12,288,991 B2
(45) Date of Patent: Apr. 29, 2025

(54) WIRELESS POWER RECEIVING DEVICE, WIRELESS POWER TRANSMITTING DEVICE, AND METHOD FOR OPERATING THE SAME

(71) Applicant: Samsung Electronics Co., Ltd., Gyeonggi-do (KR)

(72) Inventors: Wonkyung Jang, Gyeonggi-do (KR); Kawon Cheon, Gyeonggi-do (KR); Jaeseok Park, Gyeonggi-do (KR); Jaehyun Park, Gyeonggi-do (KR); Joayoung Lee, Gyeonggi-do (KR); Hoon Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 361 days.

(21) Appl. No.: 17/751,105

(22) Filed: May 23, 2022

(65) Prior Publication Data

US 2023/0006470 A1  Jan. 5, 2023

Related U.S. Application Data

(63) Continuation of application No. PCT/KR2022/004592, filed on Mar. 31, 2022.

(30) Foreign Application Priority Data

Jul. 2, 2021  (KR) .......................... 10-2021-0087456

(51) Int. Cl.
*H02J 50/00* (2016.01)
*H02J 7/00* (2006.01)
(Continued)

(52) U.S. Cl.
CPC .......... *H02J 50/005* (2020.01); *H02J 7/0048* (2020.01); *H02J 50/12* (2016.02); *H02J 50/80* (2016.02); *H02J 50/90* (2016.02)

(58) Field of Classification Search
CPC ........ H02J 50/005; H02J 7/0048; H02J 50/12; H02J 50/80; H02J 50/90; H02J 50/70; G06F 1/1616; G06F 3/14
(Continued)

(56) References Cited

U.S. PATENT DOCUMENTS 10,072,947 B1  9/2018  Mantler
2014/0055098 A1  2/2014  Lee
(Continued)

FOREIGN PATENT DOCUMENTS

CN  108233465  6/2018
CN  111864914  * 10/2020
(Continued)

OTHER PUBLICATIONS

International Search Report dated Jul. 14, 2022 issued in counterpart application No. PCT/KR2022/004592, 9 pages.

*Primary Examiner* — Richard Tan
(74) *Attorney, Agent, or Firm* — The Farrell Law Firm, P.C.

(57) ABSTRACT

A wireless power receiving device includes a first housing, a second housing coupled to the first housing to be changed in relative position with respect to the first housing, a first resonance circuit disposed in the first housing, and at least one processor. The at least one processor may be configured to control the wireless power receiving device to wirelessly receive power from a wireless power transmitting device through the first resonance circuit, identify a charging efficiency corresponding to the received wireless power, and in case the identified charging efficiency is less than a threshold, provide content for changing an angle between the first housing and the second housing.

19 Claims, 36 Drawing Sheets

(51) Int. Cl.
*H02J 50/12* (2016.01)
*H02J 50/80* (2016.01)
*H02J 50/90* (2016.01)

(58) Field of Classification Search
USPC .......................................................... 307/104
See application file for complete search history.

(56) References Cited

U.S. PATENT DOCUMENTS

| 2015/0054458 | A1 | 2/2015 | Yoon et al. |
| 2016/0046197 | A1 | 2/2016 | Kim et al. |
| 2016/0336817 | A1* | 11/2016 | Jabori ............... H04M 1/72454 |
| 2017/0098951 | A1 | 4/2017 | Olgun et al. |
| 2020/0329435 | A1 | 10/2020 | Lee et al. |
| 2020/0333836 | A1 | 10/2020 | Kim et al. |
| 2021/0135492 | A1 | 5/2021 | Kim et al. |

FOREIGN PATENT DOCUMENTS

| KR | 1020150021803 | 3/2015 |
| KR | 1020160123437 | 11/2015 |
| KR | 1020160021332 | 2/2016 |
| KR | 1020180005421 | 1/2018 |
| KR | 1020180137773 | 12/2018 |
| KR | 1020190015861 | 2/2019 |
| KR | 1020190075780 | 7/2019 |
| KR | 1020190115888 | 10/2019 |
| KR | 1020200120134 | 10/2020 |
| KR | 1020200122688 | 10/2020 |
| KR | 1020210013852 | 2/2021 |
| KR | 1020210036185 | 4/2021 |

* cited by examiner (a)

(b)

(c)

WIRELESS POWER RECEIVING DEVICE, WIRELESS POWER TRANSMITTING DEVICE, AND METHOD FOR OPERATING THE SAME

CROSS-REFERENCE TO RELATED APPLICATION(S)

This application is a Bypass Continuation Application of International Application No. PCT/KR2022/004592, which was filed on Mar. 31, 2022, and is based on and claims priority under 35 U.S.C. § 119 to Korean Patent Application No. 10-2021-0087456, which was filed in the Korean Intellectual Property Office on Jul. 2, 2021, the entire disclosure of each of which is incorporated herein by reference.

BACKGROUND

1. Field

Various embodiments of the disclosure relate to a wireless power transmitting device, a wireless power receiving device, and a method for operating the same.

2. Related Art

As the demand for mobile communication increases, or as the degree of integration of electronic devices increases, the portability of electronic devices such as mobile communication terminals may be increased, and better convenience may be provided in use of multimedia functions. For example, as touchscreen-integrated displays replace traditional mechanical (button-type) keypads, electronic devices may come more compact while functioning as an input device. For example, as the mechanical keypad may be omitted from the electronic device, portability of the electronic device may be improved. As the display area may be expanded to the area which used to be occupied by the mechanical keypad, the electronic device may provide a larger screen while remaining the same size and weight as when the mechanical keypad was included.

Use of an electronic device with a larger screen may give more convenience in, e.g., web browsing or multimedia playing. A larger display may be adopted to output a larger screen, but providing a larger screen may be limited by the portability of the electronic device. To address this issue, a display using organic light emitting diodes (OLEDs) may secure the portability of the electronic device while providing a larger screen. For example, a display using (or an electronic device equipped with) organic light emitting diodes may implement a stable operation even if it is made quite thin, so that the display may be applied to an electronic device in a foldable, bendable or rollable form.

A wireless power receiving device may include a resonance circuit for wirelessly receiving power. Depending on the angle (or direction) of a magnetic force line formed by a wireless power transmitting device, introduced to the resonance circuit, an eddy current (e.g., induced current based on Faraday's law) formed in the resonance circuit may vary in strength and, accordingly, the charging efficiency may vary as well. There are multiple parameters (e.g., relative distance or relative height) that vary the angle (or direction) of the magnetic force line coming to the resonance circuit and affect the charging efficiency. However, regardless of the plurality of parameters (because the magnetic force line is not visually recognized), a user may place the wireless power receiving device for charging, and thus charging efficiency may be reduced. Further, when changing the state of placement of the wireless power receiving device to adjust a plurality of parameters affecting the charging efficiency to enhance charging efficiency, it is difficult for the user to directly determine the plurality of parameters, thereby making it difficult to properly change the state of placement of the wireless power receiving device. Further, an electronic device implemented in a foldable type or a rollable type may be deformable into various shapes. Accordingly, there may be more parameters (e.g., a folding angle, a folding form, a sliding distance, a sliding form, etc.) affecting the charging efficiency depending on the various shapes. Due to the fact that foldable or rollable electronic devices have more parameters affecting charging efficiency, a user may have even more difficulties in changing the placement state or shape of the wireless power receiving device so as to enhance charging efficiency.

SUMMARY

The disclosure has been made to address at least the above-mentioned problems and/or disadvantages and to provide at least the advantages described below.

According to various embodiments, a wireless power receiving device and a wireless power transmitting device may identify a specific parameter to be changed among a plurality of parameters associated with charging efficiency and provide content for changing the specific parameter, thereby enhancing the charging efficiency of the wireless power receiving device and the convenience of placement of the wireless power receiving device for enhancing charging efficiency. Further, according to various embodiments, a wireless power receiving device and a wireless power transmitting device may provide content for changing a parameter associated with a relative position between the housings of the wireless power receiving device, which is implemented in a foldable or rollable type, thereby further enhancing the convenience of placement of the wireless power receiving device in order to enhance charging efficiency.

According to various embodiments, there may be provided a wireless power receiving device comprising a first housing, a second housing coupled to the first housing to be changed in relative position with respect to the first housing, a first resonance circuit disposed in the first housing, and at least one processor. The at least one processor may be configured to: control the wireless power receiving device to wirelessly receive power from a wireless power transmitting device through the first resonance circuit, identify a charging efficiency corresponding to the received wireless power, and in case the identified charging efficiency is less than a threshold, provide content for changing an angle between the first housing and the second housing.

According to various embodiments, there may be provided a wireless power receiving device comprising a first housing, a second housing coupled to the first housing to be changed in relative position with respect to the first housing, a first resonance circuit disposed in the first housing, and at least one processor. The at least one processor may be configured to: control the wireless power receiving device to wirelessly receive power from a wireless power transmitting device through the first resonance circuit, identify a charging efficiency corresponding to the received wireless power, and in case the identified charging efficiency is less than a threshold, provide content for moving the second housing. The second housing is moved on the first housing.

According to various embodiments, there may be provided a wireless power receiving device comprising a first housing, a second housing coupled to the first housing to be changed in relative position with respect to the first housing, a first resonance circuit disposed in the first housing, and at least one processor. The at least one processor may be configured to: control the wireless power receiving device to wirelessly receive power from a wireless power transmitting device through the first resonance circuit, identify a charging efficiency corresponding to the received wireless power, and in case the identified charging efficiency is less than a threshold, provide content for changing an angle of rotation in one direction of the wireless power receiving device.

According to various embodiments, there may be provided a wireless power transmitting device comprising a communication circuit, at least one resonance circuit, and at least one processor. The at least one processor may be configured to: detect a wireless power receiving device based on periodically applying first power to the at least one resonance circuit, receive information about a type of the wireless power receiving device from the wireless power receiving device through the communication circuit based on detecting the wireless power receiving device, identify that the type of the wireless power receiving device is at least one of a foldable electronic device or a rollable electronic device based on the received information, and transmit, to the wireless power receiving device, a charging function control signal including information triggering to allow the wireless power receiving device to provide content associated with charging efficiency through the communication circuit based on the identification.

Embodiments of the disclosure are not limited to the foregoing objectives, and other objectives would readily be appreciated by a skilled artisan from the following detailed description taken in conjunction with the accompanying drawings.

According to various embodiments, there may be provided a wireless power receiving device and a wireless power transmitting device that may identify a specific parameter to be changed among a plurality of parameters associated with charging efficiency and provide content for changing the specific parameter, thereby enhancing the charging efficiency of the wireless power receiving device and the convenience of placement of the wireless power receiving device for enhancing charging efficiency.

Further, according to various embodiments, there may be provided a wireless power receiving device and a wireless power transmitting device that may provide content for changing a parameter associated with a relative position between the housings of the wireless power receiving device, which is implemented in a foldable or rollable type, thereby further enhancing the convenience of placement of the wireless power receiving device for enhancing charging efficiency.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Hereinafter, various embodiments of the disclosure will be described in detail with reference to the accompanying drawings. In the following description and drawings, the same or like elements may be designated by the same or like reference signs and a detailed description of known functions or configurations that may obscure the subject matter of the disclosure will be omitted.

Figure 1:
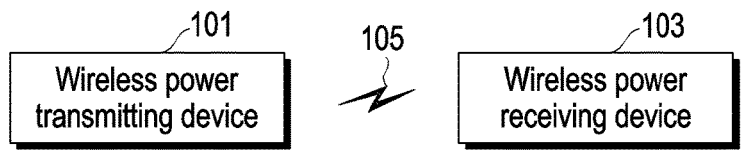
FIG. 1 is a view illustrating a wireless power transmitting device and a wireless power receiving device according to various embodiments.

FIG. 1 is a view illustrating a wireless power transmitting device and a wireless power receiving device according to various embodiments.

According to various embodiments, a wireless power transmitting device 101 may wirelessly transmit power 105, and a wireless power receiving device 103 may wirelessly receive the power 105.

In an embodiment, the wireless power transmitting device 101 and the wireless power receiving device 103 may wirelessly transmit and/or receive power according to a resonance scheme. Adopting the resonance scheme, the wireless power transmitting device 101 may include, e.g., a power source, a DC-AC converting circuit (or an amplifying circuit), an impedance matching circuit, at least one capacitor, at least one coil, and an out-band communication circuit (e.g., a Bluetooth low energy (BLE) communication circuit). The at least one capacitor and the at least one coil may constitute a resonance circuit. The wireless power transmitting device 101 and the wireless power receiving device 103 may be implemented, e.g., in a scheme defined in the alliance for wireless power (A4WP) standards (or air fuel alliance (AFA) standards). The wireless power transmitting device 101 may include a coil that is capable of produce a magnetic field when letting an electric current (e.g., AC current) flow thereacross by a resonance or induction scheme. The process of generating a magnetic field through the coil by the wireless power transmitting device 101 may be expressed as outputting wireless power, and the process of generating induced electromotive force in the wireless power receiving device 103 based on the generated magnetic field may be expressed as wirelessly receiving the power 105. It may be expressed that the wireless power transmitting device 101 wirelessly transmits the power 105 to the wireless power receiving device 103 through such process. Further, the wireless power receiving device 103 may include a coil that produces an induced electromotive force by the magnetic field generated around and varying in magnitude over time. The process of outputting AC current from the coil or applying AC voltage to the coil as the coil of the wireless power receiving device 103 generates induced electromotive force may be expressed as wirelessly receiving the power 105 by the wireless power receiving device 103.

Further, in an embodiment, the wireless power transmitting device 101 and the wireless power receiving device 103 may wirelessly transmit and/or receive power according to an induction scheme. Adopting the induction scheme, the wireless power transmitting device 101 may include, e.g., a power source, a direct current (DC)-alternating current (AC) converting circuit, an amplifying circuit, an impedance matching circuit, at least one capacitor, at least one coil, and a communication modulation/demodulation circuit. The at least one capacitor together with the at least one coil may constitute a resonance circuit. The wireless power transmitting device 101 and the wireless power receiving device 103 may be implemented in a scheme defined in the wireless power consortium (WPC) standards (or Qi standards).

In another embodiment, the wireless power transmitting device 101 and the wireless power receiving device 103 may transmit power according to an electromagnetic wave scheme. Adopting the electromagnetic scheme, the wireless power transmitting device 101 may include, e.g., a power source, a DC-AC converting circuit (or an amplifying circuit), a distributing circuit, a phase shifter, a power transmission antenna array including a plurality of antennas (e.g., patch antennas, dipole antennas, and/or monopole antennas), and an out-band communication circuit (e.g., a BLE communication module). Each of the plurality of antennas may form a radio frequency (RF) wave. The wireless power transmitting device 101 may perform beam-forming by adjusting the phase and/or amplitude of an electrical signal input for each antenna. The wireless power receiving device 103 may include antennas capable of outputting electric current using RF waves generated around. The process of the wireless power transmitting device 101 producing an RF wave may be represented as the wireless power transmitting device 101 wirelessly transmitting the power 105. The processor of outputting current from the antenna using the RF wave by the wireless power receiving device 103 may be expressed as wirelessly receiving the power 105 by the wireless power receiving device 103.

According to various embodiments, the wireless power transmitting device 101 and the wireless power receiving device 103 may communicate with each other.

For example, the wireless power transmitting device 101 may communicate with the wireless power receiving device 103 according to an in-band scheme. The wireless power transmitting device 101 or the wireless power receiving device 103 may vary the load (or impedance) on the data to be transmitted, according to, e.g., an on/off keying modulation scheme. The wireless power transmitting device 101 or the wireless power receiving device 103 may determine data transmitted from its opposite device by measuring a variation in load or impedance based on a variation in the current, voltage, or power across the coil.

For example, the wireless power transmitting device 101 may communicate with the wireless power receiving device 103 as per an out-band scheme. The wireless power transmitting device 101 or the wireless power receiving device 103 may communicate data using a communication circuit (e.g., a BLE communication module) provided separately from the coil or patch antennas. The wireless power transmitting device 101 may also transmit media data and, according to implementation, a plurality of different communication circuits (e.g., a BLE communication module, a Wi-Fi module, a Wi-gig module) each may transmit or receive media data or wireless power transmission/reception signals.

Although not illustrated, the wireless power transmitting device 101 may transmit the power 105 to two or more wireless power receiving devices, and/or perform communication with two or more wireless power receiving devices.

Hereinafter, an example of the resonance circuit 201 included in the wireless power transmitting device 101 is described.

According to various embodiments, the resonance circuit 201 included in the wireless power transmitting device 101 may be implemented as a structure in various shapes. The structure is a logical concept defined for convenience of description, and may represent the appearance of at least one coil (or conductor) constituting the resonance circuit 201 (or included in the resonance circuit 201). The resonance circuit 201 may be described as a coil. For example, a coil disposed in a ring shape may be understood as a ring-shaped structure, and it may be understood that the ring-shaped structure may include a coil. Accordingly, that the resonance circuit 201 is implemented as a structure in various shapes may be interpreted as meaning that the resonance circuit 201 includes a coil disposed and/or implemented in various shapes.

Hereinafter, examples of the structure of the resonance circuit 201 are described.

Figure 2A:
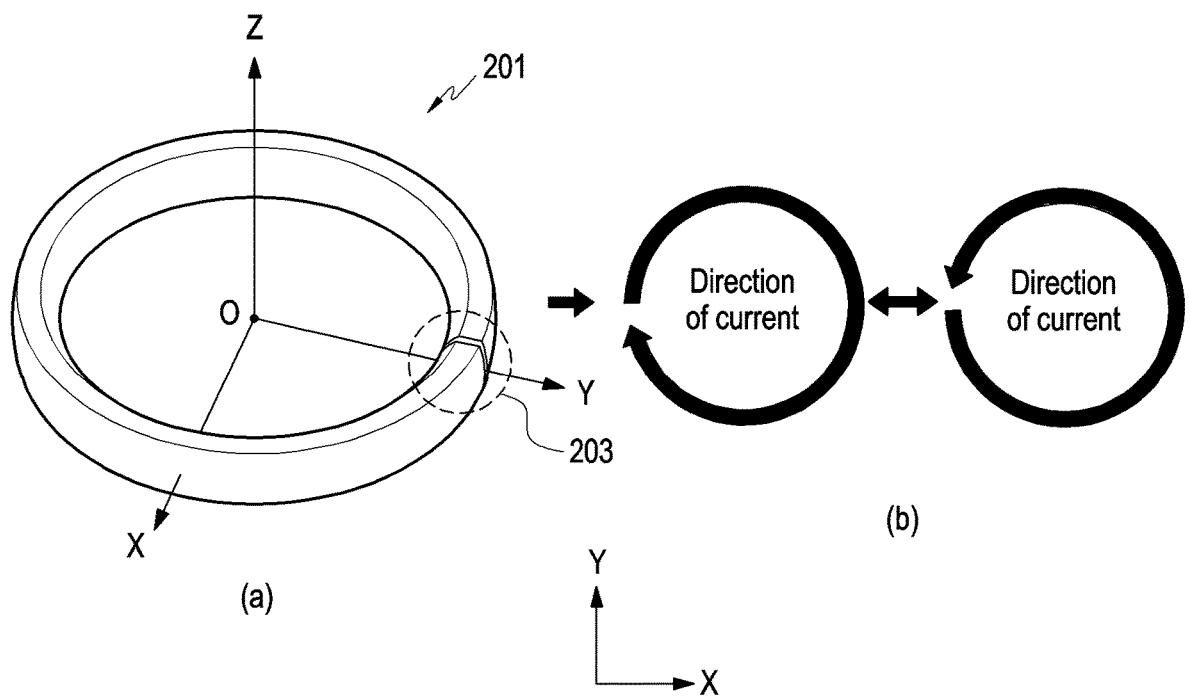
FIG. 2A is a view illustrating an example of a resonance circuit of a wireless power transmitting device according to various embodiments.

FIG. 2A is a view illustrating an example of a resonance circuit 201 of a wireless power transmitting device 101 according to various embodiments.

According to various embodiments, the resonance circuit 201 of the wireless power transmitting device 101 may be implemented as a single structure. For example, referring to (a) of FIG. 2A, the resonance circuit 201 may be implemented as a ring-shaped (annular shaped) structure, and the resonance circuit 201 of the ring-shaped structure may include a coil (or conductor) wound at least one time (once or multiple times). A slit 203 separating the resonance circuit 201 may be formed in at least a portion of the resonance circuit 201, and the slit 203 may function as a capacitor. At least one capacitor may be connected to two opposite ends of the slit 203. At least one component (e.g., the impedance matching circuit and/or the amplifying circuit of FIG. 5B) of the wireless power transmitting device 101 may be connected through two opposite ends of the slit 203.

The resonance circuit 201 may receive current (e.g., AC current) through two opposite ends of the slit 203 and/or receive power (e.g., AC power) from a feeding coil (not illustrated) electromagnetically coupled with the resonance circuit 201 (e.g., current and electromotive force may be induced in the resonance circuit 201 by the magnetic field generated from the feeding coil). Referring to (b) of FIG. 2A, an AC current flows in the resonance circuit 201, e.g., with respect to the XY plane, and at this time, the current alternately flows clockwise or counterclockwise along the coil (or conductor) of the resonance circuit 201 of the ring-shaped structure.

Figure 2B:
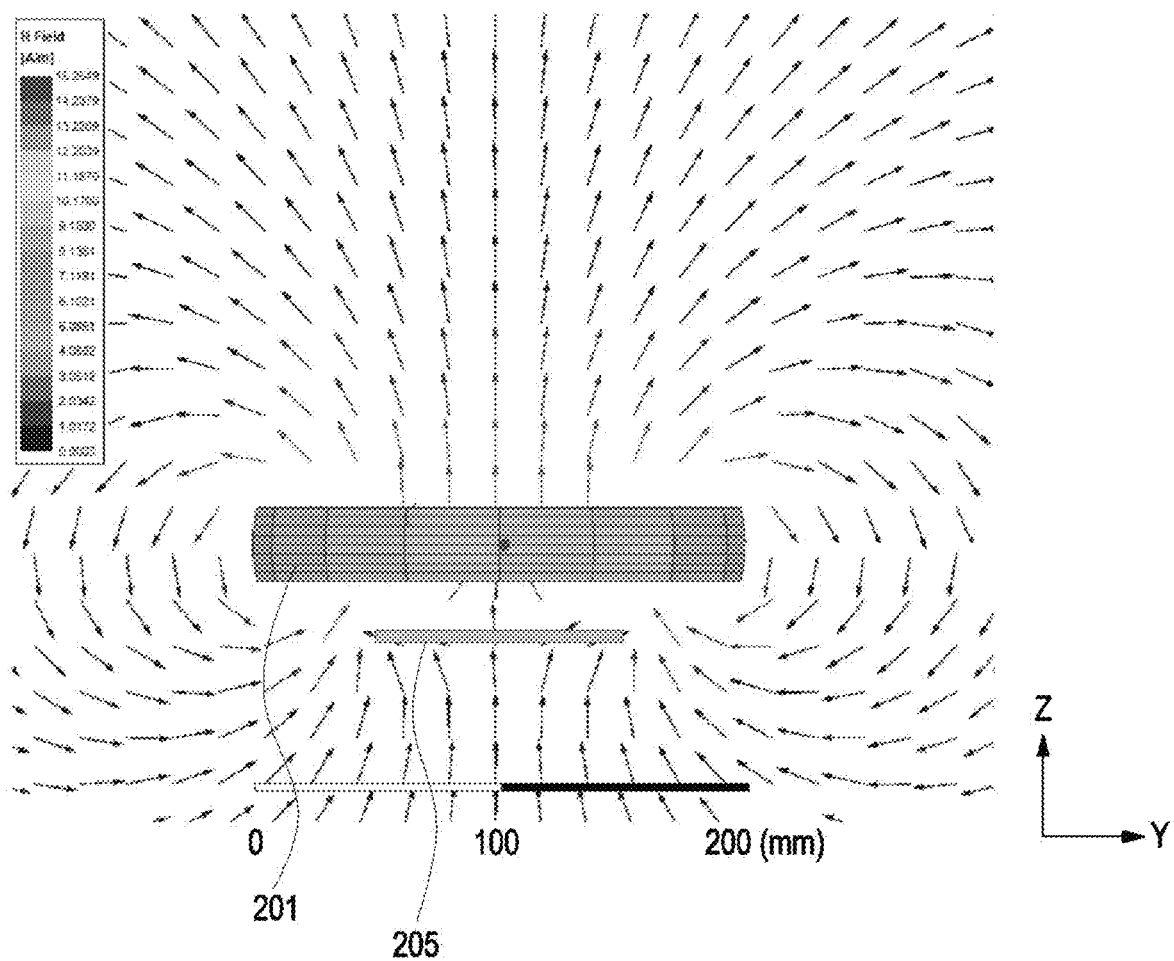
FIG. 2B is a view illustrating an example of a magnetic field formed in a resonance circuit of a wireless power transmitting device according to various embodiments.

FIG. 2B is a view illustrating an example of a magnetic field formed in a resonance circuit 201 of a wireless power transmitting device 101 according to various embodiments.

The arrows illustrated in FIG. 2B denote magnetic force lines of the magnetic field (e.g., H-field) generated from the resonance circuit 201 based on the counterclockwise flow of current in the coil (or conductor) of the resonance circuit 201 of the ring-shaped structure at a specific time point, when the resonance circuit 201 is viewed in one direction (e.g., the +X direction).

Reference number 205 denotes a resonance circuit of the wireless power receiving device 103 positioned around the resonance circuit 201. In FIG. 2B, for convenience of description, it is assumed that the resonance circuit 205 of the wireless power receiving device 103 is positioned under (e.g., under in the −Z direction) the resonance circuit 201 to be parallel to the resonance circuit 201.

As illustrated in FIG. 2B, as at least part of the magnetic field generated from the resonance circuit 201 passes through the resonance circuit 205 (the resonance circuit 401a, 401b, or 401c of FIGS. 4B to 4D described below) of the wireless power receiving device 103, an eddy current (e.g., a current induced based on Faraday's law) may be induced in the resonance circuit 205 of the wireless power receiving device 103. As the eddy current is induced in the resonance circuit 205 of the wireless power receiving device 103, the induced current may be transferred to the matching circuit (not illustrated), rectifier (the rectifier 510b of FIG. 5B described below), charger (the charger 510d of FIG. 5B described below) of the wireless power receiving device 103, with the result that the battery (the battery 511 of FIG. 5B described below) of the wireless power receiving device 103 may be charged.

Figure 3A:
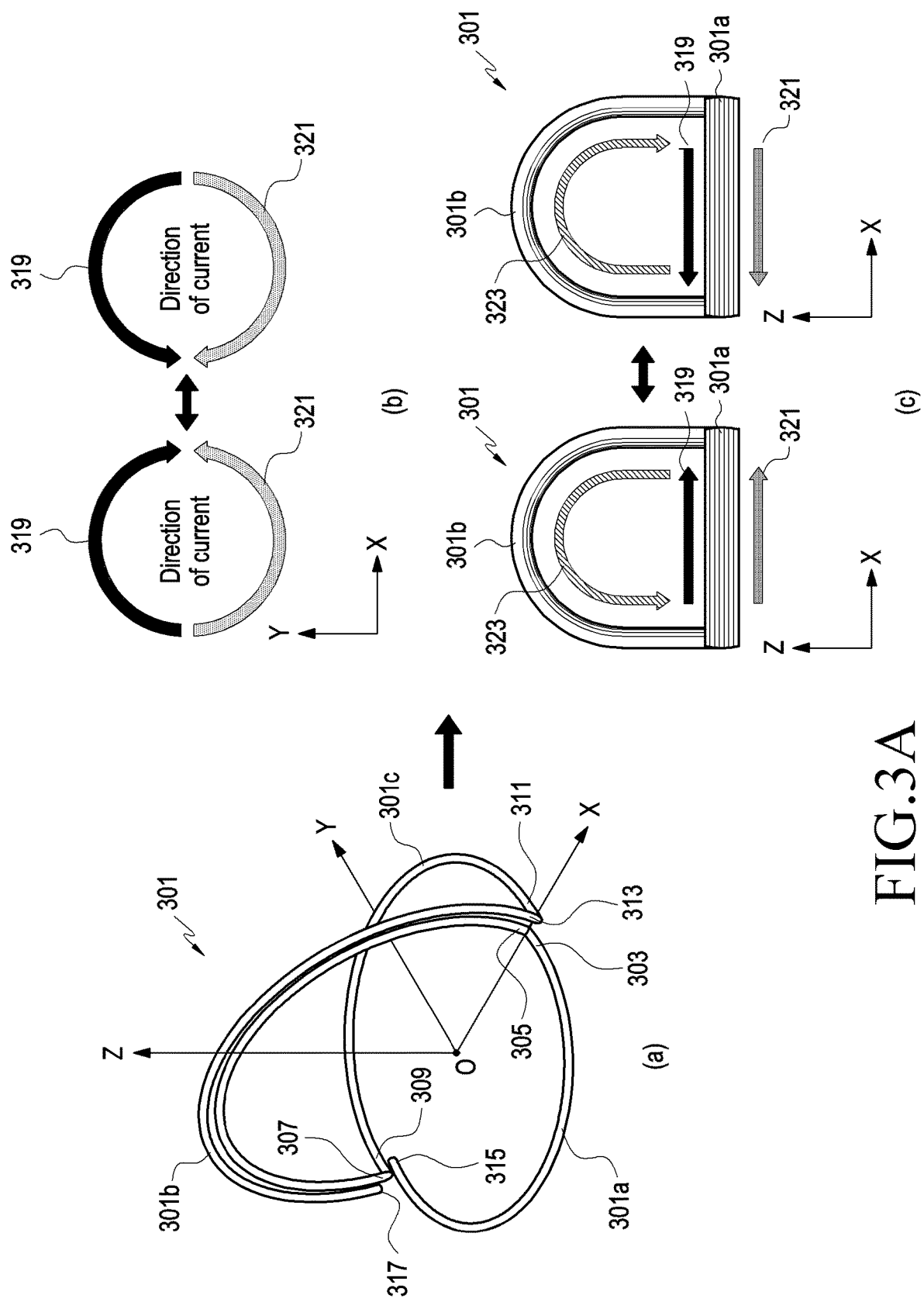
FIG. 3A is a view illustrating another example of a resonance circuit of a wireless power transmitting device according to various embodiments.
Figure 3B:
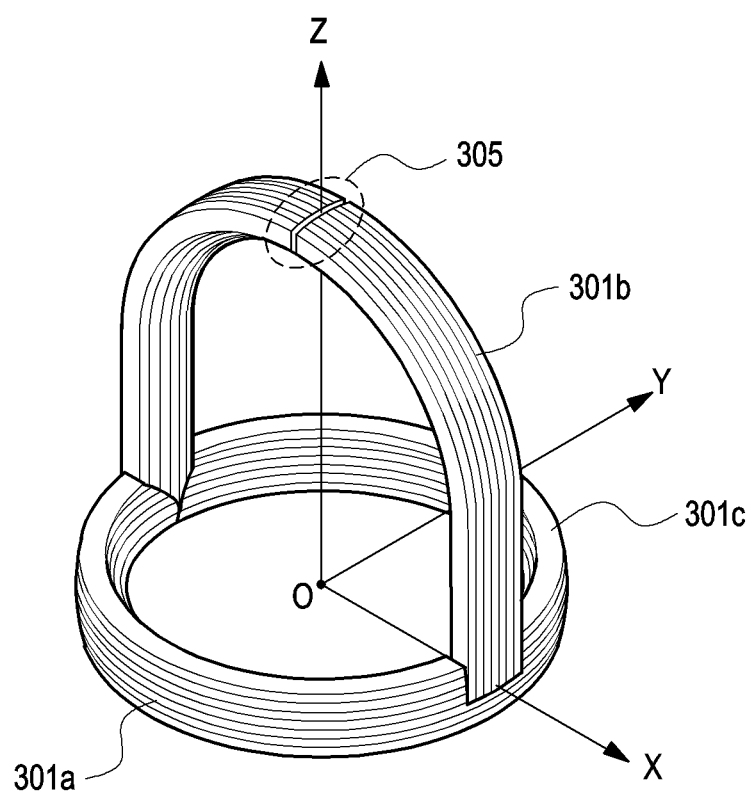
FIG. 3B is a view illustrating another example of a resonance circuit of a wireless power transmitting device according to various embodiments.
Figure 3C:
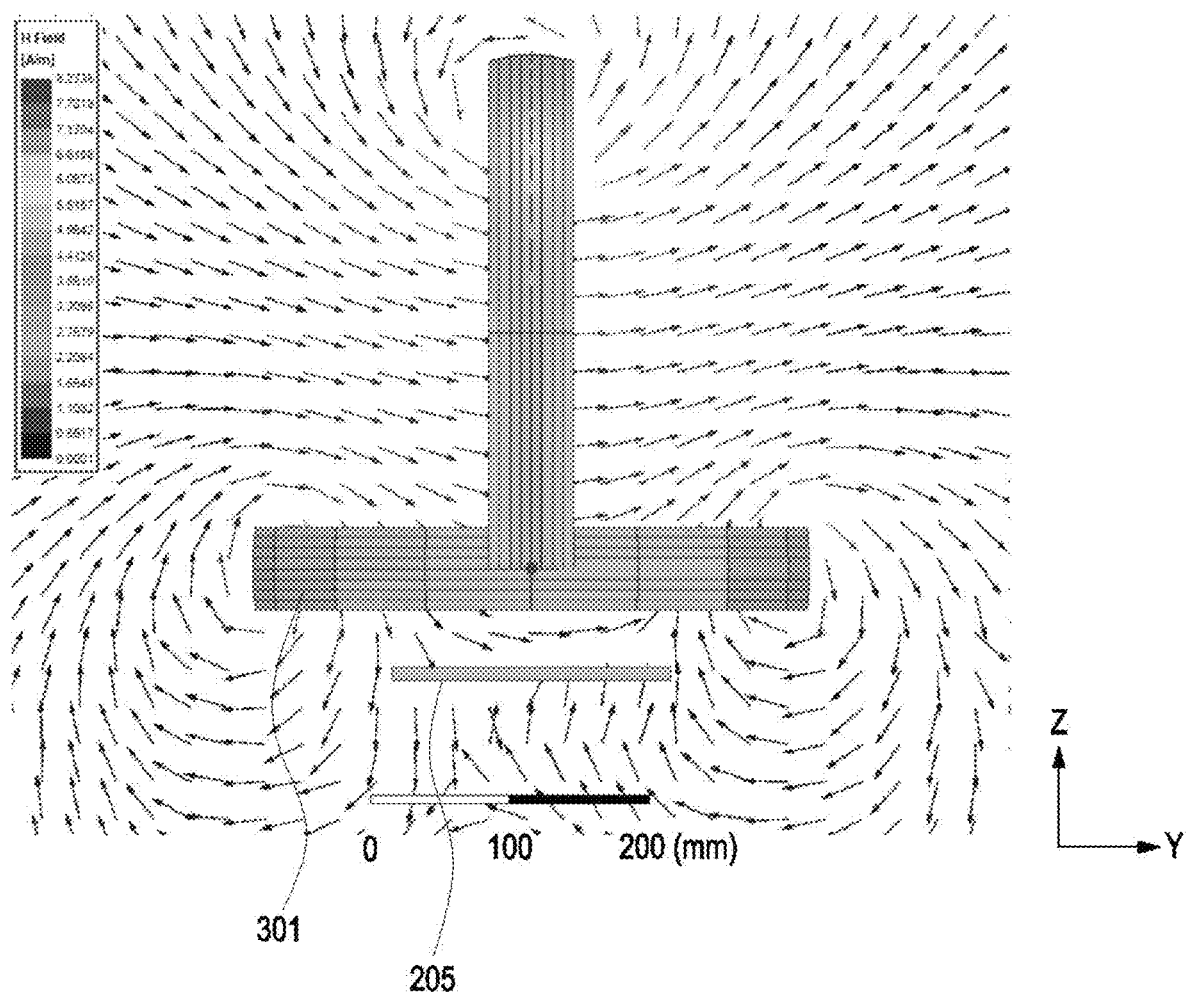
FIG. 3C is a view illustrating an example of a magnetic field generated from at least two or more resonance circuits according to various embodiments.

FIG. 3A is a view illustrating another example of a resonance circuit 301 of a wireless power transmitting device 101 according to various embodiments. FIG. 3B is a view illustrating another example of a resonance circuit 301 of a wireless power transmitting device 101 according to various embodiments. FIG. 3C is a view illustrating an example of a magnetic field generated from at least two or more resonance circuits 301 according to various embodiments. Although the magnetic field of FIG. 3C is the magnetic field of the resonance circuit (e.g., a resonance circuit having a coil wound multiple times) of FIG. 3B, it may also be described as the magnetic field of the resonance circuit of FIG. 3A.

According to various embodiments, the resonance circuit 301 may be implemented with at least two or more structures. For example, referring to FIGS. 3A and 3B, the resonance circuit 301 may be implemented with a first structure at least a portion of which is disposed on the XY plane and a second structure at least a portion of which is disposed on the ZX plane. Each of the structures (e.g., the first structure and the second structure) may include a coil (or conductor) wound at least one time (e.g., once or multiple times as illustrated in FIG. 3B). Hereinafter, for convenience of description, a portion of the coil included in the resonance circuit 301, which corresponds to the −Y direction, is described as a first conductor 301a, a portion thereof, which corresponds to the +Z direction, is described as a second conductor 301b, and a portion thereof, which corresponds to the +Y direction, is described as a third conductor 301c. As described above, when wound a plurality of times as illustrated in FIG. 3B, the first to third conductors 301a, 301b, and 301c may be a plurality of first to third conductors. Meanwhile, without being limited to what is illustrated and/or described, the resonance circuit 301 may be implemented with structures arranged on different planes or may be implemented with three or more structures.

According to various embodiments, the first conductor 301a and/or the third conductor 301c may be formed to be horizontal to the XY plane, as illustrated in FIG. 3A. According to an embodiment, the first conductor 301a and/or the third conductor 301c may be formed not to be parallel to the XY plane. For example, the first conductor 301a and the third conductor 301c may be formed to form a predetermined angle therebetween. In this case, the first conductor 301a and/or the third conductor 301c may be formed in a shape of being spaced apart by a predetermined distance from the center O of the inside of the first conductor 301a and the third conductor 301c as illustrated in (a) of FIG. 3A. For example, the first conductor 301a and/or the third conductor 301c may be formed in a semicircular shape having a designated curvature. As another example, the first conductor 301a and/or the third conductor 301c may be formed in a rectangular shape or other various shapes.

According to various embodiments, the second conductor 301b may be formed to be parallel to the ZX plane (e.g., to be perpendicular to the first conductor 301a and/or the third conductor 301c) as illustrated in (a) of FIG. 3A. According to an embodiment, the second conductor 301b may be formed not to be parallel to the ZX plane. For example, the second conductor 301b may be formed to form a predetermined angle with respect to a direction (e.g., ZX plane) perpendicular to the first conductor 301a and/or the third conductor 301c. The second conductor 301b may be formed in a shape of being spaced apart from the center O by a predetermined distance, as illustrated in FIG. 3A. For example, the second conductor 301b may be formed in a semicircular shape having a designated curvature. As another example, the second conductor 301b may be formed in an arch shape. As another example, the second conductor 301b may be formed in a rectangular shape or other various shapes.

According to various embodiments, a slit 305 (or a segmenter) serving as a capacitor may be formed in a portion of the second conductor 301b. For example, referring to FIG. 3B, the slit 305 may be formed in the upper portion of the second conductor (e.g., the outer portion in the +Z direction), or may be formed in a side portion (e.g., the outer portion in the +X direction or the −X direction). The slit 305 may be formed in a side portion without being limited thereto. Based on formation of the slit 305 in the coil (e.g., the second conductor 301b), the coil (e.g., the first conductor to third conductor 301a, 301b, and 301c) may be used as a resonance circuit 301 (namely, a resonator) including a capacitor and an inductor. For example, components (e.g., an impedance matching circuit, at least one capacitor) of the wireless power transmitting device 101 may be connected to two opposite ends of the slit 305. The wireless power transmitting device 101 may amplify the power to be transmitted through the amplifying circuit and then provide the amplified power through an impedance matching circuit (not illustrated) to the coil (e.g., the resonance circuit 301) including the slit 305. Accordingly, a magnetic field may be generated from the coil (e.g., the resonance circuit 301) including the slit 305 based on the supplied current, and thereby, power (e.g., the power 105 of FIG. 1) may be wirelessly transmitted to the wireless power receiving device 103 (e.g., wireless power receiving device 103 of FIG. 1).

According to various embodiments, the strength of the magnetic field formed in the XZ plane may be larger than the strength of the magnetic field formed in the XY plane based on the AC current received through the slit 305. For example, referring to (b) of FIG. 3A, the directions of the AC current applied through the slit 305 at each time point may be opposite to each other with respect to the XY plane in the first conductor 301a and the third conductor 301c. The direction of the current 321 flowing in the first conductor 301a and the direction of the current 319 flowing in the third conductor 301c may be opposite to each other at each time point. As an example, with respect to the XY plane, AC current may flow clockwise in the first conductor 301a and counterclockwise in the second conductor 301b and, alternately, may flow counterclockwise in the first conductor 301a and clockwise in the second conductor 301b. Due to this, the magnetic field (hereinafter, a first magnetic field) generated from the first conductor 301a and the magnetic field generated from the third conductor 301c may be generated in opposite directions with respect to the inside (e.g., center O) and be thus canceled off. Thus, referring to FIG. 3C, the strength of the magnetic field formed in the Z-axis direction (+Z-axis direction or −Z-axis direction) with respect to the inside (e.g., center O) of the resonance circuit 301 may be low (or no magnetic field may be formed). As another example, referring to (b) of FIG. 3A, the direction of the AC current applied through the slit 305 at each time point may correspond (or be identical) for all the conductors (e.g., the first to third conductors 301a, 301b, and 301c) with respect to the XZ plane. As an example, with respect to the XZ plane, AC current may flow counterclockwise in the first to third conductors 301a, 301b, and 301c and, alternately, flow counterclockwise in the first to third conductors 301a to the third conductor. As described above, AC current may flow in opposite directions in the first conductor 301a and the third conductor 301c at a time point with respect to the XY plane. However, referring to (c) of FIG. 3A, AC current may flow in directions corresponding to each other (or identical to each other) (e.g., +X direction or −X direction) in the first conductor 301a and the third conductor 301c with respect to the XZ plane at a time point. For example, the directions of the current 321 flowing through the first conductor 301a, the current 319 flowing through the third conductor 301c, and the current 323 flowing through the second conductor 301b may be the same at each time point. As an example, current flows in the second conductor 301b in the direction (e.g., counterclockwise or clockwise) corresponding to the direction (e.g., +X direction or −X direction) of the AC current flowing in the first conductor 301a and the third conductor 301c, with respect to the XZ plane and may resultantly correspond (or identical) for all of the conductors (e.g., the first to third conductors 301a, 301b, and 301c) with respect to the XZ plane. Thus, referring to FIG. 3C, a magnetic field may be formed in the Y-axis direction (e.g., +Y-axis direction or −Y-axis direction) with respect to the inside (e.g., center O) of the resonance circuit 301.

According to various embodiments, referring to FIG. 3C, an eddy current (e.g., a current inducted based on Faraday's law) may be inducted in the resonance circuit 301 of the wireless power receiving device 103 by the magnetic field formed in the resonance circuit 301. As a result, the battery (the battery 511 of FIG. 5B described below) of the wireless power receiving device 103 may be charged based on the inducted current.

According to various embodiments, the wireless power transmitting device 101 may include a housing (not illustrated) including the resonance circuits (e.g., the resonance circuit 201 described in connection with FIG. 2 and the resonance circuit 301 described in connection with FIG. 3A).

Hereinafter, a type of the wireless power receiving device 103 and an example of a resonance circuit included in the wireless power receiving device 103 are described.

Figure 4A:
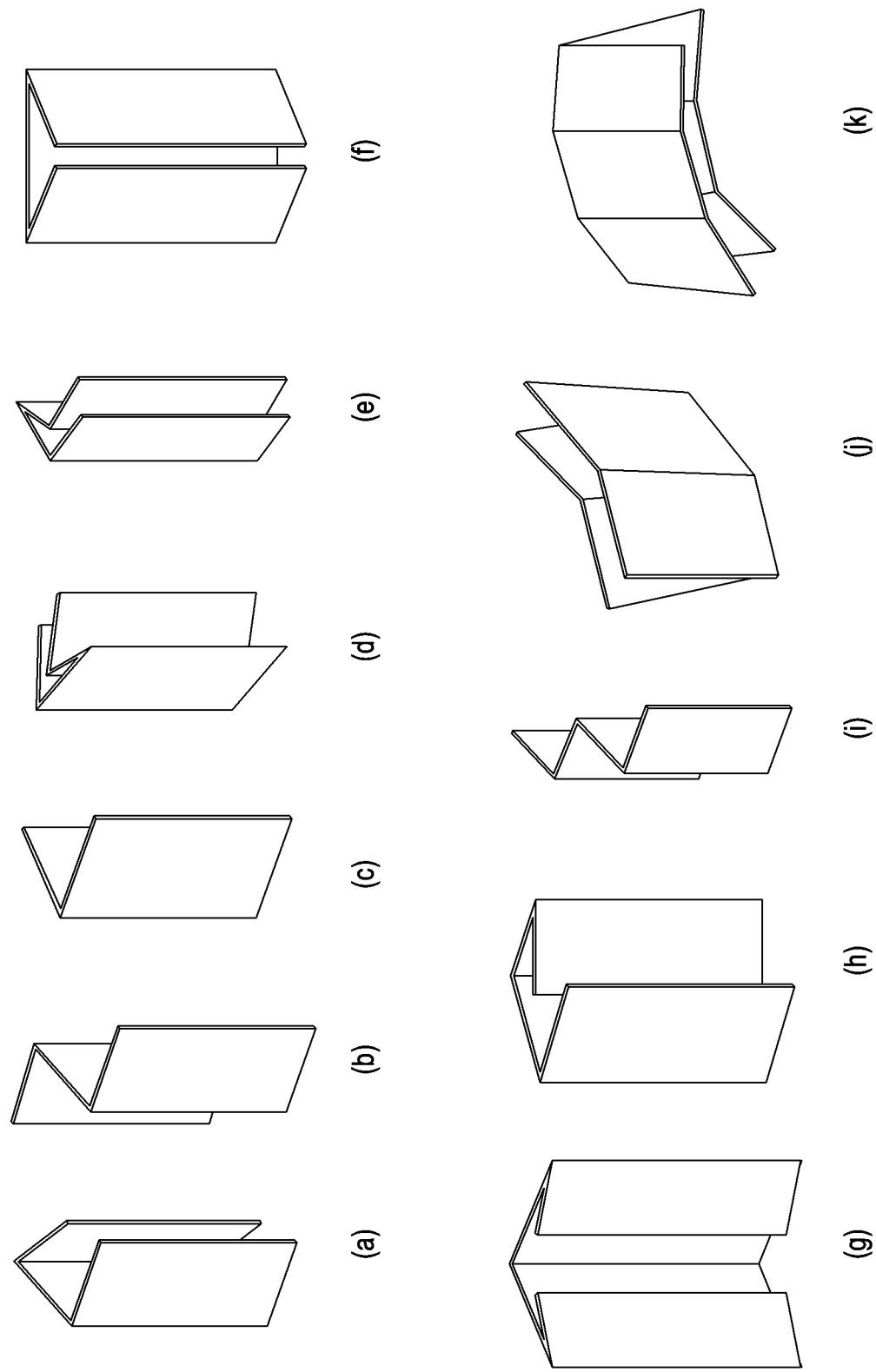
FIG. 4A is a view illustrating an example of a wireless power receiving device according to various embodiments.
Figure 4B:
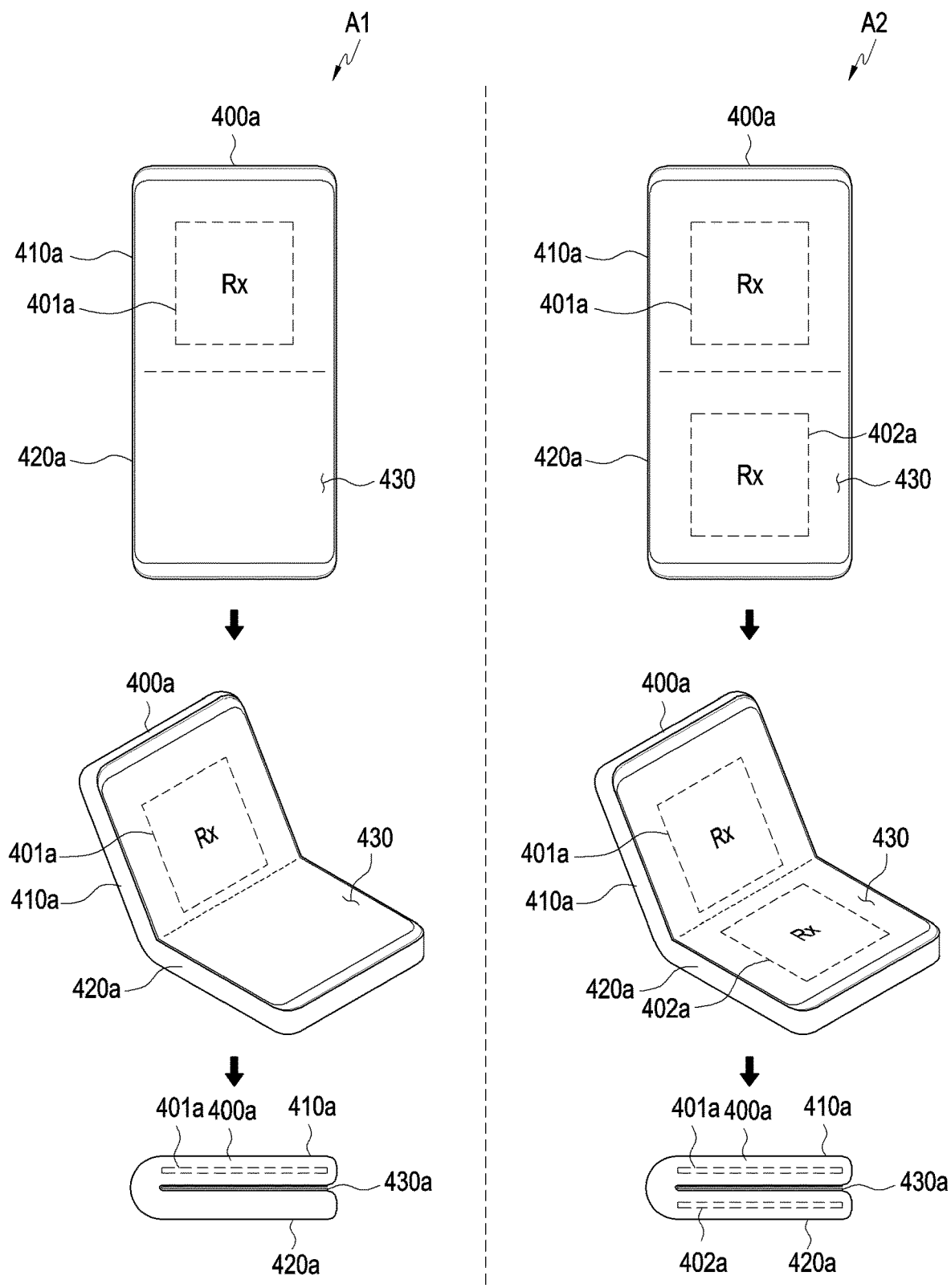
FIG. 4B is a view illustrating an example of a resonance circuit of a wireless power receiving device implemented in a half fold type according to various embodiments.
Figure 4C:
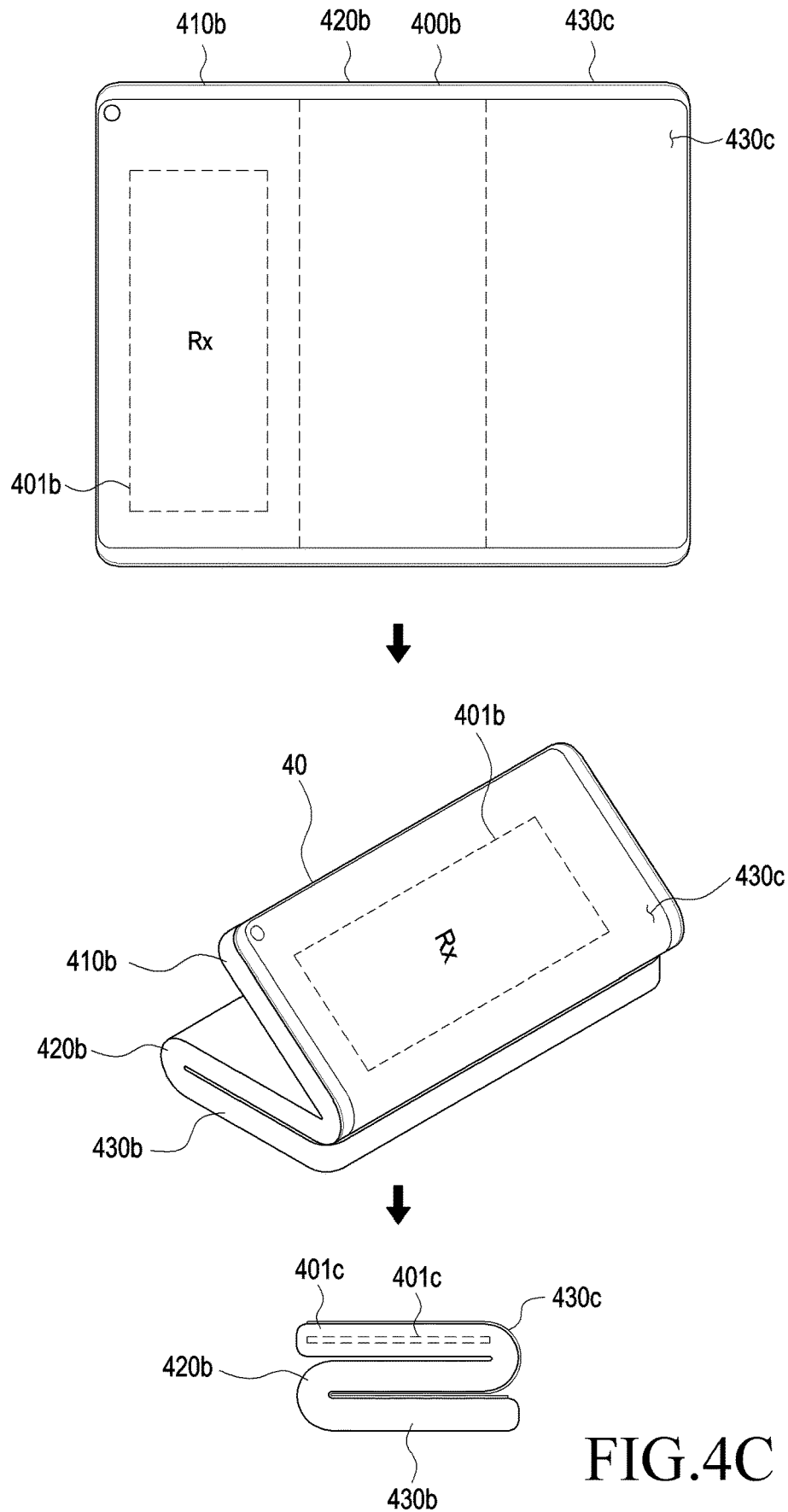
FIG. 4C is a view illustrating an example of a resonance circuit of a wireless power receiving device implemented in a tri fold type according to various embodiments.
Figure 4D:
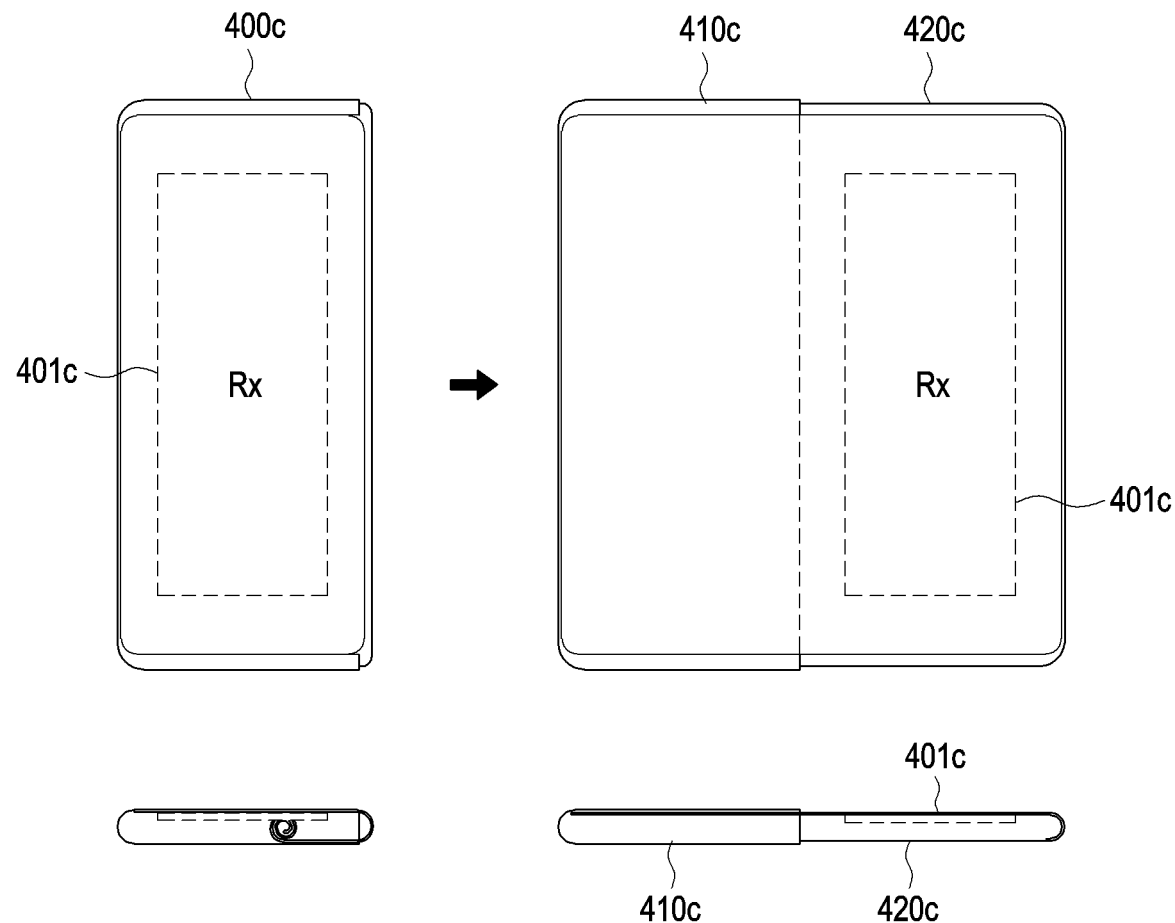
FIG. 4D is a view illustrating an example of a resonance circuit of a wireless power receiving device, which is a rollable electronic device, according to various embodiments.

FIG. 4A is a view illustrating an example of a wireless power receiving device 103 according to various embodiments. FIG. 4B is a view illustrating an example of a resonance circuit of a wireless power receiving device 103 implemented in a half fold type according to various embodiments. FIG. 4C is a view illustrating an example of a resonance circuit of a wireless power receiving device 103 implemented in a tri fold type according to various embodiments. FIG. 4D is a view illustrating an example of a resonance circuit of a wireless power receiving device 103, which is a rollable electronic device, according to various embodiments.

According to various embodiments, the wireless power receiving device 103 may be implemented to include at least two or more housings disposed so that their relative positions are changeable. The wireless power receiving device 103 with the at least two or more housings arranged so that the relative positions are changeable may be implemented as a foldable electronic device or a rollable electronic device. Hereinafter, examples of a foldable electronic device and a rollable device are described.

Hereinafter, an example of a foldable electronic device is described first.

According to various embodiments, referring to FIG. 4A, the wireless power receiving device 103 may be a foldable electronic device implemented such that an angle (e.g., a folding angle) between at least two housings may be changed. The foldable electronic device may include at least two or more housings, a hinge structure rotatably connecting the at least two or more housings, and devices (e.g., the display 403 and resonance circuit) disposed in association with the at least two or more housings (e.g., disposed outside or inside) and, without being limited thereto, include more devices (e.g., the components of the wireless power receiving device 103 of FIG. 5A or the components of the electronic device 2201 of FIG. 22). At least some of the housings connected to the hinge structure (not illustrated) may be rotated about the hinge structure (not illustrated). Based on the rotation, the angle between the housings is changed, so that the relative positions between the housings may be changed. The forms (or form factors) of the foldable electronic device may include a form in which two housings are rotatably connected in the electronic device (half fold form ((c) of FIG. 4A)), a form in which three housings are rotatably connected (e.g., tri fold form ((a) of FIG. 4A), Z fold form ((b) of FIG. 4A), or single open gate fold form ((f) of FIG. 4A)), a form in which four housings are rotatably connected (e.g., double parallel reverse fold form ((d) of FIG. 4A), double parallel fold form ((f) of FIG. 4A), double gate fold form ((g) of FIG. 4A), roll fold form ((h) of FIG. 4A), accordion fold form ((i) of FIG. 4A), or half fold then half fold form ((j) of FIG. 4A)), and a form in which a larger number of housings are rotatably connected (e.g., half fold then tri fold form ((k) of FIG. 4A)). Meanwhile, although the electronic devices have been described as having a single flexible display 403 disposed on a plurality of housings, a display may be disposed on each of the plurality of housings.

According to various embodiments, the foldable electronic device may include a resonance circuit in at least some of the plurality of housings which are changed in relative position therebetween. For example, referring to the foldable electronic device 400a illustrated in A1 of FIG. 4B, the foldable electronic device 400a, which is implemented in a form in which two housings 410a and 420a are rotatably connected (e.g., a half fold form), may include a resonance circuit 401a inside one housing (e.g., the first housing 410a). Alternatively, referring to the foldable electronic device 400a illustrated in A2 of FIG. 4B, the foldable electronic device 400a may further include resonance circuits 401a and 402a in the other housing (e.g., the second housing 420a) as well as the one housing (e.g., the first housing 410a). Hereinafter, for convenience of description, examples in which a resonance circuit are included in one housing is described. However, unless otherwise mentioned, without being limited to those illustrated and/or described, a resonance circuit may be included in the other housing as well as the one housing. As another example, referring to FIG. 4C, the foldable electronic device 400b implemented in a form in which three housings 410b, 420b, and 430b are rotatably connected (e.g., a Z fold form) may include a resonance circuit 401b in one housing (e.g., the first housing 410b). However, without being limited to those illustrated, the foldable electronic device 400b may further include a resonance circuit (not illustrated) in the other housings (e.g., the second housing 420b and the third housing 430b). Accordingly, as the angle between the housings (e.g., the housings 410a and 420a of FIG. 4B, or the housings 410b to 430b of FIG. 4C) is changed, at least one resonance circuit 401a or 401b included in the housings (e.g., the housings 410a and 420a of FIG. 4B or the housings 410b to 430b of FIG. 4C) may also be repositioned. Thus, the relative position (e.g., distance, height, or angle) of the at least one resonance circuit 401a or 401b of the foldable electronic device 400a or 400b for the wireless power transmitting device 101 may vary depending on the angle formed between the housings (e.g., the housings 410a and 420a of FIG. 4B or the housings 410b to 430b of FIG. 4C), and the strength of the induced current formed in at least one resonance circuit 401a or 401b of the foldable electronic device 400a or 400b and/or the charging efficiency according to the induced current also may vary. For example, the relative position between the housings (e.g., the housings 410a and 420a of FIG. 4B or the housings 410b to 430b of FIG. 4C) of the foldable electronic device 400a or 400b may influence the attributes associated with charging efficiency, which is described below with reference to FIGS. 6A and 6B, as an example.

Hereinafter, an example of a rollable electronic device according to various embodiments is described.

According to various embodiments, the wireless power receiving device 103 may be a rollable electronic device implemented so that at least one housing is drawn in or out in at least one direction with respect to the other housing. The rollable electronic device may include at least one roller (not illustrated) provided in a portion corresponding to at least one direction and at least one first housing which may reciprocate (or slide) as the at least one roller rolls and in which a portion of a flexible display is disposed and a second housing, which guides (or supports) reciprocation of the at least one first housing and may include devices (e.g., a display and a resonance circuit) disposed in association with (e.g., disposed outside or inside) the plurality of housings (e.g., at least one first housing and second housing) and, without being limited to those described, be implemented to further include more devices (e.g., the components of the wireless power receiving device 103 of FIG. 5A or the components of the electronic device 2201 of FIG. 22). The at least one first housing may reciprocate on the second housing so that the other portion of the flexible display received in the rollable electronic device may be exposed to the outside. The rotation of the roller (not illustrated) may be performed by a power device (e.g., a motor) but, without being limited to those described, may be performed by an external force (e.g., the user's pulling force). Or, without being limited to those described, the roller (not illustrated) may be excluded. Alternatively, the at least one first housing may be moved by an external force in one direction by a structure (e.g., a hinge device implemented of a shape memory alloy) provided instead of the power device. As illustrated in FIG. 4D, based on a slide of the at least one first housing 420c on the second housing 410c, the relative position in one direction between the housings 410c and 420c may be changed. Meanwhile, without being limited to those illustrated in FIG. 4D, the first housing 420c may be implemented to move in a plurality of directions so that the rollable electronic device 400c may be implemented to allow the portion receiving the flexible display to be withdrawn out in a plurality of directions.

According to various embodiments, the rollable electronic device 400c may include a resonance circuit 401c in at least some of the plurality of housings which are changed in relative position therebetween. For example, referring to FIG. 4D, the rollable electronic device 400c may include a resonance circuit 401c inside one housing (e.g., the first housing 420c). However, without being limited to those illustrated, the rollable electronic device 400c may further include a resonance circuit 401 in the other housing (e.g., the second housing 410c). Accordingly, as the first housing 420c slides, the position of the resonance circuit 401c included in the first housing 420c may also be changed. Accordingly, the relative position (e.g., distance, height, and angle) of the resonance circuit 401c of the rollable electronic device 400c with respect to the wireless power transmitting device 101 may vary, and the strength of the induced current formed in the resonance circuit 401c and/or charging efficiency may also be changed. Alternatively, in a case where a resonance circuit (not illustrated) is included in the other housing (e.g., the second housing 410c) that does not slide, the strength of the current inducted in the resonance circuit 401 provided in the other housing (e.g., the second housing 410c) may vary depending on whether the one housing (e.g., the first housing 420c) slides. As an example, as the one housing (e.g., the first housing 420c) slides, the magnetic field in the resonance circuit of the other housing (e.g., the second housing 410c) which is hidden by the resonance circuit 401c of the one housing (e.g., the first housing 420c) may induce more current.

Hereinafter, examples of the wireless power receiving device 103 and the wireless power transmitting device 101 according to various embodiments are described.

Figure 5A:
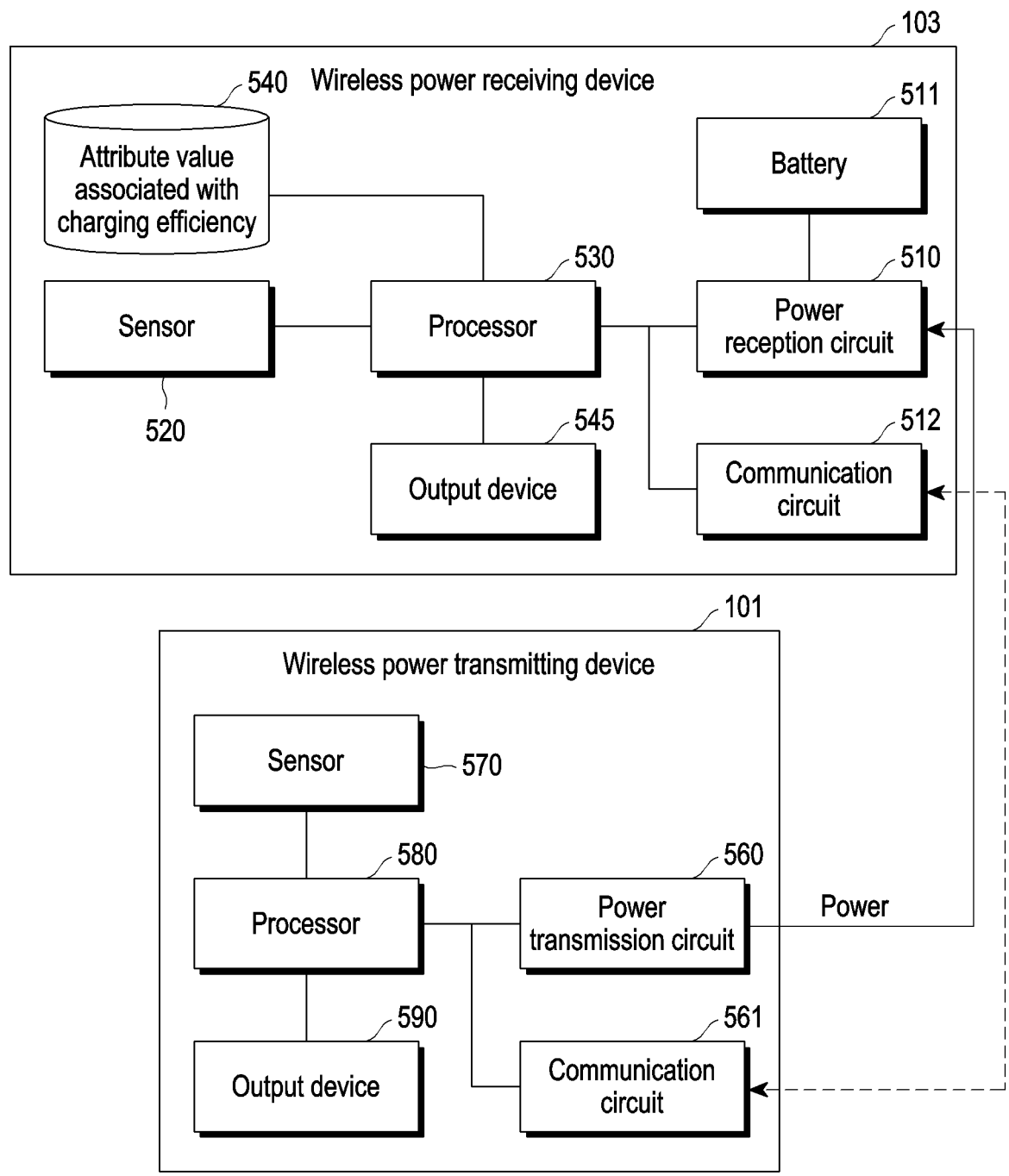
FIG. 5A is a view illustrating an example of a configuration of a wireless power receiving device and a wireless power transmitting device according to various embodiments.
Figure 5B:
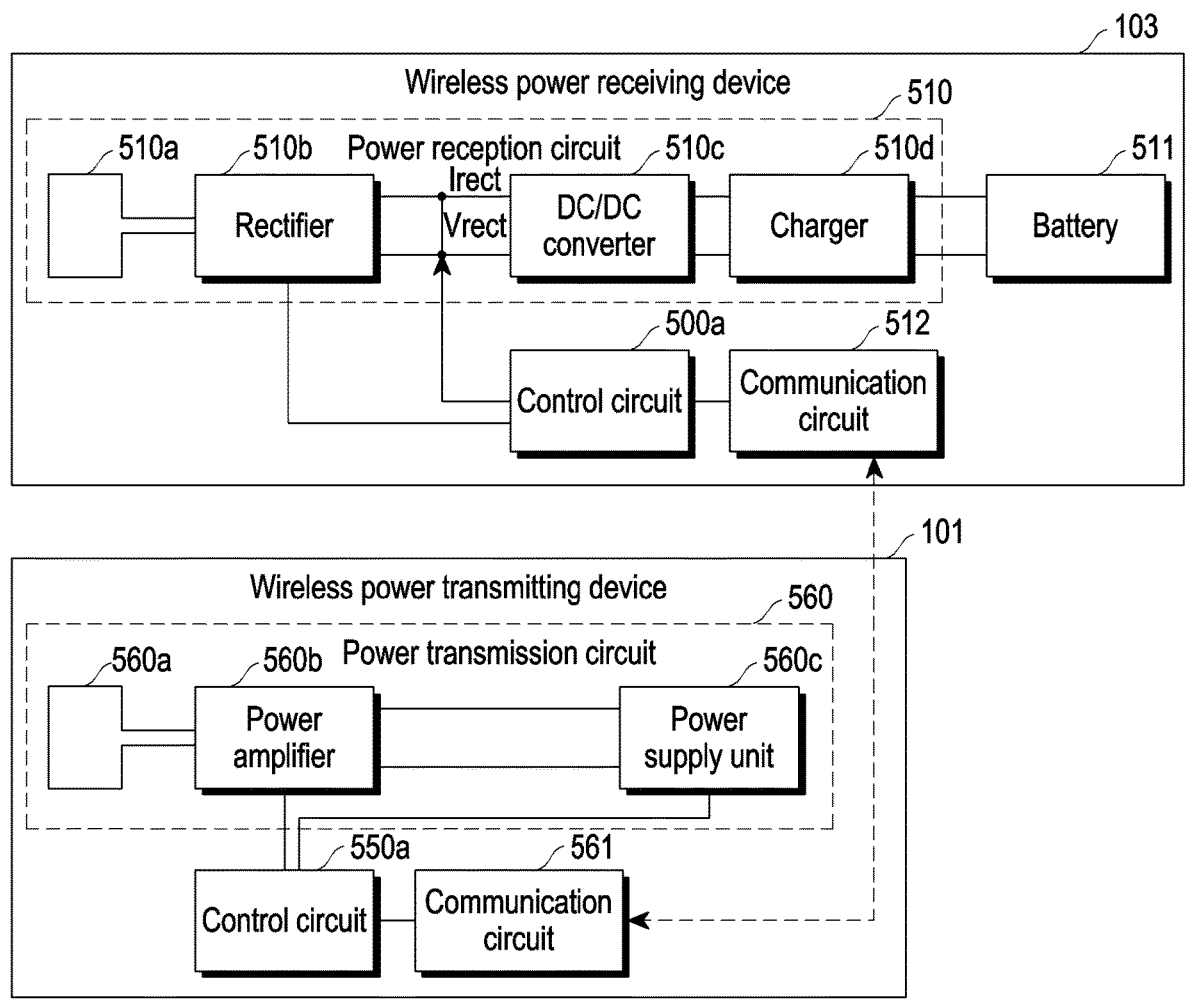
FIG. 5B is a view illustrating an example of a power reception circuit of a wireless power receiving device and a power transmission circuit of a wireless power transmitting device according to various embodiments.

FIG. 5A is a view illustrating an example of a configuration of a wireless power receiving device 103 and a wireless power transmitting device 101 according to various embodiments. FIG. 5B is a view illustrating an example of a power reception circuit 510 of a wireless power receiving device 103 and a power transmission circuit of a wireless power transmitting device 101 according to various embodiments.

Figure 6A:
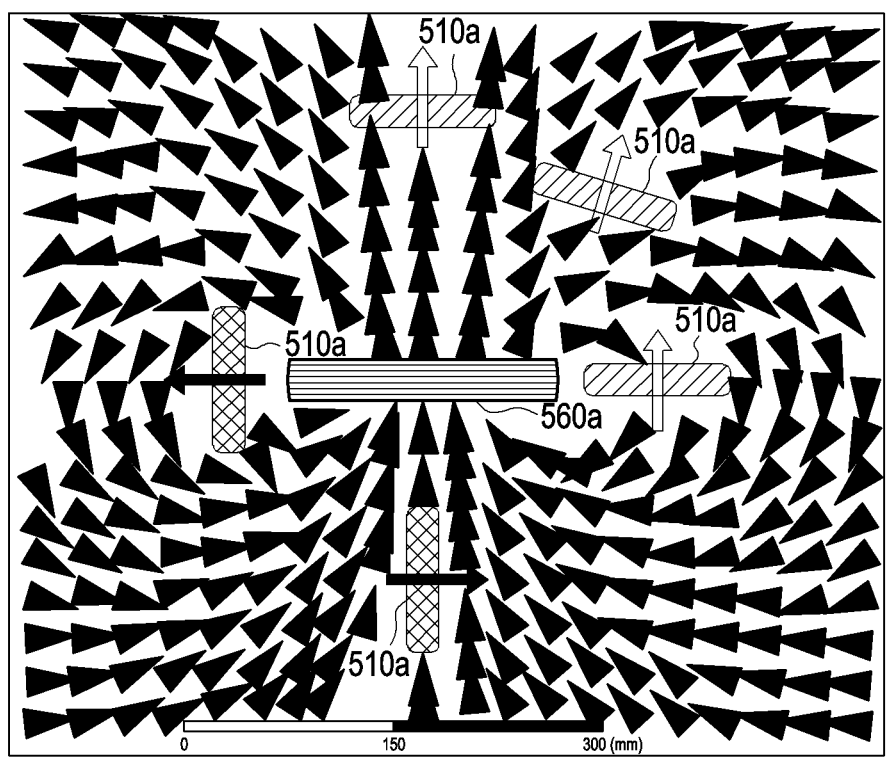
FIG. 6A is a view illustrating an example of a magnetic field formed in a resonance circuit of a wireless power transmitting device and a position of a resonance circuit of a wireless power receiving device according to various embodiments.
Figure 6B:
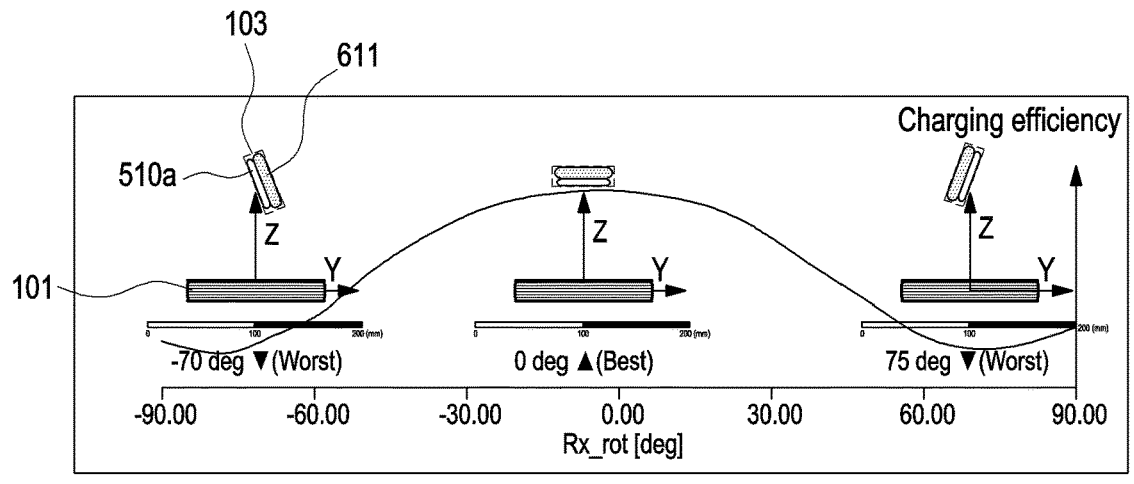
FIG. 6B is a graph illustrating the charging efficiency depending on the angle per position of a wireless power receiving device according to various embodiments.
Figure 6B:
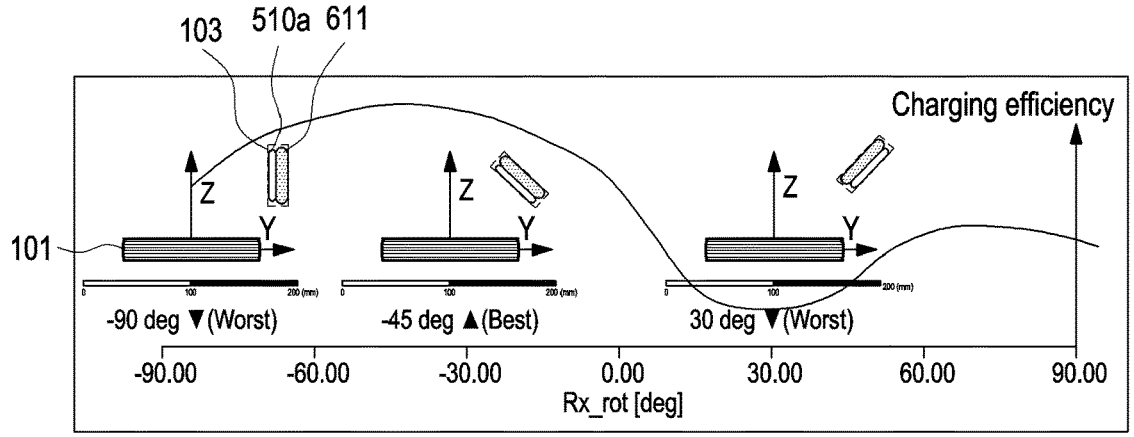
Figure 6B:
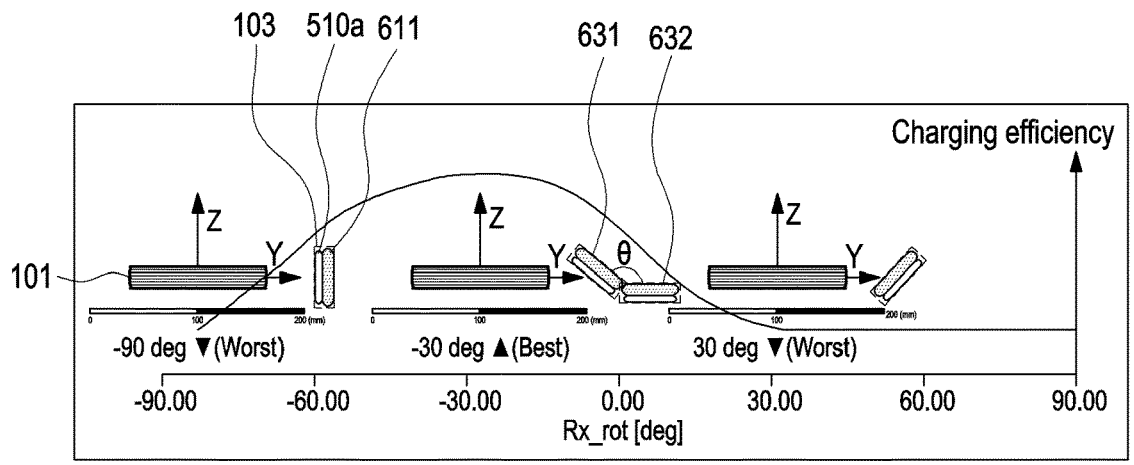

FIG. 6A is a view illustrating an example of a magnetic field formed in a resonance circuit 560a of a wireless power transmitting device 101 and a position of a resonance circuit 510a of a wireless power receiving device 103 according to various embodiments. FIG. 6B is a graph illustrating the charging efficiency depending on the angle per position of a wireless power receiving device 103 according to various embodiments.

According to various embodiments, referring to FIG. 5A, a wireless power receiving device 103 may include a power reception circuit 510, a battery 511, a communication circuit 512, a sensor 520, an output device 545, a memory 540 and a processor 530. The wireless power transmitting device 101 may include a power transmission circuit 560, a communication circuit 561, a sensor 570, an output device 590, and a processor 580. However, without being limited to those illustrated and/or described, the wireless power receiving device 103 and the wireless power transmitting device 101 may be implemented to include more or less components. For example, the wireless power receiving device 103 and the wireless power transmitting device 101 may be implemented to include at least some of the components of the electronic device 2201 described in FIG. 22.

Hereinafter, an example of a configuration of the wireless power receiving device 103 according to various embodiments is described.

Hereinafter, an example of the wireless power reception circuit 510 according to various embodiments is described.

According to various embodiments, the wireless power reception circuit 510 may be implemented to wirelessly receive power from the wireless power transmitting device 101. For example, referring to FIG. 5B, the wireless power reception circuit 510 may include a resonance circuit 510a, a rectifier 510b, a DC/DC converter 510c, and a charger 510d. Meanwhile, without being limited to those illustrated and/or described, the wireless power receiving device 103 may further include more components (e.g., an impedance matching circuit (not illustrated) or a detection circuit for detecting the rectifier output voltage $V_{RECT}$ and/or rectifier output current $I_{RECT}$).

According to various embodiments, the resonance circuit 510a may generate an induced electromotive force based on the magnetic field and/or electric field formed by the wireless power transmitting device 101 (e.g., the wireless power transmitting device 101 of FIG. 1) which may be referred to as receiving wireless power. The resonance circuit 510a may be implemented as at least one or more structures as described above in connection with FIGS. 2 and 3 and no duplicate description is given.

According to various embodiments, the rectifier 510*b* may rectify the AC power received from the resonance circuit 510*a* to DC power. According to various embodiments, the control circuit 500*a* may detect (e.g., detect using a detection circuit (not illustrated)) the rectifier voltage (e.g., $V_{RECT}$) and rectifier current (e.g., $I_{RECT}$) output from the output terminal of the rectifier 510*b*, but the output terminal of the rectifier 510*b* is merely an example, and where the rectifier voltage and the rectifier current are detected is not limited. The control circuit 500*a* may be implemented as a processor 530 but, without being limited to those described, may be implemented separately from the processor 530 and operatively connected with the processor 530. The detected rectifier voltage and rectifier current may be used to calculate charging efficiency (e.g., $V_{RECT}$*Irect/PIN, where PIN is the DC power of the wireless power transmitting device 101). According to various embodiments, the rectifier 510*b* may include a bridge circuit (e.g., a full-bridge circuit or a half-bridge circuit). According to various embodiments, the rectifier 510*b* may be controlled by the control circuit 500*a* (or the processor 530). For example, when the rectifier 510*b* is implemented as a bridge circuit, the on/off state of an element (e.g., a switch or a transistor) of the bridge circuit may be controlled by the control circuit 500*a* (or the processor 530).

According to various embodiments, the DC/DC converter 510*c* may convert or regulate the rectified voltage transferred from the rectifier 510*b*. According to various embodiments, the DC/DC converter 510*c* may provide power having a substantially constant voltage. According to various embodiments, the DC/DC converter 510*c* may be omitted from the wireless power transmitting device 103 according to implementation. In an embodiment in which the DC/DC converter 510*c* is omitted, the phrase "provided to the DC/DC converter 510*c*" described in the disclosure may be understood as the phrase "provided to the charger 510*d*," and the phrase "provided from the DC/DC converter 510*c*" may be understood as the phrase "provided from the rectifier 510*b*". According to various embodiments, the DC/DC converter 510*c* may be connected to a power management integrated circuit (PMIC) for providing power to at least one hardware element in addition to the charger 510*d*, and the at least one hardware element (or PMIC) may be operated using the power from the DC/DC converter 510*c*. According to various embodiments, each of the at least hardware element may be connected to a corresponding individual PMIC, and the at least one hardware element each may be operated using the power provided through a corresponding PMIC. According to various embodiments, the DC/DC converter 510*c* may be implemented as one or more DC/DC converters, and the number thereof is not limited.

According to various embodiments, the charger 510*d* may receive power output from the DC/DC converter 510*c* and may charge the battery 511 connected to the charger 510*d* using the received power. According to various embodiments, the charger 510*d* may control the current and/or voltage applied to the battery 511 based on various charging modes (e.g., a constant current (CC) mode, a constant voltage (CV) mode, or a quick charging mode). For example, the charger 510*d* may control the current and/or voltage applied to the battery 511 based on the charging status of the battery 511. For example, the charger 510*d* may control the current and/or voltage applied to the battery 511 based on a user input. For example, when a quick charging mode is selected according to a user input, the charger 510*d* may control the current and/or voltage according to a setting corresponding to quick fast charging mode. According to various embodiments, the type of the battery 511 is not limited as long as it is a rechargeable secondary battery.

According to various embodiments, the communication circuit 512 may be implemented as, e.g., a BLE communication circuit 512, but as long as it is a circuit capable of transmitting and receiving communication signals, there is no limitation in the communication scheme.

An example of the sensor 520 is described below according to various embodiments. The sensor 520 may include at least one sensor implemented to identify a value for each attribute associated with wireless charging efficiency, which is described below.

According to various embodiments, the sensor 520 may include a first sensor for obtaining a value indicating the state of the wireless power receiving device 101. For example, the wireless power transmitting device 103 (e.g., the processor 530) may obtain a value (e.g., a value indicating the folding angle, a value indicating the slide, and/or a value indicating the state of housings) associated with a relative position between housings (e.g., the housings 410*a* and 420*a* or 410*b* to 430*b* of the foldable electronic device 400*a* or 400*b* in FIG. 4B or 4C or the housings 410*c* and 420*c* of the rollable electronic device 400*c* in FIG. 4D) using the first sensor.

For example, the first sensor may be provided to detect (or obtain, identify, or sense) information and/or data (e.g., an electrical value or electrical signal) for identifying the folding form of the wireless power receiving device 103 (e.g., the foldable electronic device 400*a* or 400*b* of FIGS. 4B to 4C). The first sensor may include, but is not limited to, a Hall-sensor, an angle sensor, a strain sensor, a distance sensor, or a gyroscope sensor (or a tilt sensor). Although not illustrated, a sensor hub implemented to gather information and/or data detected using the first sensor and a sensor hub driver IC for managing information and/or data received from the first sensor may be further implemented in the wireless power receiving device 103. Accordingly, when at least one of the housings (e.g., the housings 410*a* and 420*b* or 410*b* to 430*b* of the foldable electronic device 400*a* or 400*b* in FIG. 4B or 4C) is rotated or moved, the wireless power receiving device 103 (e.g., the processor 530) may identify information about the folding form between the housings (e.g., the housings 410*a* and 420*b* or 410*b* to 430*b* of the foldable electronic device 400*a* or 400*b* in FIG. 4B or 4C) based on the value identified by the first sensor. The information about the folding form may include at least one of information about the folding angle between the housings (e.g., the housings 410*a* and 420*b* or 410*b* to 430*b* of the foldable electronic device 400*a* or 400*b* in FIG. 4B or 4C) or information about an angle range including the folding angle between the housings (e.g., the housings 410*a* and 420*b* or 410*b* to 430*b* of the foldable electronic device 400*a* or 400*b* in FIG. 4B or 4C). Further, the information about the folding form of the wireless power transmitting device 103 may include information about the form (or folding form) of the housings (e.g., the housings 410*a* and 420*b* or 410*b* to 430*b* of the foldable electronic device 400*a* or 400*b* in FIG. 4B or 4C). For example, the information about the form may include information indicating the state, such as contact or contactless, between the housings (e.g., the housings 410*a* and 420*b* or 410*b* to 430*b* of the foldable electronic device 400*a* or 400*b* in FIG. 4B or 4C). As an example, if the wireless power receiving device 103 is implemented in a half fold form, the information about the form may include information about a form in which the two housings (e.g., the housings 410*a* and 420*b* of FIG. 4B) contact and a folding form in which they do not contact each other. As another example, if the wireless power receiving device 103 is implemented in a tri fold form, the information about the form may include information about a form in which three housings (e.g., the housings 410b to 430b of FIG. 4C) contact each other, a form in which they do not contact each other, and/or a folding form in which two housings (e.g., the housings 410b and 420b of FIG. 4C) of the three housings (e.g., the housings 410b to 430b of FIG. 4C) contact each other and the other two housings (e.g., the housings 420b and 430b of FIG. 4C) do not contact.

As another example, when a housing (e.g., the first housing 420c of FIG. 4D) of the wireless power receiving device 103 (e.g., the rollable electronic device 400c of FIG. 4D) slides, the first sensor may sense the slide of the housing and return an electrical value (e.g., current value and/or voltage value) indicating information about the state of the slide. The processor 530, which is described below, may obtain the electrical value to identify the state associated with the slide. For example, the information about the state of the slide may include at least one of the start or end of the slide of the housing (e.g., the first housing 420c of FIG. 4D), the sliding form of the wireless power receiving device 103 (e.g., an open state in which the housing has slid, a closed state in which the housing has not slid, or an intermediate state), or the sliding distance. As an example, the first sensor may be implemented as a sensor (e.g., an image sensor or an optical sensor) for detecting specific content (e.g., RGB color) displayed in a partial area of the received portion of the display, and the first sensor may return an electrical value indicating a state associated with a slide (e.g., the start of the slide or the sliding distance) based on sensing a change in the detection state of the specific content (e.g., the content moving or the content being not displayed) displayed in the received area of the display when the housing (e.g., the first housing 420c of FIG. 4D) moves. In this case, if the slide is finished, the wireless power transmitting device 103 may redisplay specific content in the partial area of the received portion of the display, and the first sensor may detect the redisplayed content and return an electrical value indicating the end of the slide. As another example, the first sensor may include a sensor that detects an electromagnet which is attached when the slide of the display is started or ended and, when the slide starts or ends, return an electrical value indicating the start or end. As another example, the first sensor may be implemented as a sensor (e.g., a pressure sensor, a resistance sensor, etc.) for detecting a dielectric that is moved when the display slides and may return an electrical value indicating the sliding distance based on the moving distance of the dielectric. Thus, when implemented as illustrated in FIG. 4, the wireless power transmitting device 103 (e.g., the processor 530) may identify the distance in which the display moves or the exposed area of the display based on the value identified using the first sensor when the display slides. Meanwhile, without being limited to those described, instead of receiving the value from the first sensor, the wireless power receiving device 103 may identify the sliding distance of the display or the exposed area of the display based on a signal for controlling the motor.

As another example, the first sensor may include an image sensor provided in one housing. Based on the shape of the wireless power receiving device 103 captured by the image sensor, the electronic device (e.g., the processor 530) may obtain information about the above-described folding form and information about the form of the slide.

According to various embodiments, the sensor 520 may include a second sensor for obtaining a value indicating a relative position of the wireless power receiving device 103 with respect to the wireless power transmitting device 101.

For example, the second sensor is a communication circuit using UWB and may include at least one communication circuit implemented to increase the distance, angle (or direction), and/or height for an external electronic device (e.g., the wireless power transmitting device 101). In an embodiment, the communication circuit may support the function of calculating the distance to the external electronic device based on the time associated with the message transmitted and/or received (e.g., the time of transmission of the message and the time of reception of the message) based on a single-sided two-way ranging (SS-TWR) scheme. In another embodiment, the communication circuit may support the function of calculating the distance to the external electronic device based on the time associated with the message transmitted and/or received based on a double-sided two-way ranging (DS-TWR) scheme. In another embodiment, the communication circuit may support the function of calculating the angle (or direction) for the external electronic device based on a difference in phase and/or time of reception between the signals received by a plurality of reception antennas using the plurality of reception antennas based on an angle-of-arrival (AOA) scheme. In another embodiment, the communication circuit may identify distances form the plurality of reception antennas to the external electronic device based on the time of signal and/or message received by each of the plurality of reception antennas using the plurality of reception antennas. The communication circuit may support the function of identifying the height of the electronic device with respect to the external electronic device using triangulation based on the identified distances. In this case, the wireless power receiving device 103 may calibrate the distance, direction, and/or height identified for the external electronic device using an IR sensor and/or an image sensor circuit.

As another example, the second sensor may include a plurality of coils and a plurality of phase shifters connected to the plurality of coils. The plurality of coils may be arranged in an array form. The second sensor may set a phase of power (e.g., current, and/or voltage) applied through the phase shifter connected to each of the plurality of coils. Magnetic fields may be formed by the plurality of coils according to the set phase, and the external electronic device (e.g., a wireless power transmitting device) may receive power by the formed magnetic fields. The processor 530 may receive information about the strength of power from the external electronic device, and the sensor may set the phase through the phase shifter connected to each of the plurality of coils so that the strength of the power formed in the external electronic device through the second sensor is maximized. The processor 530 may identify the distance, angle (or direction), and/or height of the external electronic device (e.g., the wireless power transmitting device 101) using triangulation based on the set phase.

According to other various embodiments, the sensor 520 may include a third sensor for obtaining a value indicating the state of the wireless power receiving device 103. For example, the third sensor may include a sensor (e.g., a tilt sensor or a gyro sensor) for detecting a direction of rotation of the wireless power receiving device 103.

An example of an output device 545 is described below according to various embodiments.

According to various embodiments, the output device 545 may include devices for providing content to the outside. For example, the output device 545 may include a display and/or a light generating device (e.g., a light emitting diode (LED))

for providing visual content (e.g., images, videos, and light), a speaker for providing audible content (e.g., voice or sound), and a vibrator for providing tactile content (e.g., vibration).

An example of the processor 530 is described below according to various embodiments. The processor 530 may include at least one of an application processor (AP), a central processing unit (CPU), a graphic processing unit (GPU), a display processing unit (DPU), or a neural processing unit (NPU). At least some of the operations of the processor 530 described below may be stored, in the form of modules, in the memory 540. For example, at least some of the modules may be implemented (e.g., executed) in software, firmware, or a combination of at least two or more thereof. For example, the modules may be implemented in the form of an application, program, computer code, instructions, routines, or processes, which are executable by the processor 530. Thus, when the modules are executed by the processor 530, the modules may trigger the processor 530 to perform operations associated with the modules (or functions that the modules may provide). Therefore, when it is described below that a specific module performs an operation, it may be interpreted as the processor 530 performing the operation as the specific module is executed. Or, the modules may be implemented as portions of a specific application. Or, without being limited to what is described and/or illustrated, each module may be implemented as a separate hardware device (e.g., a processor or control circuit) from the processor 530.

According to various embodiments, the processor 530 may generate content for enhancing charging efficiency based on a plurality of attributes associated with charging efficiency corresponding to the received wireless power. The plurality of attributes may be factors or elements affecting charging efficiency. The processor 530 may identify a value for each of the plurality of attributes through the sensor 520 (e.g., the first sensor to the third sensor). The attribute may be managed (or identified, or obtained) as a kind of parameter, and the value of the attribute may be managed (or identified, or obtained) as a factor. For example, Table 1 below shows the attributes that affect charging efficiency of the wireless power receiving device 103. The classifications (e.g., main classifications and sub classifications) in Table 1 are logical concepts for classifying attributes for convenience of description, and each attribute is not limited to those described and may be variously classified.

TABLE 1

| main classifications | sub classifications | attributes |
| --- | --- | --- |
| relative position of resonance circuit of wireless power receiving device with respect to magnetic force line formed in wireless power receiving device | relative position of wireless power receiving device with respect to wireless power transmitting device | height distance angle |
| | relative position between housings of wireless power receiving device | folding angle folding form sliding distance sliding form |
| | state of wireless power receiving device | direction of rotation (or angle of rotation) |

For example, the attributes may include the height of the wireless power receiving device 103 with respect to the wireless power transmitting device 101, distance, and/or relative angle, in the case of a foldable electronic device, folding angle and folding form, in the case of a rollable electronic device, sliding distance and sliding form, and the direction of rotation clockwise or counterclockwise as the wireless power receiving device 103 is observed from above, but may further include other various types of attributes without being limited thereto. For example, the height may mean the height in the Z-axis direction of the wireless power receiving device 103 with respect to the height in the Z-axis direction of the wireless power transmitting device 101. The distance may mean a distance from the wireless power receiving device 103 to the wireless power transmitting device 101. The relative angle may mean an angle in the direction in which the wireless power transmitting device 101 is positioned on the ground (or XY plane) with respect to the wireless power receiving device 103. The folding angle means an angle between the housings, and the folding form may mean whether the housings contact or do not contact each other as described above. The sliding distance means a distance in which the housing slides, and the sliding form may mean whether the housing slides or not as described above. The direction of rotation may mean an angle at which the wireless power receiving device 103 is rotated clockwise or counterclockwise from a specific axis (e.g., an axis in the XY plane) as observed (or in the XY plane) from above (i.e., perpendicularly). Each of the attributes is an attribute affecting the relative position of the coil of the wireless power receiving device 103 with respect to the wireless power transmitting device 101. As the value of each attribute is changed, the relative position of the resonance circuit 510a of the wireless power receiving device 103 may be changed so that the current induced in the resonance circuit 510a may be changed. Thus, charging efficiency may be changed. Some of the attributes may be changeable only in a specific type of electronic devices. For example, the attributes classified as the relative positions between the housings (e.g., folding angle, folding form, sliding distance, and sliding form) may be attributes that may be changed only in foldable electronic devices or rollable electronic devices. Thus, it may be implemented that reference values for the attributes (e.g., angle, folding form, sliding distance, and sliding form) may be pre-stored only in foldable or rollable electronic devices, and current values for the attributes may be identified. As an example, when at least some attribute of the above-described attributes are changed, the position of the resonance circuit 510a of the wireless power receiving device 103 with respect to the wireless power transmitting device 101 and the angle of rotation of the wireless power receiving device 103 in the position may be variously changed. It may be identified by referring to FIGS. 6A and 6B that charging efficiency differs (e.g., chargeable or non-chargeable) depending on the angle of rotation per position of the wireless power receiving device 103 around the resonance circuit 560a of the wireless power transmitting device 101 implemented as one structure. For example, referring to FIG. 6A, the angle of magnetic force line introduced to the resonance circuit 510a may be determined depending on the angle of rotation of the wireless power receiving device 103 per position of the wireless power receiving device 103. FIG. 6A illustrates the magnetic force line formed in the resonance circuit 560a of the wireless power transmitting device 101 as observed in the YZ plane. Referring to FIG. 6A, the charging efficiency of the wireless power receiving device 103 may be maximum when the resonance circuit 510a of the wireless power receiving device 103 is placed perpendicular to the magnetic force line received by the resonance circuit 401. The maximum charging efficiency may occur based on the fact that the current induced when the resonance circuit 401 is placed perpendicular to the magnetic force line is largest, which is based on the well-known magnetic induction phenomenon and is thus not further described in detail. In this case, as illustrated in FIG. 6B, the resonance circuit 510a included in the wireless power receiving device 103 (e.g., the housing 410a, 420a, 410b, 420b, 430b, 410c, or 420c of FIGS. 4B to 4D) in the YZ plane may differ in the angle of rotation (hereinafter, angle) clockwise or counterclockwise in the YZ plane so that the resonance circuit 510a of the wireless power receiving device 103 becomes perpendicular to the received magnetic force line per position of the wireless power transmitting device 101. FIG. 6B illustrates the charging efficiency depending on the angle of rotation per relative position of the resonance circuit 510a of the wireless power receiving device 103 with respect to the wireless power transmitting device 101, with the angle of the resonance circuit 401 being 0 degrees when the Y axis in the YZ plane is parallel to the resonance circuit 510a of the wireless power receiving device 103. Referring to 601 of FIG. 6B, when the resonance circuit 510a of the wireless power receiving device 103 is positioned in the Z-axis direction (or direction of 90 degrees) from the resonance circuit 560a of the wireless power transmitting device 101, the angle at which the resonance circuit 510a of the wireless power receiving device 103 becomes perpendicular to the magnetic force line is an angle close to 0 degrees and, in this case, the charging efficiency may be highest. In other words, the angle of rotation of the wireless power receiving device 103 may be determined to provide the highest charging efficiency per position. If the angle of the resonance circuit 510a of the wireless power receiving device 103 is changed from 0 degrees, the charging efficiency may gradually reduce as illustrated in FIG. 6B and, when approaching 0 degrees, the charging efficiency may increase. Meanwhile, the position of electrical components 611 (e.g., a display or battery) having conductivity, which is disposed in the wireless power receiving device 103, may also influence the charging efficiency. For example, if the electric components 611 are positioned between the resonance circuit 510a of the wireless power receiving device 103 and the resonance circuit 560a of the wireless power transmitting device 101, the magnetic force line of the wireless power receiving device 103, transferred to the resonance circuit 510a by the electric components 611, may be blocked so that the charging efficiency of the wireless power receiving device 103 may be lowered. Thus, although not illustrated, charging efficiency may be relatively higher when the angle of the resonance circuit 510a is 0 degrees than when the angle of the resonance circuit 510a in which the electric components 611 are positioned between the resonance circuit 510a of the wireless power receiving device 103 and the resonance circuit 560a of the wireless power transmitting device is 180 degrees. As a result, when the angle of the resonance circuit 510a is 0 degrees, the charging efficiency of the wireless power receiving device 103 may be maximized. Further, referring to 602 of FIG. 6B, when the resonance circuit 510a of the wireless power receiving device 103 is positioned in a direction of about 45 degrees from the resonance circuit 560a of the wireless power transmitting device 101, the angle at which the resonance circuit 510a of the wireless power receiving device 103 becomes perpendicular to the magnetic force line may be around 30 degrees. Further, referring to 603 of FIG. 6B, when the resonance circuit 510a of the wireless power receiving device 103 is positioned in the Y-axis direction (or direction of 0 degrees) from the resonance circuit 560a of the wireless power transmitting device 101, the angle at which the resonance circuit 510a of the wireless power receiving device 103 becomes perpendicular to the magnetic force line may be around −30 degrees. In an embodiment, the position of the wireless power receiving device 103 with respect to the wireless power transmitting device 101 and the angle of the wireless power receiving device 103 may be determined based on the attributes (e.g., distance, angle, or angle of rotation) as described above, so that the angle of the resonance circuit 401 showing the highest charging efficiency per position may correspond to the value of each of the attributes (hereinafter, a reference value). As an example, referring to 630 illustrated in FIG. 6B, if the relative angle of the wireless power receiving device 103 with respect to the wireless power transmitting device 101, among the attributes, is 0 degrees, and the folding angle (O) between the two housings 631 and 632 of the wireless power receiving device 103, among the attributes, is 150 degrees, the angle of rotation in the state in which the resonance circuit 510a is positioned in a 0-degree direction of the wireless power transmitting device 101 is 30 degrees, so that the charging efficiency may be the highest.

Similar to the experiment of detecting the highest charging efficiency at a specific angle of rotation and the specific angle, other attributes may also be experimented (or tested) so that the value of each of the attributes exhibiting the highest charging efficiency may previously be obtained, and the obtained values may be stored in the memory of the wireless power receiving device 103. Performing the experiment (or test) may mean identifying the charging efficiency of the wireless power receiving device 103 while adjusting the values of at least some of the attributes and obtaining the values of the attributes exhibiting the highest charging efficiency. For example, an experiment of detecting charging efficiency may be performed while changing the value of only one attribute, with the values of the other attributes among the plurality of attributes fixed and, during the experiment and/or as a result of the experiment, the value of the one attribute and the fixed values of the other attributes may be obtained at the time when the charging efficiency is the highest. However, without being limited to those described, the experiment may be conducted in various manners. As an example, it may be detected that charging efficiency is maximized when the folding angle (θ) becomes 150 degrees while conducting the experiment by changing the folding angle (θ) at the relative angle of 0 degrees as described above, and the corresponding values may previously be stored in the memory of the wireless power receiving device 103. Thus, as is described below with reference to FIGS. 10A and 10B, according to various embodiments, the processor 530 may previously store, in the memory (not illustrated), reference values for the attributes exhibiting the highest charging efficiency determined according to the test and identify the type and value of the attribute to be changed to increase charging efficiency based on comparison between the pre-stored reference values and the value for each of the attributes currently identified using the above-described sensors (e.g., the first sensor, second sensor, and third sensor). According to various embodiments, the processor 530 may obtain the value of each of the plurality of attributes using the sensor 520. In an embodiment, the processor 530 may obtain values for attributes (e.g., folding angle, folding form, sliding distance, or sliding form) associated with the relative position between the wireless power receiving device and the housings using the above-described first sensor (e.g., a hall sensor, an angle sensor, a strain sensor, a distance sensor, or a gyroscope sensor (or a tilt sensor), or an image sensor). In another embodiment, the processor 530 may identify values for height, distance, and/or angle using the above-described second sensor (e.g., UWB communication circuit). However, without being limited to those described, the processor 530 may identify the value for each attribute (e.g., height, distance, and/or angle) by receiving, through the communication circuit, the value for each attribute (e.g., height, distance, and/or angle) identified in the external electronic device (e.g., the wireless power transmitting device 101).

According to various embodiments, in case the identified charging efficiency is less than a threshold, the processor 530 may provide content for enhancing charging efficiency. For example, the processor 530 may generate content based on the type and value of the attribute to be changed to increase the identified charging efficiency as described above. In an embodiment, the processor 530 may display a screen for enhancing charging efficiency through a display. For example, when the type of the changed attribute is folding angle and the angle to be changed is a specific angle, the processor 530 may display a screen for changing the folding angle to the specific angle through the display. In another embodiment, the processor 530 may output a sound for enhancing charging efficiency through a speaker. For example, when the type of the changed attribute is folding angle and the angle to be changed is a specific angle, the processor 530 may output a voice for changing the folding angle to the specific angle through the speaker. In another embodiment, the processor 530 may output an indication for enhancing charging efficiency through the light generating device. For example, the processor 530 may provide a notification for allowing the user to change the current folding angle by outputting light in a designated method through the light generating device and, when the folding angle is changed to the specific angle, stop outputting the light to indicate that charging efficiency has increased.

Hereinafter, an example of a configuration of the wireless power transmitting device 101 according to various embodiments is described.

Hereinafter, an example of the wireless power transmission circuit 560 according to various embodiments is described.

Referring again to FIG. 5B, according to various embodiments, a power amplifier 560b may receive a DC current from a power supply unit 560c. The power amplifier 560b may amplify the DC current with a set gain. Alternatively, DC power may be converted into AC based on a signal input from the control circuit 550a (or the processor 560). The control circuit 550a may be implemented as a processor 560 but, without being limited to those described, may be implemented separately from the processor 560 and operatively connected with the processor 560. Alternatively, the power amplifier 560b may output AC power. For example, the power amplifier 560b may include an inverter and may convert DC current into AC power using the inverter.

According to various embodiments, a matching circuit (not illustrated) may perform impedance matching. For example, the impedance viewed from the matching circuit (not illustrated) may be adjusted to perform control so that the output power shows a higher efficiency or higher output. The matching circuit (not illustrated) may adjust the impedance based on the control of the control circuit 550a (or the processor 560). The matching circuit (not illustrated) may include at least one of a coil and a capacitor. The control circuit 550a (or the processor 560) may control the connection with at least one of the coil and the capacitor and may accordingly perform impedance matching. The above-described wireless power receiving device 103 may include a matching circuit (not illustrated) that operates similarly or identically to the matching circuit (not illustrated) of the wireless power transmitting device 101.

According to various embodiments, a sensing circuit (not illustrated) may sense a change in load by the wireless power receiving device 103 through the resonance circuit 560a or the power supply unit 560c. The sensing result of the sensing circuit (not illustrated) may be provided to the control circuit 550a (or the processor 560). The wireless power receiving device 103 may include a sensing circuit (not illustrated) that operates similarly or identically to the sensing circuit (not illustrated) of the wireless power transmitting device 101.

According to various embodiments, the resonance circuit 560a may be implemented to form a magnetic field based on the AC power received from the power amplifier 560c. The resonance circuit 560a may be implemented as at least one or more structures as described above in connection with FIGS. 2 and 3 and no specific description is given.

According to various embodiments, the communication circuit 561 may communicate with the communication circuit 512 of the wireless power receiving device 103. For example, the wireless power transmitting device 101 may perform bidirectional communication (Wi-Fi, ZigBee, or BT/BLE) with the wireless power receiving device 103 at a frequency of 2.4 GHz.

According to various embodiments, the sensor 570 may be implemented to obtain information about the surroundings of the wireless power transmitting device 101. For example, the sensor 570 may include a sensor 520 that is implemented to identify the value for each of attributes associated with charging efficiency as described above. As an example, the sensor 570 may include a communication circuit using UWB described in connection with the wireless power receiving device 103 and a second sensor including a plurality of coils arranged in array and be implemented to obtain information about the distance, angle (or direction), and/or height for an external object (e.g., the wireless power receiving device 103) disposed around the wireless power transmitting device 101 using the second sensor. As another example, the sensor 570 may include an image sensor and may be implemented to capture an external object (e.g., the wireless power receiving device 103) disposed around the wireless power transmitting device 101. The information obtained through the sensor 570 may be transferred to the wireless power receiving device 103. For example, as is described below, the wireless power transmitting device 101 may receive identification information about the wireless power receiving device 103 and may identify that the wireless power receiving device 103 is a type of electronic device that is changeable for charging efficiency (e.g., a foldable electronic device or a rollable electronic device). The wireless power transmitting device 101 may identify the value (e.g., a value for the distance, angle, and/or height) for each attribute using the sensor 570 based on the identification and transmit the identified value to the wireless power receiving device 103.

According to various embodiments, the output device 590 may include a display, a speaker, and/or a vibrator, similarly to that described for the wirelessly powered receiving device 103. The wireless power transmitting device 101 (e.g., the processor 580) may receive information about content for enhancing charging efficiency, which is described below, from the wireless power receiving device 103 and provide it through the output device 590.

According to various embodiments, since the processor 580 may be implemented similarly to the processor 530 of the above-described wireless power receiving device 103, and a duplicate description is omitted.

Hereinafter, an example of the operation of the wireless power receiving device 103 according to various embodiments is described.

According to various embodiments, if the charging efficiency based on the power received from the wireless power transmitting device 101 is less than a threshold, the wireless power receiving device 103 may provide content for increasing the charging efficiency of the wireless power receiving device 103.

Figure 7A:
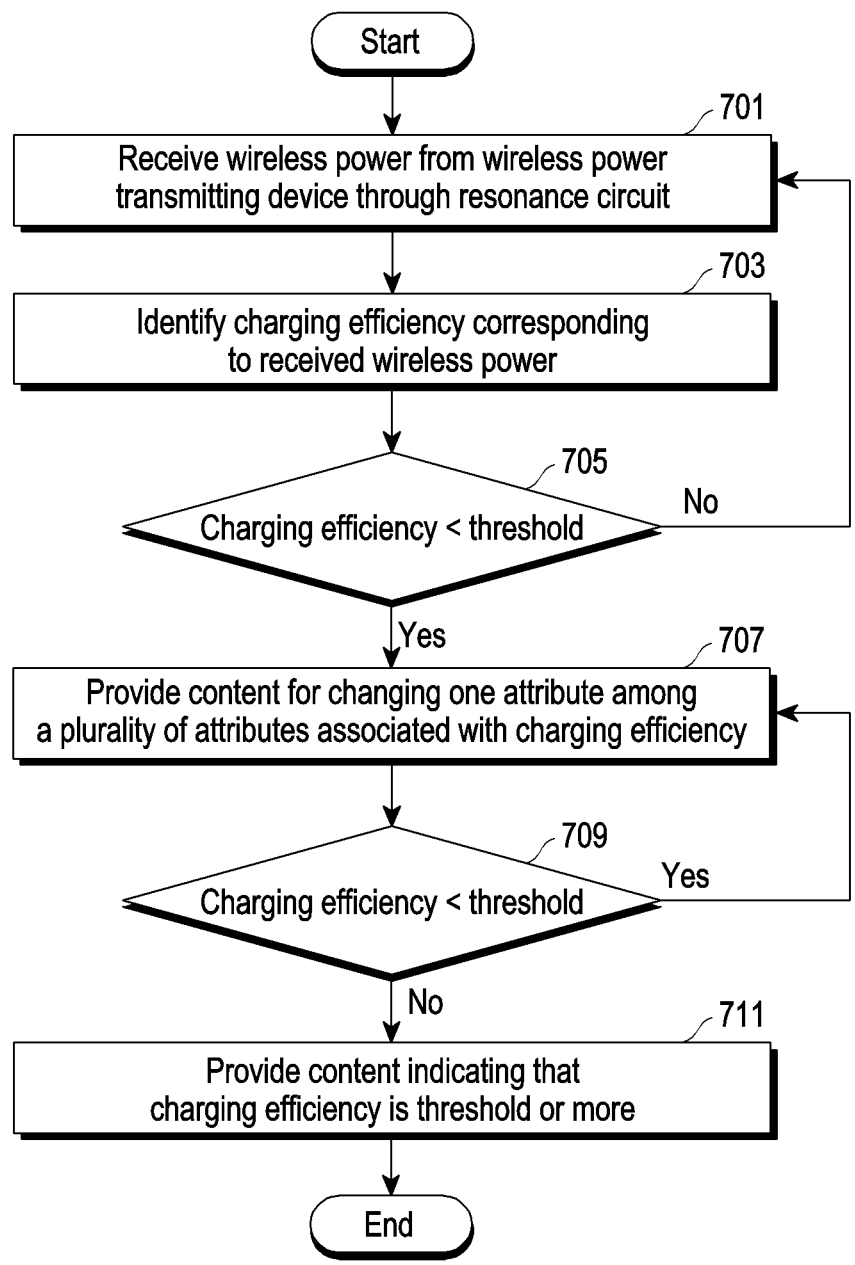
FIG. 7A is a flowchart illustrating an example of the operation of a wireless power receiving device according to various embodiments.

FIG. 7A is a flowchart 700 illustrating an example of an operation of a wireless power receiving device 103 according to various embodiments. The operations illustrated in FIG. 7A are not limited to the illustrated order but may rather be performed in other various orders. According to various embodiments, more or less operations than those of FIG. 7A may be performed. Hereinafter, FIG. 7A is described with reference to FIG. 7B.

Figure 7B:
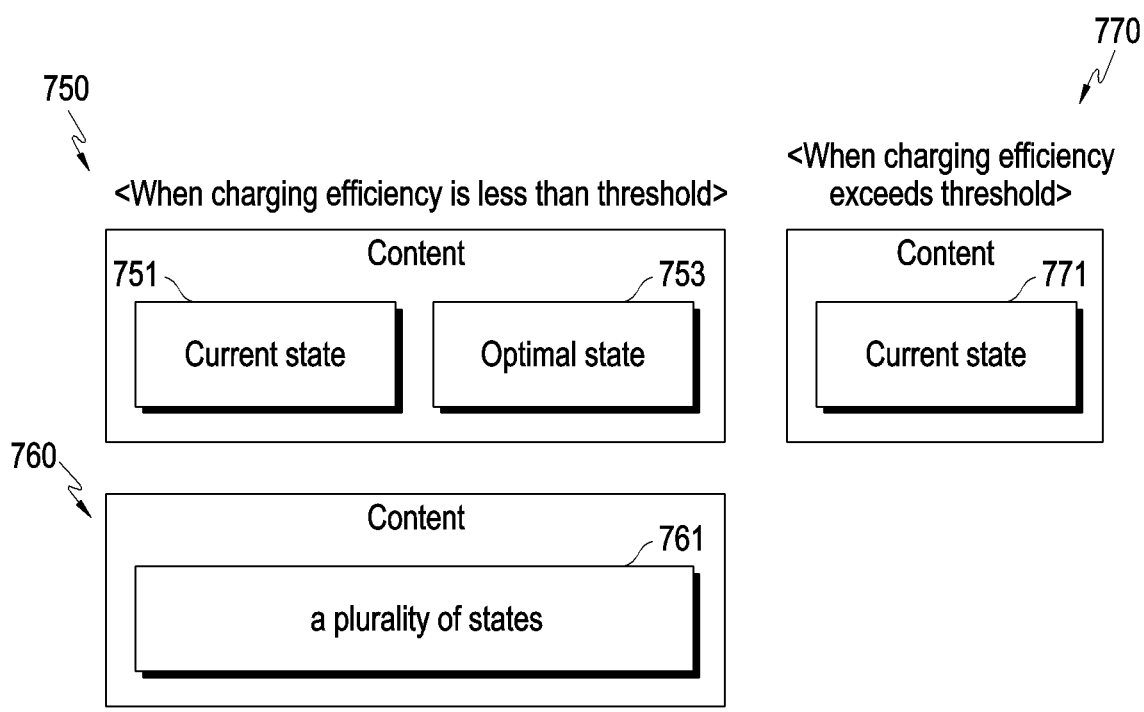
FIG. 7B is a view illustrating an example of a screen provided by a wireless power receiving device according to various embodiments.

FIG. 7B is a view illustrating an example of a screen provided by a wireless power receiving device 103 according to various embodiments.

According to various embodiments, in operation 701, the wireless power receiving device 103 may receive (or control the wireless power receiving device 103 (e.g., a switch) to wirelessly receive power) wireless power from the wireless power transmitting device 101 through the resonance circuit 401. For example, when entering within a charging range (or a specific distance) of the wireless power transmitting device 101, the wireless power receiving device 103 may receive wireless power from the wireless power transmitting device 101. As an example, according to the A4WP standard (or AFA standard), when the wireless power receiving device 103 is positioned within the charging range (or specific distance) of the wireless power transmitting device 101, the communication circuit 512 (e.g., the BLE communication circuit 512) of the wireless power receiving device 103 may wake up (or the state of the wireless power receiving device 103 enters a boot state) based on a power beacon received from the wireless power transmitting device 101. The wireless power receiving device 103 may transmit an advertisement signal (e.g., PRU advertisement) to the wireless power transmitting device 101 through the communication circuit 512. Based on transmission of the advertisement signal, the wireless power transmitting device 101 and the wireless power receiving device 103 may perform negotiation for wireless charging (e.g., exchange of the PRU static parameter and the PRU dynamic parameter). In the negotiation step, for example, information about the identifier (ID) of the wireless power receiving device 103 and/or information related to the start of wireless charging of the wireless power receiving device 103 may be included. Here, the information related to the start of wireless charging of the electronic device may include, but is not limited to, information indicating that the wireless power receiving device 103 is in a state of being wirelessly charged and/or information about the magnitude of the voltage applied to the output terminal of the rectifier 510b of the wireless power receiving device 103. When the negotiation is completed, the wireless power receiving device 103 may receive a signal enabling charging (or a charging function control signal) (e.g., PRU control) from the wireless power transmitting device 101. Based on the reception of the signal enabling charging, the wireless power receiving device 103 may electrically connect the rectifier 510b, the charger 510d, and the battery 511 (e.g., switch control) to allow the battery 511 to be charged. A magnetic field may be formed as a current is applied to the resonance circuit 560a of the wireless power transmitting device 101, and the wireless power receiving device 103 may charge the battery 511 using the rectifier 510b and the charger 510d based on the current induced in the resonance circuit 510a of the wireless power receiving device 103 based on the magnetic field. Although an operation of receiving wireless power based on the A4WP standard (or AFA standard) has been described as an example, the wireless power receiving device 103 may receive wireless power based on an electromagnetic scheme or the WPC standard (or Qi standard) without being limited to those described.

According to various embodiments, the charging range may mean a range in which another electronic device (e.g., the wireless power receiving device 103 and/or the external device 550) is chargeable with the wireless power transmitted by the wireless power transmitting device 101. In an embodiment, the charging range may mean a range in which a designated level or more of voltage (e.g., rectifier voltage $V_{RECT}$) is formable at one point (e.g., the output terminal of the rectifier 510b) of the wireless power receiving device 103 by the wireless power transmitted by the wireless power transmitting device 101. However, the charging range may vary based on at least one of the magnitude of the charging power of the wireless power transmitting device 101, charging environment, type of the wireless power receiving device 103, or the number of wireless power receiving devices 103 performing charging from one wireless power transmitting device 200 but, without being limited to those described, may remain unchanged. Further, in an embodiment, the charging range may mean a range in which charging may be performed with a charging efficiency of greater than or equal to a threshold. Even in this case, the charging range may vary based on at least one of the magnitude of the charging power of the wireless power transmitting device 200, charging environment, type of the wireless power receiving device 103, or the number of wireless power receiving devices 103 performing charging from one wireless power transmitting device 200 but, without being limited to those described, remain unchanged.

According to various embodiments, the wireless power receiving device 103 may identify the charging efficiency corresponding to the received wireless power in operation 703 and, in operation 705, determine whether the charging efficiency is less than the threshold. In an embodiment, the wireless power receiving device 103 may receive information about charging efficiency from the wireless power transmitting device 101. For example, after wirelessly receiving power, the wireless power receiving device 103 may transmit information about the rectifier voltage $V_{RECT}$ and the rectifier current $I_{RECT}$ to the wireless power transmitting device 101 and receive information about charging efficiency based on the transmission of the information. The charging efficiency may be calculated, as rectifier voltage ($V_{RECT}$)*rectifier current (Irect)/DC power (PIN) of wireless power transmitting device 101, by the wireless power transmitting device 101. In another embodiment, the wireless power receiving device 103 may calculate the charging efficiency. For example, after wirelessly receiving power, the wireless power receiving device 103 may receive information about the DC power PIN of the wireless power transmitting device 101 from the wireless power transmitting device 101. The wireless power receiving device 103 may calculate rectifier voltage ($V_{RECT}$)*rectifier current (Irect)/DC power (PIN) of wireless power transmitting device 101 and identify charging efficiency.

According to various embodiments, in case the charging efficiency is less than the threshold, the wireless power receiving device 103 may provide content for changing one of the plurality of attributes associated with charging efficiency in operation 707. For example, in case the calculated charging efficiency is less than the threshold, the wireless power receiving device 103 may determine at least one attribute among the plurality of attributes (e.g., distance, folding angle, height, angle of rotation, folding form (or sliding form)) associated with charging efficiency, identify the current value of the determined attribute using the sensor 520, and generate content for changing the identified current value of at least one attribute. As another example, without being limited to those described, the wireless power receiving device 103 may receive, from the wireless power transmitting device 101, the current value of at least one attribute determined to be changed and generate content for changing the identified current value of at least one attribute.

According to various embodiments, the wireless power receiving device 103 may determine the attribute based on the priority of each of the attributes as set forth in Table 2 below, as at least part of determining the attribute to be changed among the plurality of attributes. For example, referring to Table 2, the priority denotes the degree of influence on the charging efficiency, had by each of the attributes, and as the priority decreases (or as the priority is closer to a first priority), the degree of increase may increase. The priority of the attributes set forth in Table 2 below is merely an example and, without being limited to those described, the priority may be set in other various manners. Further, the priority of each attribute may be set to differ per type of the wireless power receiving device 103 (e.g., foldable electronic device or rollable electronic device).

TABLE 2

| Priorities | Attributes |
|---|---|
| first priority | relative distance |
| second priority | folding angle |
| third priority | relative height |
| fourth priority | angle of rotation (or direction of rotation) |
| fifth priority | folding form (or sliding form) |

The wireless power receiving device 103 may previously store the above-described information about priority in the memory and, in case the charging efficiency is less than the threshold, identify the attributes to be changed in ascending order of priority. The wireless power receiving device 103 may first identify a first attribute (e.g., relative distance) which has the lowest priority and obtain the current value for the first attribute (e.g., relative distance) using a sensor (e.g., the second sensor). If it is determined that the value of the first attribute (e.g., relative distance) needs to be changed based on the currently obtained current value for the first attribute (e.g., relative distance), the wireless power receiving device 103 may determine the first attribute (e.g., relative distance) as the attribute to be changed. If it is determined that the value of the first attribute (e.g., relative distance) is not supposed to be changed (or needs to be maintained) based on the currently obtained current value for the first attribute (e.g., relative distance), the wireless power receiving device 103 may continuously determine whether a second attribute (e.g., folding angle) which has the next priority needs to be changed. The wireless power receiving device 103 may perform the operation of comparing the current value of the attribute with a reference value (e.g., the value of the corresponding attribute exhibiting the maximum charging efficiency) for the attribute previously stored in the memory as at least part of determining whether the attribute needs to be changed. As is described below with reference to FIGS. 10A and 10B, a value exhibiting the highest charging efficiency may be derived for each attribute depending on a result of a previous test, and the wireless power receiving device 103 may previously store, in the memory, the derived value as a reference value for each attribute or an artificial intelligence model generated based on the derived value. In case the difference between the current value of the attribute and the reference value exceeds a threshold, the wireless power receiving device 103 may determine that the attribute needs to be changed and, in case the difference between the current value and the reference value is less than the threshold, may determine that the attribute should not be changed (or should be maintained). Without being limited to those described, according to an embodiment, the wireless power receiving device 103 may identify the attribute whose current value is most different from the reference value among the plurality of attributes as the attribute to be changed regardless of priority. Alternatively, without being limited to those described, the wireless power receiving device 103 may select a plurality of attributes having designated priorities as attributes to be changed and provide content based on the reference value and the current value for each of the selected plurality of attributes, which is further described with reference to FIGS. 19 and 20. If at least one attribute to be changed is determined, the wireless power receiving device 103 may identify the current value for the at least one determined attribute using the sensor 520 and/or receive the current value for at least one attribute from the wireless power transmitting device 101. Meanwhile, in case it is determined that there is no attribute to be changed among the plurality of attributes, the wireless power receiving device 103 may provide an error message (e.g., output it through the output device 545). As an example, in case an object disturbing charging exists between the wireless power receiving device 103 and the wireless power transmitting device 101, it may be determined that there is no attribute to be changed among the plurality of attributes. Thus, the wireless power receiving device 103 may provide an error message to allow the user to remove the object disturbing charging. According to various embodiments, the wireless power receiving device 103 may output content for changing attribute. For example, the content may include information for guiding to change a specific attribute (e.g., an attribute selected to be changed) from the current value to the reference value. In an embodiment, referring to 750 of FIG. 7B, the content may include at least one of information about the optimal state or information about the current state 751. As an example, when the content is a screen, the information about the current state 751 may include text for the charging time currently required to fully charge the battery (hereinafter, full charge time) and an image corresponding to the current value of the attribute to be changed, and the information about the optimal state 753 may include an image corresponding to a state in which the attribute is changed to the reference value and text for the charging time required to fully charged the battery when the attribute is changed to the reference value and may also include text instructing to change the attribute. For example, the wireless power receiving device 103 may previously store images corresponding to the respective vehicles of the attributes, obtain an image corresponding to the value of the attribute (e.g., the current value or reference value of the attribute) among the stored images and include it in the screen, but is not limited thereto (e.g., previously stores an image for the wireless power receiving device corresponding to a specific value for each attribute and deforms the stored image as much as the difference between the specific value and the current reference value and includes it). As an example, the text instructing to change attribute may be determined based on a result of comparison between the reference value and current value of the attribute to be changed. For example, the wireless power receiving device 103 may identify the size relationship as a result of comparison between the current value and reference value of the attribute and determine text corresponding to the size relationship for guiding to change the attribute. As an example, in case the current value of the attribute is lower than the reference value, the wireless power receiving device may determine text instructing to increase the attribute and output the determined text and, in case the current value is higher than the reference value, determine text instructing to decrease the attribute and output the determined text. As another example, the wireless power receiving device 103 may identify the difference as a result of comparison between the current value and reference value of the attribute and determine text for guiding to change the attribute as much as the identified difference. For example, in case the difference between the current value and reference value of the attribute is a first difference, the wireless power receiving device 103 may determine text instructing to change (or increase or decrease) the attribute by the first difference and output the determined text. Without being limited to those described, text representing a degree, rather than a specific numerical value, may be determined for the attribute to be changed, and the text may be determined according to the degree of difference. According to an embodiment, in a case where the attribute to be changed is distance, the information about the current state 751 may include an image for the wireless power receiving device 103 spaced apart by the current value for the distance from the wireless power transmitting device 101 and current full charge time, and the information about the optimal state 753 may include an image for the wireless power receiving device 103 spaced apart by the distance (e.g., a reference value for distance) that should be changed from the wireless power transmitting device 101 and the full charge time therefor, and text instructing to change the distance (e.g., "Increase the distance" or "decrease the distance"). The user may recognize the image and text displayed on the screen and reposition or transform the wireless power receiving device 103 to allow the attribute (e.g., distance) to be changed accordingly. Similarly, the wireless power receiving device 103 may provide the information about the current state 751 and the information about the content for the optimal state 753 through an output device 545 other than the display. As an example, the wireless power receiving device 103 may output a sound for the information about the current state 751 and the information about the optimal state 753 through a speaker. In another embodiment, the wireless power receiving device 103 may provide content including information about a plurality of states 761 as illustrated in 760 of FIG. 7B. For example, the information about the plurality of states 761 may include information associated with charging for values for which the attribute is changeable. As an example, in a case where the content is a screen, the information about the plurality of states may include a plurality of images corresponding to a plurality of values between the current value and reference value of the attribute to be changed, the values of the respective attributes of the plurality of images, and full charge time associated with each of the plurality of images. For example, in case the attribute to be changed is distance, the value of the distance is a first value, and the reference value of the distance is a second value, an image for the wireless power receiving device 103 corresponding to each of the second value and a plurality of values between the first value and the second value (e.g., an image for the wireless power receiving device 103 spaced apart from the wireless power transmitting device 101 by the corresponding value), a value of distance associated with each image, and a full charge time of each in a position associated with each image may be displayed. Accordingly, the user may properly change the attribute of the wireless power receiving device 103 to correspond to one image among the plurality of images, in the current situation. As another example, in case a plurality of attributes are selected as attributes to be changed, the information about the plurality of states 761 may include information for guiding to change for each of the plurality of attributes.

According to various embodiments, in operation 709, the wireless power receiving device 103 may again determine whether the charging efficiency is less than the threshold and, unless the charging efficiency is less than the threshold (or equal to or greater than the threshold), provide content indicating that the charging efficiency is greater than or equal to the threshold in operation 711. For example, after providing the content, the wireless power receiving device 103 may again perform the operation of comparing the charging efficiency with the threshold and, based on a result of the comparison, output content. As an example, if a preset time elapses after providing the content, the wireless power receiving device 103 may perform the comparison operation again. As another example, in case the value of the attribute to be changed is changed, the wireless power receiving device 103 may perform the comparison operation again. The user may change the attribute associated with the content (e.g., relative distance, folding angle, relative height, angle of rotation, or folding form (or sliding form)) according to the output of the content of the wireless power receiving device 103. The wireless power receiving device 103 may monitor the value for the attribute to be changed, using a sensor (e.g., the first sensor and the second sensor) and, if the value of the attribute is changed, identify charging efficiency again and perform the operation of comparing the identified charging efficiency with the threshold. In case the identified charging efficiency is greater than or equal to the threshold, the wireless power receiving device 103 may provide content including the information 771 about the current state in which the attribute has been changed, as illustrated in 770 of FIG. 7B. For example, in a case where the content is a screen, the wireless power receiving device 103 may display, on the display, a screen indicating that the attribute has successfully been changed and the charging time according thereto.

According to various embodiments, in case the charging efficiency is less than the threshold, the wireless power receiving device 103 may again provide content for changing one of the plurality of attributes associated with charging efficiency in operation 707. For example, the wireless power receiving device 103 may determine an attribute, different from the changed attribute, among the plurality of attributes as the attribute to be changed, generate content for changing the determined attribute, and output the generated content. For example, the wireless power receiving device 103 may redetermine the attribute, which is next in priority to the changed attribute, as the attribute to be changed. As an example, in case the wireless power receiving device 103 displays a screen including information about the plurality of states as described above, the user may move or transform the wireless power receiving device 103 to change the attribute of the wireless power receiving device 103 to a value different from the reference value of the attribute to be changed. Accordingly, although the attribute is changed, the charging efficiency may remain less than the threshold. Accordingly, in this case, the wireless power receiving device 103 may output content for changing the attribute which is next in priority to the changed attribute. Since the operation of generating content for changing the attribute of the wireless power receiving device 103 and the operation of outputting may be performed as described above, no duplicate description is given.

Hereinafter, an example of the operation of the wireless power receiving device 103 according to various embodiments is described.

According to various embodiments, if the charging efficiency based on the power received from the wireless power transmitting device 101 is less than a threshold, the wireless power receiving device 103 may transfer information for increasing the charging efficiency of the wireless power receiving device 103 to the wireless power transmitting device 101. The wireless power transmitting device 101 may output content for increasing the charging efficiency based on the received information.

Figure 8:
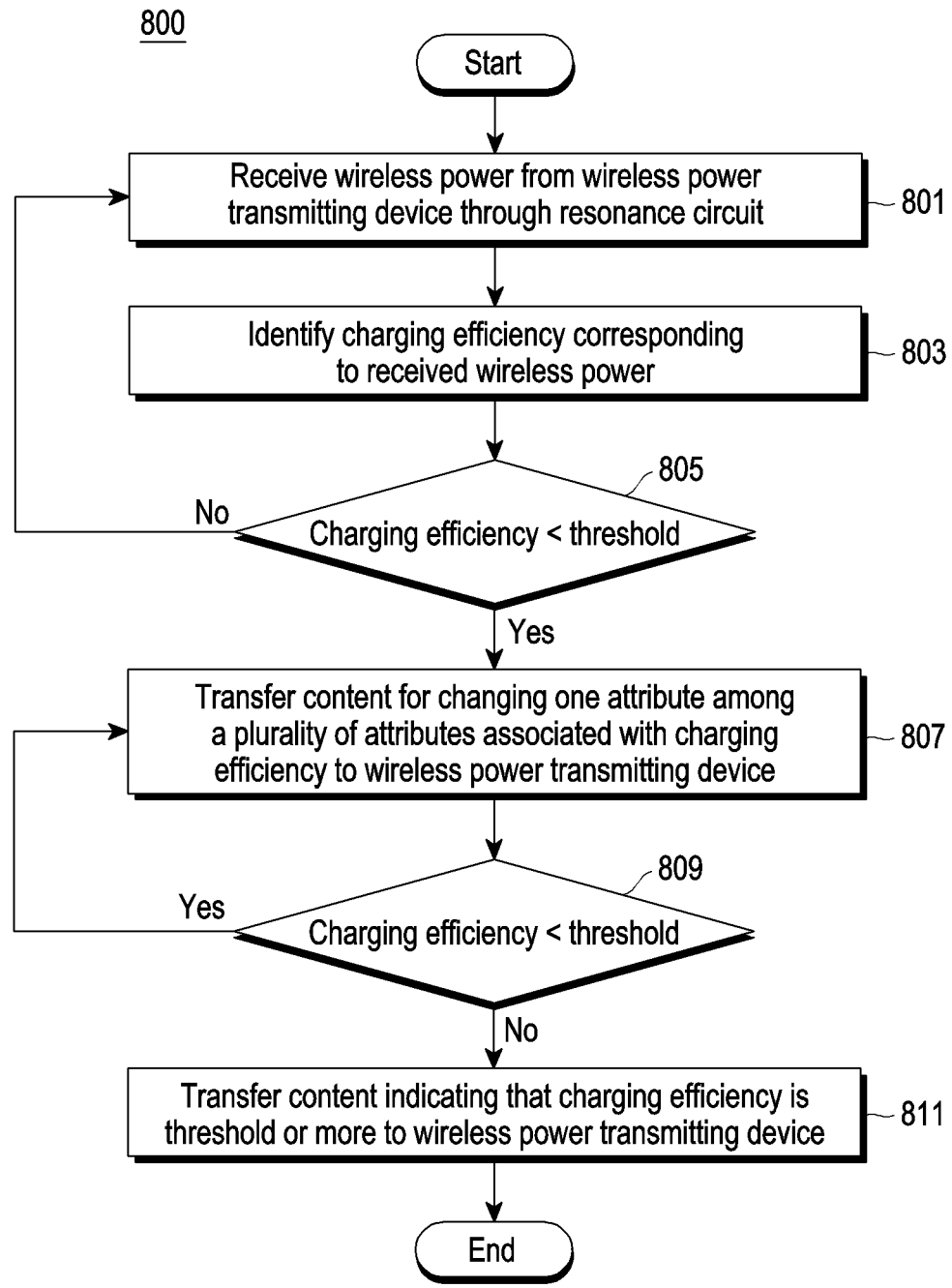
FIG. 8 is a flowchart illustrating an example of the operation of a wireless power receiving device and a wireless power transmitting device according to various embodiments.

FIG. 8 is a flowchart 800 illustrating an example of an operation of a wireless power receiving device 103 according to various embodiments. The operations illustrated in FIG. 8 are not limited to the illustrated order but may rather be performed in other various orders. According to various embodiments, more or less operations than those of FIG. 8 may be performed.

According to various embodiments, in operation 801, the wireless power receiving device 103 may receive (or control the wireless power receiving device 103 (e.g., a switch) to wirelessly receive power) wireless power from the wireless power transmitting device 101 through the resonance circuit 401. The wireless power receiving device 103 may identify the charging efficiency corresponding to the received wireless power in operation 803 and, in operation 805, compare the identified charging efficiency with a threshold. Operations 801 to 805 of the wireless power receiving device 103 may be performed like operations 701 to 705 described above, and no detailed description thereof is given below.

According to various embodiments, in case the charging efficiency is smaller than the threshold, the wireless power receiving device 103 may transfer content for changing one of the plurality of attributes associated with charging efficiency to the wireless power transmitting device 101 in operation 807. For example, the wireless power receiving device 103 may transfer the information about content described above in connection with operation 707 to the wireless power transmitting device 101. The wireless power transmitting device 101 may output the received content through the output device 590 of the wireless power transmitting device 101. Since operation 707 has been described above, a detailed description thereof is omitted. As another example, the wireless power receiving device 103 may transmit information about the attribute determined to be changed to the wireless power transmitting device 101. The information about the determined attribute may include at least one of identification information about the attribute, the current value of the attribute, or the reference value of the attribute. The wireless power transmitting device 101 may generate (or obtain) content based on the received information about the attribute and output the generated content through the output device 590. Since the operation of generating (or obtaining) content by the wireless power transmitting device 101 may be performed as described above in connection with operation 707 of the wireless power receiving device 103, no duplicate description is given.

According to various embodiments, the wireless power receiving device 103 may compare the identified charging efficiency with a threshold in operation 809. In case the charging efficiency is greater than the threshold, the wireless power receiving device 103 may transfer content indicating that the charging efficiency is greater than or equal to the threshold to the wireless power transmitting device 101 in operation 811. For example, after transmitting the content to the wireless power transmitting device 101, the wireless power receiving device 103 may perform the operation of comparing the charging efficiency with the threshold again. As an example, a preset time after transmitting the content, the wireless power receiving device 103 may again perform the comparison operation. As another example, the wireless power receiving device 103 may monitor the value of the attribute to be changed and, in case the value of the attribute to be changed is changed, perform the comparison operation again. In case the charging efficiency is greater than or equal to the threshold, the wireless power receiving device 103 may transmit the information about the content described in connection with operation 709 to the wireless power transmitting device 101. The wireless power transmitting device 101 may output, through the output device 590 of the wireless power transmitting device 101, the received content based on the information about the received content. Alternatively, the wireless power receiving device 103 may transmit information indicating that the charging efficiency is greater than or equal to the threshold to the wireless power transmitting device 101. The wireless power transmitting device 101 may output the content through the output device 590 based on the information indicating that the charging efficiency is greater than or equal to the threshold.

Hereinafter, an example of the operation of the wireless power receiving device 103 according to various embodiments is described.

According to various embodiments, the wireless power receiving device 103 may determine the attribute to be changed among the plurality of attributes associated with charging efficiency and identify the reference value of the determined attribute to be changed. The wireless power receiving device 103 may identify the current values of the other attributes than the current attribute to be changed and identify the reference value of the attribute to be changed based on comparison between data pre-stored in the memory (test data described below) and the identified current values.

Figure 9:
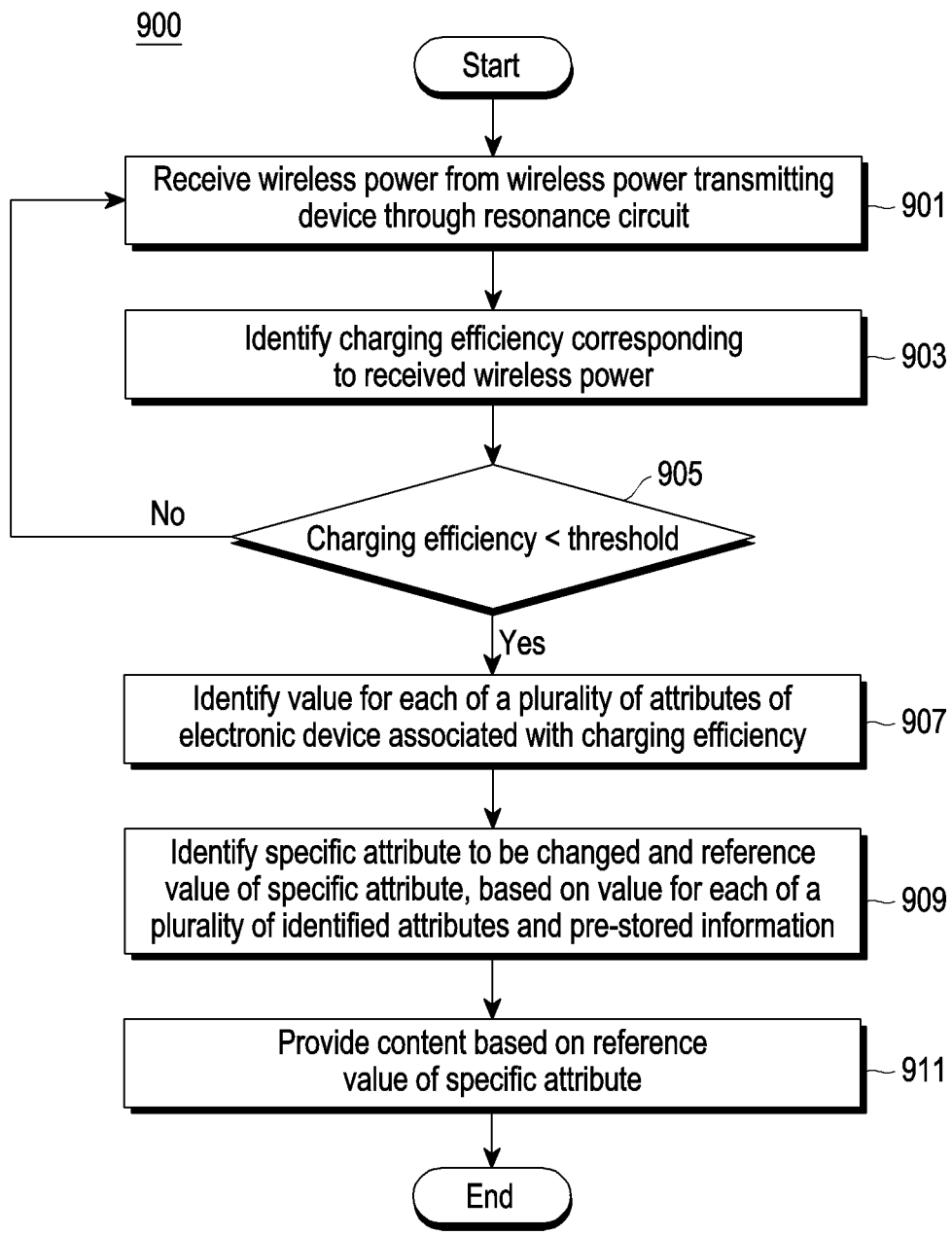
FIG. 9 is a flowchart illustrating an example of the operation of a wireless power receiving device according to various embodiments.

FIG. 9 is a flowchart 900 illustrating an example of an operation of a wireless power receiving device 103 according to various embodiments. The operations illustrated in FIG. 9 are not limited to the illustrated order but may rather be performed in other various orders. According to various embodiments, more or less operations than those of FIG. 9 may be performed. FIG. 9 is described below with reference to FIGS. 10A and 10B.

Figure 10A:
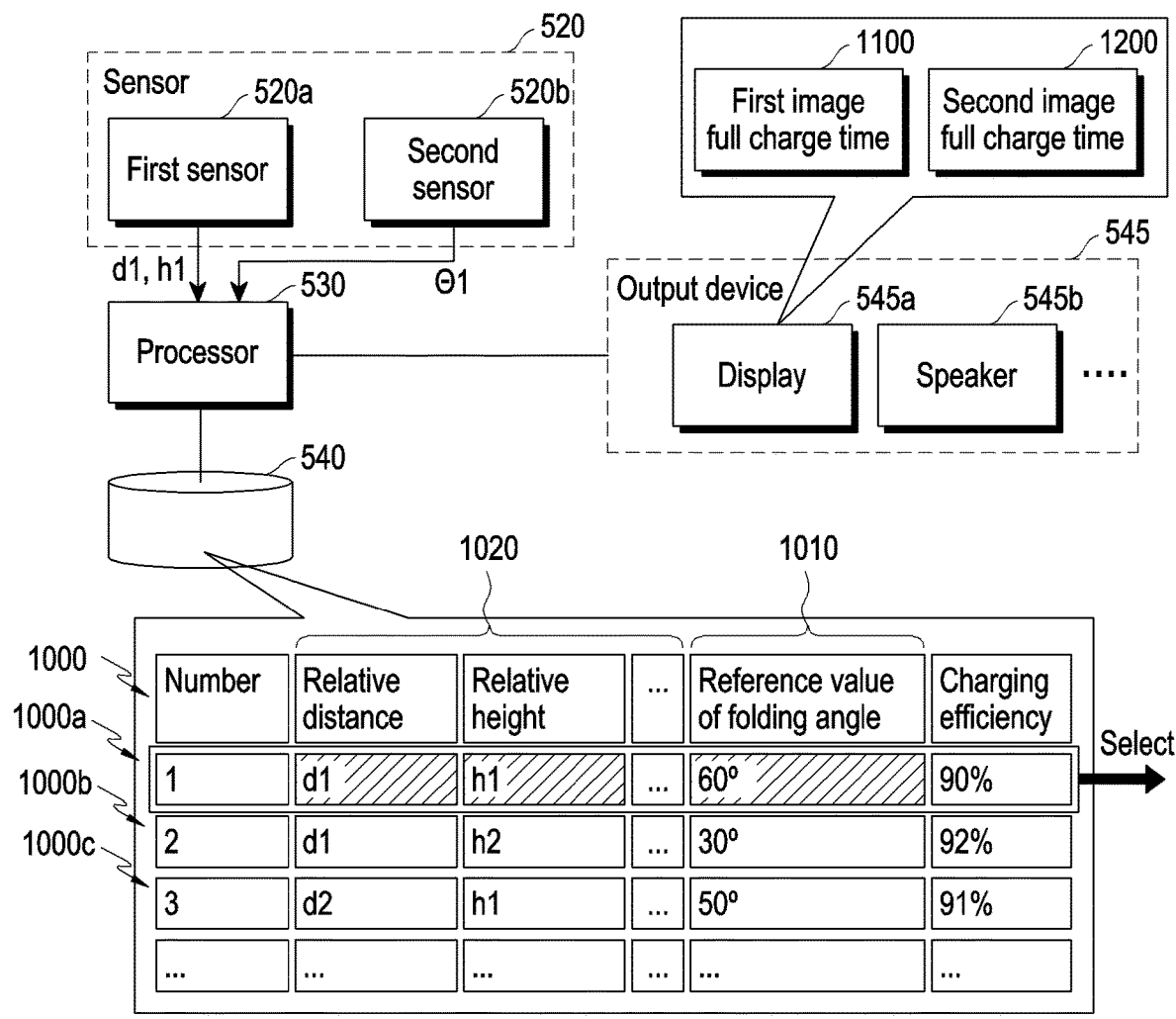
FIG. 10A is a view illustrating an example of the operation of identifying a reference value of a parameter to be currently changed using test data of a wireless power receiving device according to various embodiments.
Figure 10B:
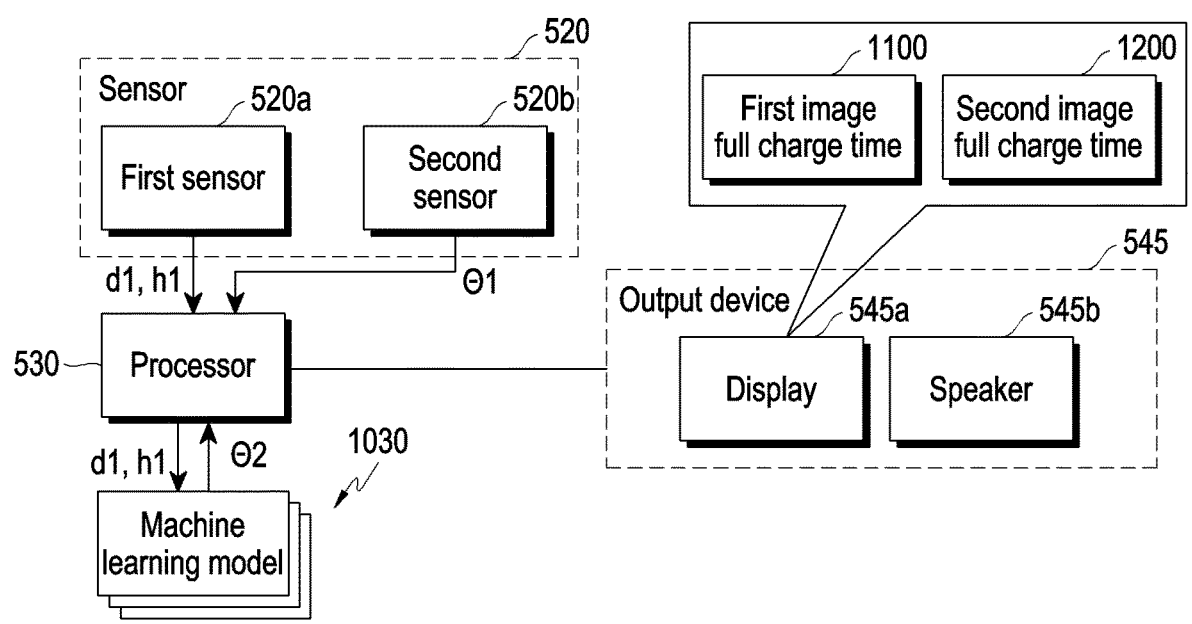
FIG. 10B is a view illustrating an example of the operation of identifying a reference value of a parameter to be currently changed using test data of a wireless power receiving device according to various embodiments.

FIG. 10A is a view illustrating an example of the operation of identifying a reference value of an attribute to be currently changed using test data of a wireless power receiving device 103 according to various embodiments. FIG. 10B is a view illustrating an example of the operation of identifying a reference value of an attribute to be currently changed using test data of a wireless power receiving device 103 according to various embodiments.

According to various embodiments, in operation 901, the wireless power receiving device 103 may receive (or control the wireless power receiving device 103 (e.g., a switch) to wirelessly receive power) wireless power from the wireless power transmitting device 101 through the resonance circuit 401. For example, when the wireless power receiving device 103 is disposed within a charging range of the wireless power transmitting device 101, the wireless power receiving device 103 may receive wireless power from the wireless power transmitting device 101 and charge the battery 511. In operation 901 of the wireless power receiving device 103, as described above in connection with operation 601, wireless power may be received based on the A4WP standard (or AFA standard) or, without being limited to those described, an electromagnetic scheme or WPC standard (or Qi standard). No duplicate description is given.

According to various embodiments, the wireless power receiving device 103 may identify the charging efficiency corresponding to the received wireless power in operation 903 and, in operation 905, determine whether the charging efficiency is less than the threshold. Operations 903 and 905 of the wireless power receiving device 103 may be performed like operations 703 and 705 of the wireless power receiving device 103 as described above, and no duplicate description thereof is given below.

According to various embodiments, in case the charging efficiency is less than the threshold, the wireless power receiving device 103 may identify the value for each of the plurality of attributes of the electronic device associated with charging efficiency in operation 907 and, in operation 909, identify a specific attribute to be changed and a reference value of the specific attribute based on pre-stored information and the identified value of each of the plurality of attributes. For example, in case the charging efficiency is less than the threshold, the wireless power receiving device 103 may obtain a value associated with each of the plurality of attributes (e.g., relative distance, folding angle, relative height, angle of rotation, or folding form (or sliding form)) associated with charging efficiency using a sensor (e.g., the first sensor 520a, the second sensor 520b, or the third sensor (not illustrated)). As another example, the wireless power receiving device 103 may receive, from the wireless power transmitting device 101, the value associated with each of the plurality of attributes (e.g., relative distance, folding angle, relative height, angle of rotation, or folding form (or sliding form)) associated with charging efficiency. The wireless power receiving device 103 may identify a specific attribute to be changed from among the plurality of attributes. As described above, the wireless power receiving device 103 may identify the specific attribute to be changed based on the priority for each of the plurality of attributes, and thus a duplicate description is omitted. The wireless power receiving device 103 may identify the value to which the specific attribute is to be changed (hereinafter, reference value) based on the current value of each of the other attributes than the specific attribute identified as to be changed among the plurality of attributes and information pre-stored in the memory (e.g., test data or artificial intelligence models described below). Hereinafter, an example of the operation of identifying a value to which a specific attribute is to be changed (hereinafter, reference value) based on pre-stored information of the wireless power receiving device 103 is described with reference to FIGS. 10A and 10B.

According to various embodiments, the wireless power receiving device 103 may identify the reference value of the specific attribute based on the current value of each of the other attributes than the specific attribute among the plurality of attributes and test data 1000 pre-stored in the memory 540. For example, referring to FIG. 10A, the value of each of the plurality of attributes exhibiting the highest charging efficiency may be pre-stored, as test data, in the memory. As an example, in a state in which various values are set for each of the plurality of attributes, a test for detecting the charging efficiency between the wireless power transmitting device 101 and the wireless power receiving device 103 may be performed. In this case, referring to FIG. 10A, a test for detecting charging efficiencies may be performed while changing the value of the specific attribute 1010, with the other attributes (e.g., relative distance and relative height) 1020 than the specific attribute (e.g., folding angle) 1010 remaining the same. Among the detected charging efficiencies, the highest charging efficiency may be identified, and the value of the specific attribute 1010 (e.g., folding angle) corresponding to the highest charging efficiency and the values of the other attributes 1020 (e.g., relative distance and relative height) may be associated with each other and stored, as test data 1000a, 1000b, and 1000c, in the memory 540. The value of the specific attribute (e.g., folding angle) corresponding to the highest charging efficiency may be defined as a reference value. The operation of storing test data 1010 exhibiting the highest charging efficiency may also be performed on each of the other attributes as described above. The above-described example is an example, and the test may be performed in various ways and the test data 1000 may be stored. Accordingly, the wireless power receiving device 103 (e.g., the processor 530) may compare the current values (e.g., first distance d1 and first height h1) of the other attributes 1020 (e.g., distance and height) than the specific attribute 1010 (e.g., folding angle) obtained using sensors (e.g., the first sensor 520a, the second sensor 520b, and the third sensor (not illustrated)) with the plurality of test data 1000a, 1000b, and 1000c stored in the memory 540 and identify corresponding test data 1000a. As a result, the wireless power receiving device 103 may identify the reference value (e.g., 60 degrees) of the specific attribute 1010 (e.g., relative angle) of the identified test data 1000a.

According to various embodiments, the wireless power receiving device 103 may identify the reference value of the specific attribute based on the current value of each of the other attributes than the specific attribute among the plurality of attributes and artificial intelligence models 1030 pre-stored in the memory 540. For example, referring to FIG. 10B, a plurality of artificial intelligence models 1030 being implemented to output the reference value of the specific attribute (e.g., folding angle) corresponding to the highest charging efficiency may be previously stored in the memory 540. For example, each of the plurality of artificial intelligence models 540 may include be a model generated as a result of learning based on a learning algorithm (e.g., supervised learning, unsupervised learning, semi-supervised learning, or reinforcement learning) algorithm) using the test data 1000 including the respective values of the plurality of attributes corresponding to the highest charging efficiency described above in connection with FIG. 10A, as training data. Thus, the generated models 1030 may be models based on, as an artificial neural network, a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. As an example, an artificial intelligence model may be a model generated as a result of performing learning using values of a specific attribute (e.g., folding angle) corresponding to the highest charging efficiency as output data and the other attributes (e.g., relative distance and relative height) as input data. Accordingly, an artificial intelligence model may be configured to output the value of the specific attribute (e.g., folding angle) exhibiting the highest charging efficiency based on receiving the values of the remaining attributes (e.g., relative distance and relative height). Learning may also be conducted on the remaining attributes, generating a plurality of artificial intelligence models each implemented to output the value corresponding to the highest charging efficiency of one attribute among the plurality of attributes. Accordingly, the wireless power receiving device 103 (e.g., the processor 530) may identify a second angle (e.g., 60 degrees) which is the reference value of the specific attribute (e.g., relative angle) output by inputting the current values (e.g., the first distance d1 and the first height h1) of the other attributes (e.g., relative distance and relative height) than the value (e.g., the first angle) of the specific attribute (e.g., angle) obtained using sensors (e.g., the first sensor 520a, second sensor 520b, and third sensor (not illustrated)) to the plurality of artificial intelligence models stored in the memory 540. In this case, the wireless power receiving device 103 (e.g., the processor 530) may perform computation based on the plurality of artificial intelligence models based on another computation device (e.g., at least one of an AP (not illustrated), a CPU (not illustrated), the GPU 221, the DPU 223, or an NPU (not illustrated)).

According to various embodiments, in case the charging efficiency is less than a threshold, the wireless power receiving device 103 may provide content based on the reference value of the specific attribute to be changed in operation 911. For example, the wireless power receiving device 103 may generate content for changing the specific attribute (e.g., folding angle) as described above and output the generated content through the output device 545 (e.g., the display 545a or the speaker 545b). The content may include information 1010 (e.g., a first image corresponding to the current value of the folding angle and the full charge time) about the current state and information 1020 (e.g., a second image corresponding to the reference value of the folding angle and the full charge time) about the optimal state. Since operation 911 of the wireless power receiving device 103 may be performed like operation 711 of the wireless power receiving device 103 described above, no duplicate description is given.

Hereinafter, examples of operations of the wireless power receiving device 103 and the wireless power transmitting device 101 according to various embodiments are described.

According to various embodiments, the wireless power receiving device 103 may initiate charging based on a charging function control signal (e.g., PRU control) received from the wireless power receiving device 103. In this case, the wireless power receiving device 103 may provide content for changing the attribute in case the charging efficiency corresponding to wireless power received after charging begins is less than the threshold, based on information for providing content included in the charging function control signal (e.g., PRU control). The wireless power receiving device 103 may transmit a signal (e.g., PRU dynamic) for reporting in association with wireless charging after the charging efficiency is at least equal to the threshold based on providing the content and include information indicating that providing the content is complete in the signal. In the negotiation step for wireless charging with the wireless power receiving device 103, the wireless power transmitting device 101 may receive information about the type of the wireless power receiving device 103 (e.g., foldable electronic device or rollable electronic device) and may identify that the type of the wireless power receiving device 103 is a type of electronic device for which the attribute associated with charging efficiency is changeable. Based on the identification, the wireless power transmitting device 101 may obtain values for at least some of the attributes associated with charging efficiency using the sensor 570 and transmit the obtained values to the wireless power receiving device 103. Further, when transmitting a charging function control signal (e.g., PRU control), the wireless power transmitting device 101 may include, in the charging function control signal, information indicating that to provide content for changing the attribute is needed. Further, when the signal (e.g., PRU dynamic) for reporting in association with wireless charging received includes information indicating that to provide content (or that it is complete to provide content) is not needed, the wireless power transmitting device 101 may perform the operation of controlling charging. Thus, before the wireless power receiving device 103 provides content for increasing charging efficiency, the charging control operation of the wireless power transmitting device 101 may be refrained.

Figure 11:
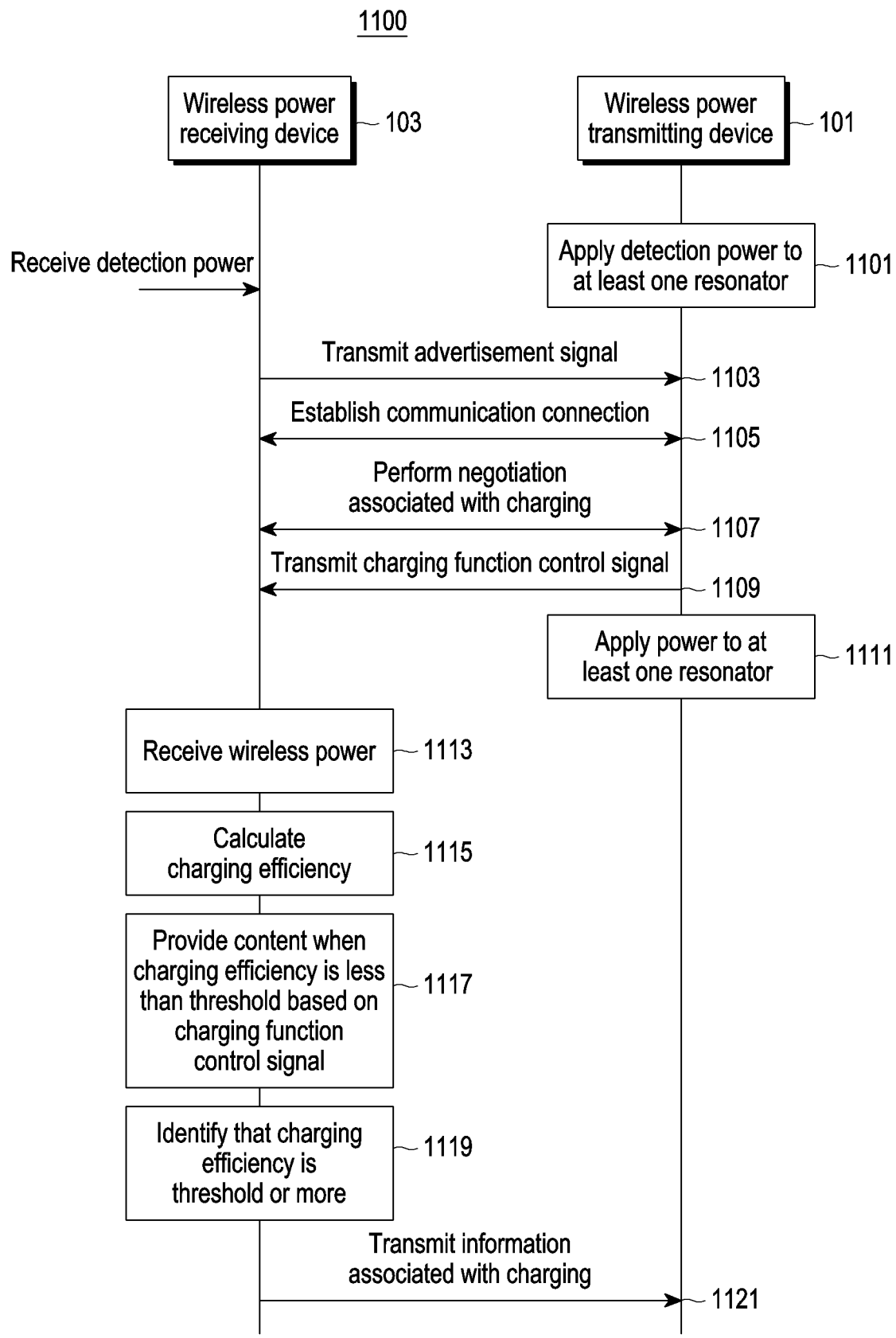
FIG. 11 is a signal flow diagram illustrating an example of the operation of a wireless power transmitting device and a wireless power receiving device according to various embodiments.

FIG. 11 is a signal flow diagram 1100 illustrating an example of operations of a wireless power transmitting device 101 and a wireless power receiving device 103 according to various embodiments. The operations illustrated in FIG. 11 are not limited to the illustrated order but may rather be performed in other various orders. According to various embodiments, more or less operations than those of FIG. 11 may be performed.

According to various embodiments, in operation 1101, the wireless power transmitting device 101 may apply detection power to at least one resonator. For example, according to the A4WP standard (or AFA standard), the wireless power transmitting device 101 may periodically apply power (e.g., short beacon) for detecting a load variation to the resonance circuit 560a (e.g., the resonance circuit 201 or 301 described above in connection with FIGS. 2 and 3). When a load variation is detected based on the power for detecting a load variation, the wireless power transmitting device 101 may apply power (e.g., long beacon) for driving the communication circuit 512 of the wireless power receiving device 103 to the resonance circuit 560a (e.g., the resonance circuit 201 or 301 described above in connection with FIGS. 2 and 3). The application of the power may be performed based on the "description of the operation in power save mode of the PTU" of the A4WP standard (or the AFA standard), but is not limited thereto.

According to various embodiments, the wireless power receiving device 103 may transmit an advertisement signal to the wireless power transmitting device 101 in operation 1103 and may establish a communication connection with the wireless power transmitting device 101 in operation 1105. When the wireless power receiving device 103 is placed within the charging range, the wireless power receiving device 103 (e.g., the communication circuit 512) may receive wireless power from the wireless power transmitting device 101. Based on the received wireless power, the communication circuit 512 may be activated (e.g., powered-up). The wireless power receiving device 103 may transmit an advertisement signal to the wireless power transmitting device 101 through the activated communication circuit 512. The wireless power transmitting device 101 may transmit a request message for a communication connection to the wireless power receiving device 103 based on the received advertisement signal. The wireless power transmitting device 101 and the wireless power receiving device 103 may establish a communication connection (e.g., BLE communication connection) based on the request message.

According to various embodiments, the wireless power receiving device 103 and/or the wireless power transmitting device 101 may perform a negotiation operation associated with charging in operation 1107. For example, the wireless power receiving device 103 and the wireless power transmitting device 101 may transmit and/or receive information (e.g., PRU static parameter) associated with wireless charging. The information associated with wireless charging may include information about the wireless power receiving device 103 (e.g., type or category), information associated with charging power (e.g., PRECT_MAX), and information associated with the rectifier voltage (e.g., VRECT_MIN_STATIC, VRECT_HIHG_STATIC) but, without being limited thereto, may further include the "PRU static parameter" set forth in the A4WP standard (or AFA standard). When the wireless power receiving device 103 transmits information about the wireless power receiving device 103 in the negotiation process, it may include, in the information about the wireless power receiving device 103, information indicating the type of the electronic device (e.g., foldable electronic device or rollable electronic device) whose attribute (e.g., distance, folding angle, height, angle of rotation, or folding form (or sliding form)) associated with charging efficiency is changeable. However, without being limited to those described, the wireless power receiving device 103 may include the information indicating the type of the electronic device (e.g., foldable electronic device or rollable electronic device) in a signal transmitted at other times, not in the negotiation step. Based on reception of the information about the wireless power receiving device 103, the wireless power transmitting device 101 may identify the type of the wireless power receiving device 103 and identify that the identified type of the wireless power receiving device 103 is a type of electronic device whose attribute (e.g., distance, folding angle, height, angle of rotation, or folding form (or sliding form) associated with charging efficiency is changeable. The wireless power transmitting device 101 may pre-store the information about the type of the electronic device whose attribute is changeable in the memory (not illustrated) and, if the pre-stored information corresponds to the identified type of the wireless power receiving device 103, identify that the type of the wireless power receiving device 103 is a type of electronic device whose attribute is changeable.

According to various embodiments, the wireless power transmitting device 101 may obtain values for at least some attribute among the attributes using the sensor 570 based on identifying that the type of the wireless power receiving device 103 is a type of electronic device whose attribute (e.g., distance, folding angle, height, angle of rotation, or folding form (or sliding form) associated with charging efficiency is changeable. For example, the wireless power transmitting device 101 may obtain information about the position, direction, and/or height of the wireless power receiving device 103 using the second sensor (e.g., UWB communication circuit or coils arranged in array). The wireless power transmitting device 101 may include the values of at least some of the attributes in a message (e.g., PRU static or PRU dynamic) transmitted to the wireless power receiving device 103. Accordingly, the wireless power receiving device 103 may identify the values of at least some of the attributes. However, without being limited to those described, the wireless power receiving device 103 may obtain the values for at least some attribute among the attributes using the sensor 520 without the operation of receiving the values for at least some attribute among the attributes from the wireless power transmitting device 101.

According to various embodiments, the wireless power transmitting device 101 may transmit a charging function control signal to the wireless power receiving device 103 in operation 1109 and may apply power to at least one resonator in operation 1111. For example, when the negotiation is completed, the wireless power transmitting device 101 may transmit a charging function control signal (e.g., PRU control) to the wireless power receiving device 103 through the charging circuit and may apply power for wireless power transmission to the resonance circuit 401. Based on the reception of the charging function control signal, the wireless power receiving device 103 may electrically connect (e.g., switch control) the rectifier 510b, the charger 510d, and the battery 511 to charge the battery 511. When transmitting the charging function control signal (e.g., PRU control), the wireless power transmitting device 101 may include, in the charging function control signal, information triggering (or instructing) to allow the wireless power receiving device 103 to provide content (e.g., the content illustrated in FIG. 8) for changing attribute. For example, the information triggering (or instructing) to provide the content (e.g., the content illustrated in FIG. 9) may be included according to what is described in the "User indication" set forth in the A4WP standard (or AFA standard). The wireless power transmitting device 101 may include the information triggering (or instructing) to provide the content (e.g., the content illustrated in FIG. 8) based on the type of the wireless power receiving device 103 being a type of electronic device (e.g., foldable electronic device or rollable electronic device) whose attribute is changeable. The information triggering to provide the content may include a bit value indicating that the wireless power receiving device 103 needs to perform the operation of providing content. However, without being limited to those described, the wireless power transmitting device 101 may include the information triggering (or instructing) to provide the content (e.g., the content illustrated in FIG. 8) for changing attribute in a signal transmitted at various times, not the charging function control signal (e.g., PRU control).

According to various embodiments, in operation 1113, the wireless power receiving device 103 may receive wireless power (or control the wireless power receiving device 103 (e.g., a switch) to wirelessly receive power), calculate the charging efficiency in operation 1115 and, if the charging efficiency is less than a threshold based on the charging function control signal, provide content in operation 1117. For example, in case the charging efficiency corresponding to the received wireless power is less than the threshold, the wireless power receiving device 103 may output content for changing attribute through the output device 545 (e.g., a display or speaker) based on the information triggering (or instructing) to provide the content (e.g., the content illustrated in FIG. 8) received from the wireless power transmitting device 101. The operation of providing the content by the wireless power receiving device 103 may be performed as described above, and a detailed description thereof is omitted.

According to various embodiments, the wireless power receiving device 103 may refrain from the operation of transmitting a charging-associated reporting message (e.g., PRU dynamic message) until before the charging efficiency exceeds the threshold according to providing the content, but is not limited thereto. The refraining operation may be performed based on the information triggering (or instructing) to provide the content (e.g., the content illustrated in FIG. 8) received from the wireless power transmitting device 101.

According to various embodiments, in operation 1119, the wireless power receiving device 103 may identify that the charging efficiency is greater than or equal to the threshold and, in operation 1121, transmit a reporting message associated with charging to the wireless power transmitting device 101. For example, the wireless power receiving device 103 may perform the operation of transmitting a charging-associated reporting message (e.g., PRU dynamic message) in case the charging efficiency exceeds the threshold according to providing the content. The charging-associated reporting message (e.g., PRU dynamic message) may include information about rectifier voltage $V_{RECT}$ and information about rectifier current $I_{RECT}$. In this case, the wireless power receiving device 103 may further include information indicating that provision of content is not required (or provision of content is complete) in the charging-associated reporting message (e.g., PRU dynamic message). Based on the information indicating that the provision of content is not required (or provision of content is complete) included in the received charging-associated reporting message (e.g., PRU dynamic message), the wireless power transmitting device 101 may perform at least one control operation (e.g., controlling the magnitude of the power applied to the resonance circuit 401) based on information included in the charging-associated reporting message (e.g., PRU dynamic message) (e.g., information about rectifier voltage $V_{RECT}$ and information about rectifier current $I_{RECT}$). For example, the wireless power transmitting device 101 may control the characteristics of the magnetic field formed in the resonance circuit 401 based on the reception of the charging-associated reporting message (e.g., PRU dynamic message). The wireless power transmitting device 101 may adjust the strength and/or phase of the power (e.g., current) applied to the resonance circuit 401 and control the strength and/or direction of the magnetic field formed in the resonance circuit 401, controlling the charging efficiency of the wireless power receiving device 103. Further, other unmentioned control operations may be performed as set forth in the A4WP standard (or AFA standard) but are not limited thereto.

Hereinafter, an example of the operation of the wireless power transmitting device 101 according to various embodiments is described.

According to various embodiment, in the negotiation step for wireless charging with the wireless power receiving device 103, the wireless power transmitting device 101 may receive information about the type of the wireless power receiving device 103 (e.g., foldable electronic device or rollable electronic device) and may identify that the type of the wireless power receiving device 103 is a type of electronic device for which the attribute associated with charging efficiency is changeable. When transmitting a charging function control signal (e.g., PRU control), the wireless power transmitting device 101 may include, in the charging function control signal, information indicating that to provide content for changing the attribute is needed. Further, when the signal (e.g., PRU dynamic) for reporting in association with wireless charging received includes information indicating that to provide content (or that it is complete to provide content) is not needed, the wireless power transmitting device 101 may perform the operation of controlling charging.

Figure 12:
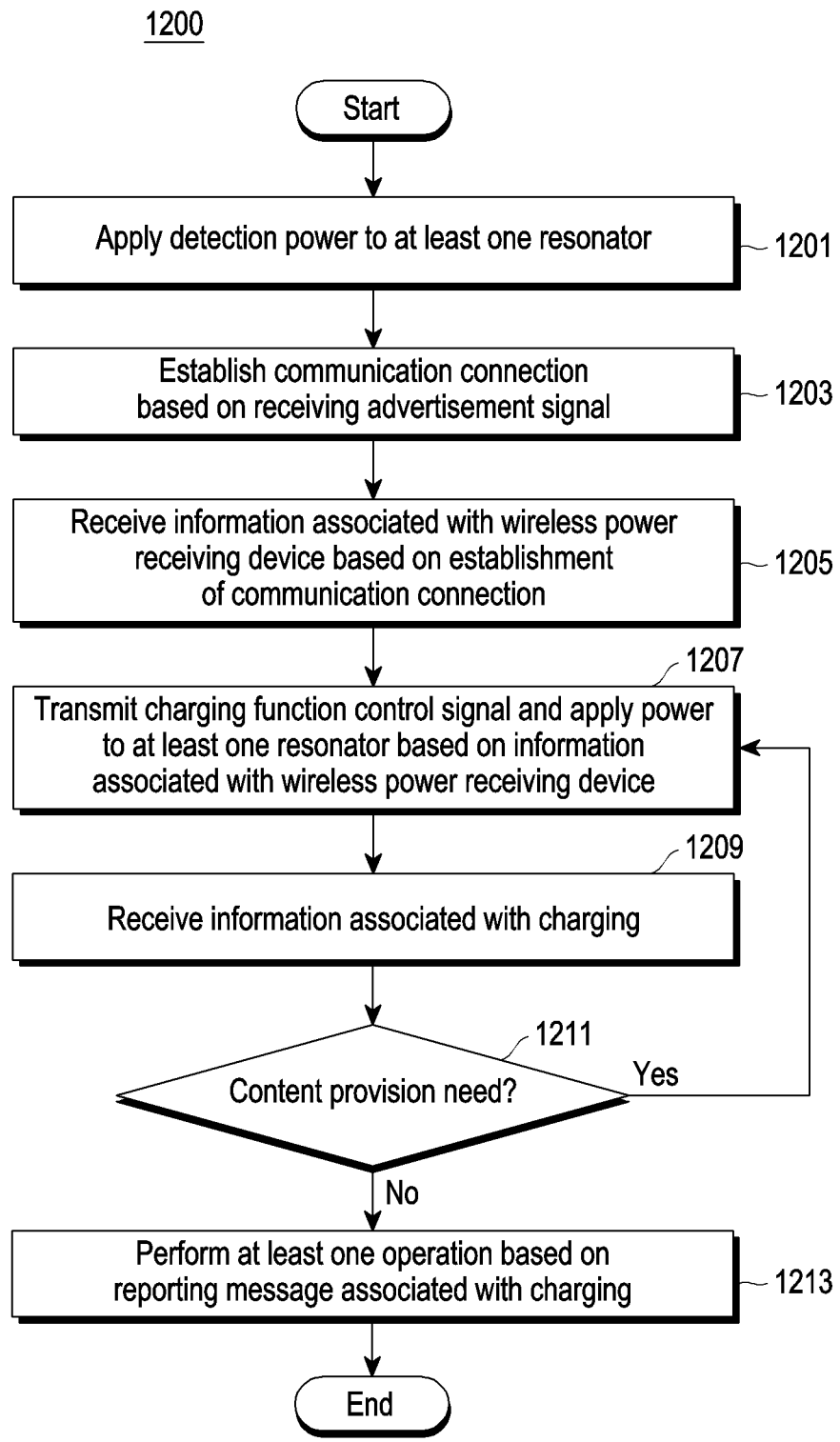
FIG. 12 is a flowchart illustrating an example of the operation of a wireless power transmitting device according to various embodiments.

FIG. 12 is a flowchart 1200 illustrating an example of an operation of a wireless power transmitting device 101 according to various embodiments. The operations illustrated in FIG. 12 are not limited to the illustrated order but may rather be performed in other various orders. According to various embodiments, more or less operations than those of FIG. 12 may be performed.

According to various embodiments, in operation 1201, the wireless power transmitting device 101 may apply detection power to at least one resonator. For example, as described above in connection with operation 1101, the wireless power transmitting device 101 may periodically apply power (e.g., short beacon) for detecting a load variation to the resonance circuit 560a (e.g., the resonance circuit 201 or 301 described above in connection with FIGS. 2 and 3).

According to various embodiments, in operation 1203, the wireless power transmitting device 101 may establish a communication connection based on reception of the advertisement signal and, in operation 1205, receive information associated with the wireless power receiving device 103 based on the establishment of the communication connection. The wireless power transmitting device 101 may transmit a request message for a communication connection to the wireless power receiving device 103 based on the advertisement signal received from the wireless power receiving device. The wireless power transmitting device 101 and the wireless power receiving device 103 may establish a communication connection (e.g., BLE communication connection) based on the request message. While performing the charging-associated negotiation operation, the wireless power transmitting device 101 may receive, from the wireless power receiving device 103, information (e.g., type or category) about the wireless power receiving device 103, information associated with charging power (e.g., PRECT_MAX), and information associated with the rectifier voltage (e.g., VRECT_MIN_STATIC, VRECT_HIHG_STATIC). Based on reception of the information about the wireless power receiving device 103, the wireless power transmitting device 101 may identify the type of the wireless power receiving device 103 and identify that the identified type of the electronic device is a type of electronic device whose attribute (e.g., distance, folding angle, height, angle of rotation, or folding form (or sliding form) associated with charging efficiency is changeable.

According to various embodiments, in operation 1207, the wireless power transmitting device 101 may transmit a charging function control signal based on the information associated with the wireless power receiving device 103 and apply power to at least one resonator and, in operation 1209, receive a charging-associated reporting message. When the negotiation is completed, the wireless power transmitting device 101 may transmit a charging function control signal (e.g., PRU control) to the wireless power receiving device 103 through the charging circuit and may apply power for wireless power transmission to the resonance circuit 401. When transmitting the charging function control signal (e.g., PRU control), the wireless power transmitting device 101 may include, in the charging function control signal, information triggering (or instructing) to allow the wireless power receiving device 103 to provide content (e.g., the content illustrated in FIG. 8) for changing attribute. Thereafter, the wireless power transmitting device 101 may receive the charging-associated reporting message (e.g., PRU dynamic message) from the wireless power receiving device 103.

According to various embodiments, in operation 1211, the wireless power transmitting device 101 may determine whether provision of content by the wireless power receiving device 103 is needed and, if provision of content is not needed, perform at least one operation based on the charging-associated reporting message in operation 1213. The wireless power transmitting device 101 may identify whether the received charging-associated reporting message (e.g., PRU dynamic message) includes information indicating that the provision of content is not needed (or provision of content is complete) and, if the information is included, determine that the provision of content is not needed while, if the information is not included, determining that the provision of content is needed. Based on determining that the provision of content is not needed, the wireless power transmitting device 101 may perform at least one control operation (e.g., controlling the magnitude of the power applied to the resonance circuit 401) based on information included in the charging-associated reporting message (e.g., PRU dynamic message) (e.g., information about rectifier voltage $V_{RECT}$ and information about rectifier current $I_{RECT}$).

Examples of an operation for providing content to change values per category of a plurality of attributes associated with charging efficiency of the wireless power transmitting device described above are described below.

Hereinafter, an example of an operation for providing content to change values per category of a plurality of attributes associated with charging efficiency of the wireless power transmitting device 101 described above is described.

Hereinafter, an example of the operation of the wireless power transmitting device 101 according to various embodiments is described.

According to various embodiments, the wireless power receiving device 103 implemented as a foldable electronic device or rollable electronic device may provide content for changing relative positions between housings in case the charging efficiency is less than a threshold.

Figure 13:
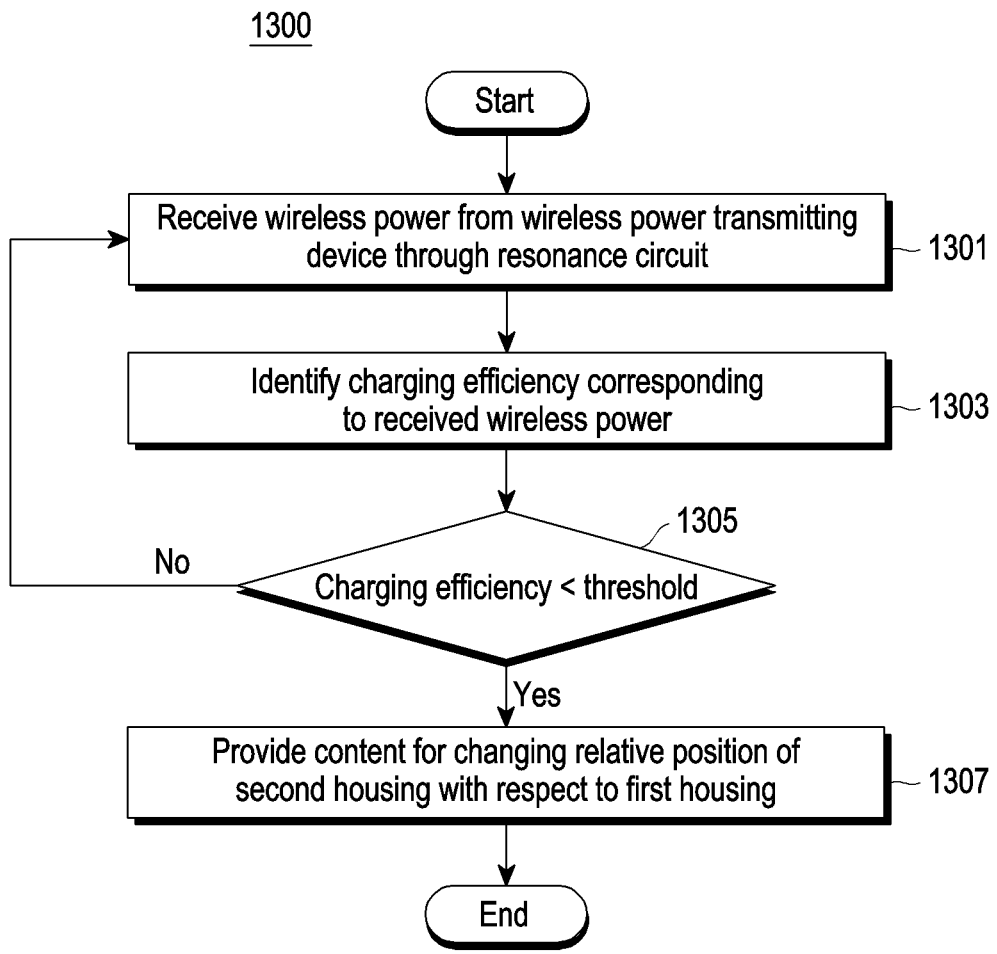
FIG. 13 is a flowchart illustrating an example of the operation of a wireless power receiving device according to various embodiments.

FIG. 13 is a flowchart 1300 illustrating an example of an operation of a wireless power receiving device 103 according to various embodiments. The operations illustrated in FIG. 13 are not limited to the illustrated order but may rather be performed in other various orders. According to various embodiments, more or less operations than those of FIG. 13 may be performed.

According to various embodiments, in operation 1301, the wireless power receiving device 103 may receive (or control the wireless power receiving device 103 (e.g., a switch) to wirelessly receive power) wireless power from the wireless power transmitting device 101 through the resonance circuit 401. For example, when the wireless power receiving device 103 is disposed within a charging range of the wireless power transmitting device 101, the wireless power receiving device 103 may receive wireless power from the wireless power transmitting device 101 and charge the battery 511. In operation 1301 of the wireless power receiving device 103, as described above in connection with operation 701, wireless power may be received based on the A4WP standard (or AFA standard) or, without being limited to those described, an electromagnetic scheme or WPC standard (or Qi standard). No duplicate description is given.

According to various embodiments, the wireless power receiving device 103 may identify the charging efficiency corresponding to the received wireless power in operation 1303 and, in operation 1305, determine whether the identified charging efficiency is less than the threshold. Operations 1303 and 1305 of the wireless power receiving device 103 may be performed like operations 703 and 705 of the wireless power receiving device 103 as described above, and no duplicate description thereof is given below.

According to various embodiments, in case the identified charging efficiency is less than the threshold, the wireless power receiving device 103 may provide content for changing a relative position of the second housing with respect to the first housing in operation 1307. For example, the wireless power receiving device 103 may perform the operation of providing content for changing the relative position of the second housing with respect to the first housing as at least part of the operation of providing content for changing an attribute among a plurality of attributes. The relative position of the second housing with respect to the first housing may include a folding angle, folding form, sliding distance, and sliding form. The wireless power receiving device 103 may generate content for changing the attribute associated with the relative positions between the housings among the plurality of attributes as described above, based on the wireless power receiving device 103 being a foldable electronic device and rollable electronic device in which the relative positions between the housings are changeable. The wireless power receiving device 103 may identify an attribute (e.g., folding angle, folding form, sliding distance, or sliding form) associated with the relative position between the housings, as an attribute to be changed, based on performing the operation of identifying the attribute to be changed among the plurality of attributes as described above. As an example, the foldable electronic device may determine the folding angle or folding form as the attribute to be changed. As another example, the rollable electronic device may determine the sliding distance or sliding form as the attribute to be changed. The wireless power receiving device 103 may identify the current value for the attribute (e.g., folding angle, folding form, sliding distance, or sliding form) using a sensor (e.g., the first sensor 520a, the second sensor 520b, or the third sensor (not illustrated)) and provide content (e.g., output through the output device 545) based on the identified current value and a pre-stored reference value for the attribute. The operation of providing content by the wireless power receiving device 103 may be performed like operations 711 and 907 to 911 of the wireless power receiving device 103 as described above, and no duplicate description thereof is given below.

Meanwhile, according to various embodiments, if the identified charging efficiency is greater than or equal to the threshold, the wireless power receiving device 103 may continue to receive wireless power and transmit the received charging-associated information (e.g., PRU dynamic) to the wireless power transmitting device 101.

Hereinafter, an example of the operation of the wireless power transmitting device 101 according to various embodiments is described.

According to various embodiments, the wireless power receiving device 103 implemented as a foldable electronic device or rollable electronic device may identify the current value of the attribute (e.g., folding angle, folding form, sliding distance, or sliding form) associated with the relative position between the housings in case the charging efficiency is less than the threshold and provide content for changing the attribute associated with the relative position between the housings based on identifying the current value.

Figure 14:
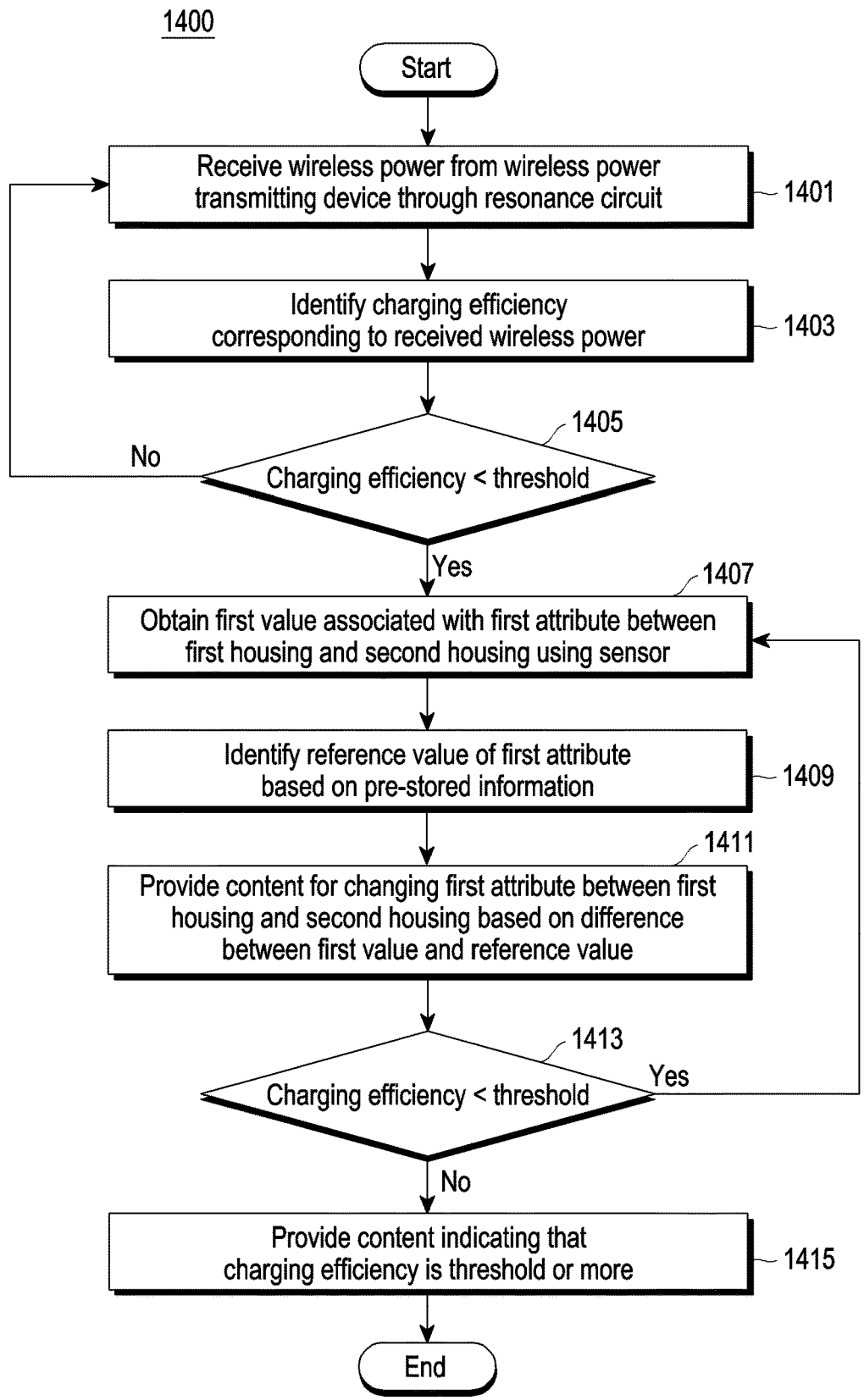
FIG. 14 is a flowchart illustrating an example of the operation of a wireless power receiving device according to various embodiments.

FIG. 14 is a flowchart 1400 illustrating an example of an operation of a wireless power receiving device 103 according to various embodiments. The operations illustrated in FIG. 14 are not limited to the illustrated order but may rather be performed in other various orders. According to various embodiments, more or less operations than those of FIG. 14 may be performed.

Figure 15A:
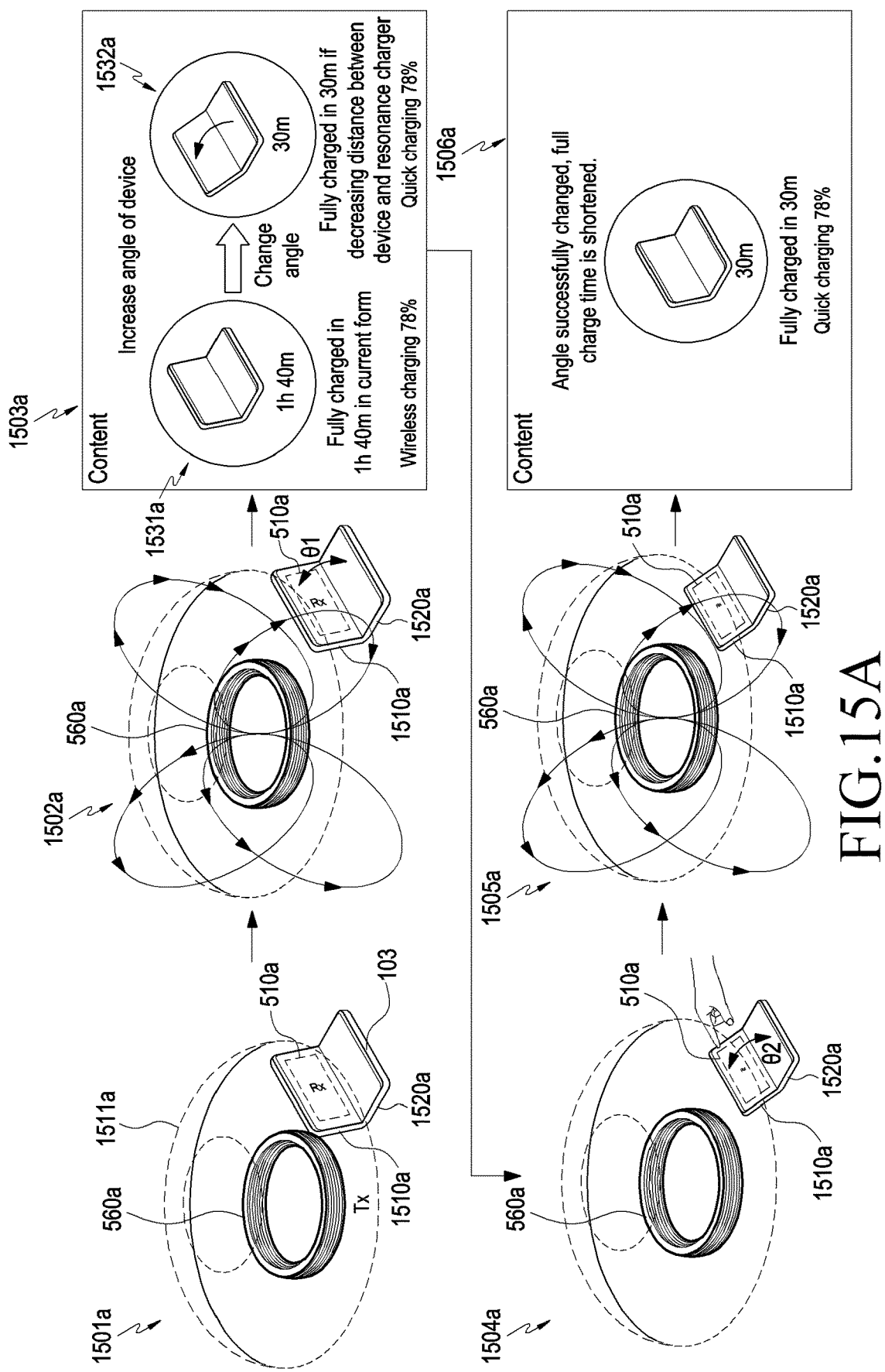
FIG. 15A is a view illustrating an example of the operation of providing content for changing the folding angle of a wireless power receiving device according to various embodiments.
Figure 15B:
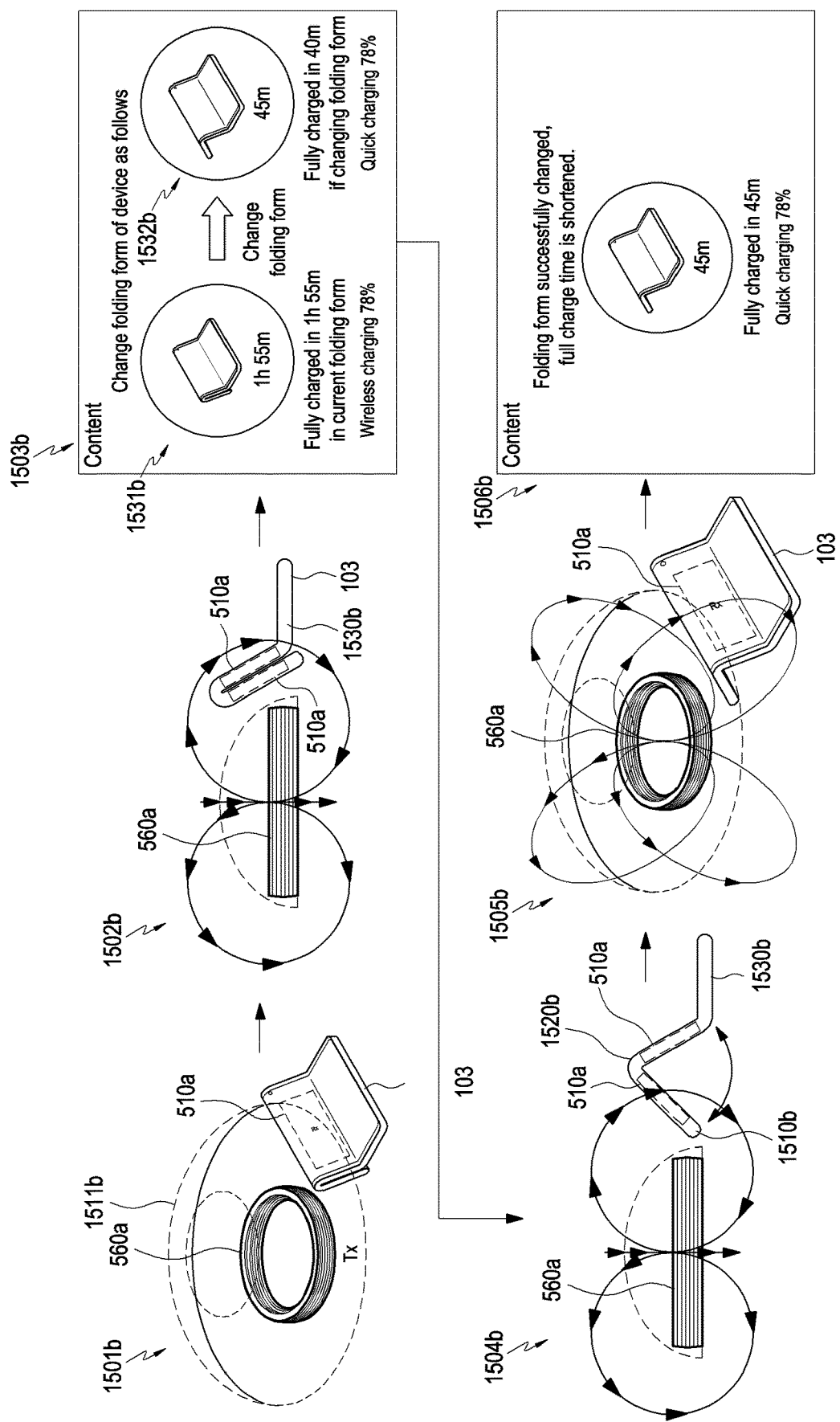
FIG. 15B is a view illustrating an example of the operation of providing content for changing the folding form of a wireless power receiving device according to various embodiments.
Figure 15C:
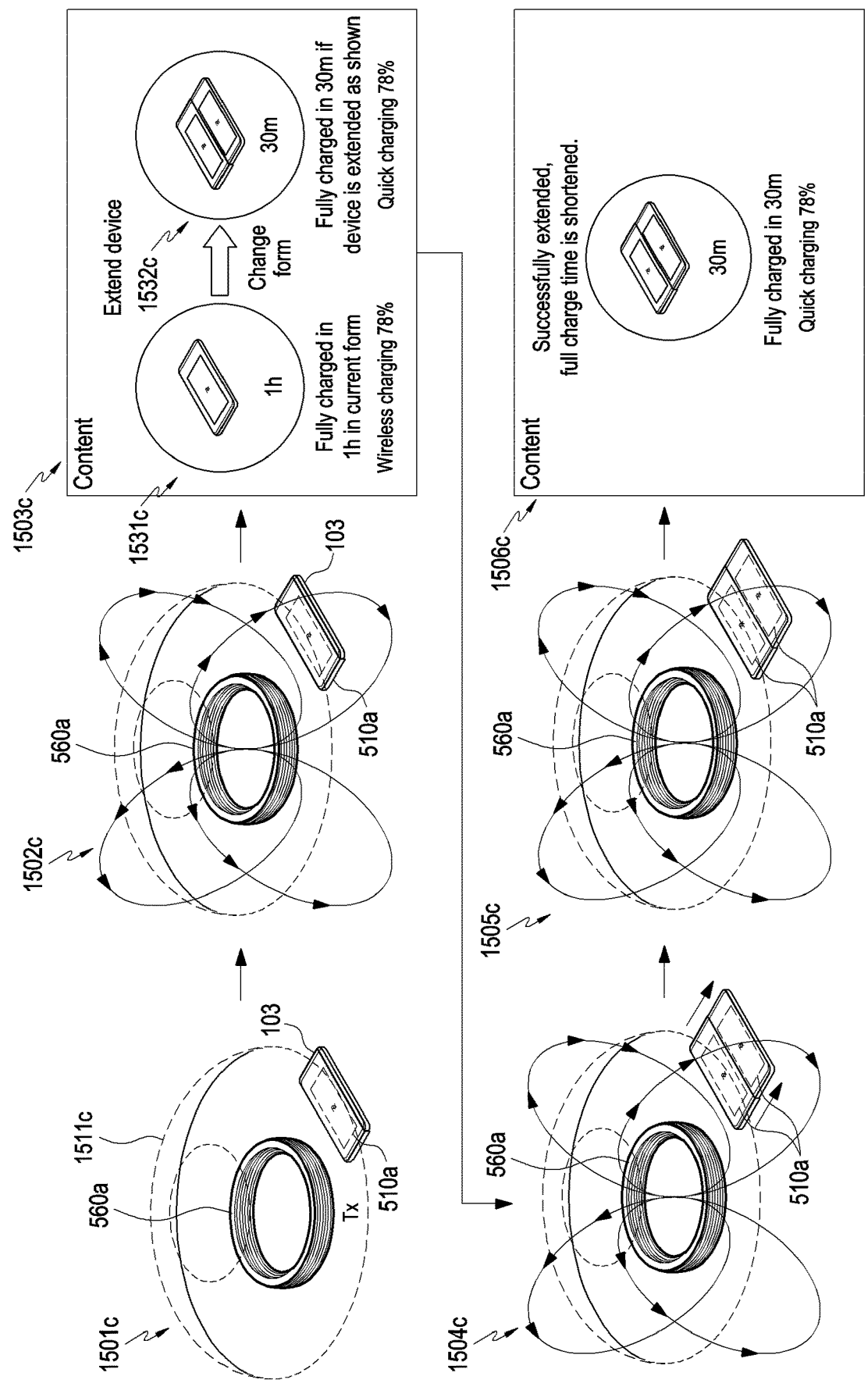
FIG. 15C is a view illustrating an example of the operation of providing content for changing the sliding form of a wireless power receiving device according to various embodiments.
Figure 15D:
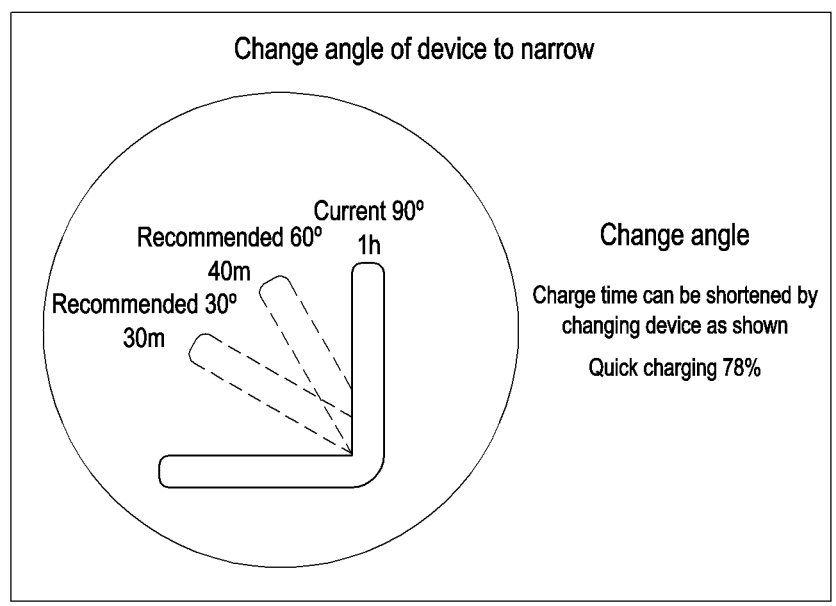
FIG. 15D is a view illustrating another example of content according to various embodiments.

FIG. 15A is a view illustrating an example of the operation of providing content for changing the folding angle of a wireless power receiving device 103 according to various embodiments. FIG. 15B is a view illustrating an example of the operation of providing content for changing the folding form of a wireless power receiving device 103 according to various embodiments. FIG. 15C is a view illustrating an example of the operation of providing content for changing the sliding form of a wireless power receiving device 103 according to various embodiments. FIG. 15D is a view illustrating another example of content according to various embodiments.

According to various embodiments, in operation 1401, the wireless power receiving device 103 may receive (or control the wireless power receiving device 103 (e.g., a switch) to wirelessly receive power) wireless power from the wireless power transmitting device 101 through the resonance circuit 401. For example, as illustrated in 1501a and 1502a in FIG. 15A, 1501b to 1502b in FIG. 15B, and 1501c and 1502c in FIG. 15C, if the wireless power receiving device 103 is positioned within the charging range 1511a, 1511b, or 1511c of the wireless power transmitting device 101, a current may be induced in the resonance circuit 510a of the wireless power receiving device 103 by the magnetic field formed in the resonance circuit 560a of the wireless power transmitting device 101. As described above, the wireless power receiving device 103 may electrically connect (e.g., switch control) the rectifier 510b, charger 510d, and battery 511, controlling to allow the battery 511 to be charged with the current received from the resonance circuit 510a.

According to various embodiments, the wireless power receiving device 103 may identify the charging efficiency corresponding to the received wireless power in operation 1403 and, in operation 1405, determine whether the charging efficiency is less than the threshold. Operations 1403 and 1405 of the wireless power receiving device 103 may be performed like operations 703 and 705 of the wireless power receiving device 103 as described above, and no duplicate description thereof is given below.

According to various embodiments, if the charging efficiency is less than the threshold, the wireless power receiving device 103 may obtain a first value associated with a first attribute between the first housing and the second housing using a sensor in operation 1407 and identify a reference value of the first attribute based on pre-stored information in operation 1409. For example, the wireless power receiving device 103 may identify the attribute associated with the relative position between the housings as the attribute to be changed among the plurality of attributes and may identify the value of the attribute (e.g., folding angle, folding form, sliding distance, or sliding form) associated with the relative position between the housings using a sensor (e.g., the first sensor, the second sensor, or the third sensor). The operation of determining the attribute to be changed among the plurality of attributes by the wireless power receiving device 103 may be performed as described above, and no duplicate description is thus given. For example, the wireless power receiving device 103 may determine the attribute (e.g., folding angle, folding form, sliding distance, or sliding form) associated with the relative position between the housings as the attribute to be changed, based on a result of performing the operation of determining the attribute to be changed based on priority for each of the plurality of attributes. As an example, the wireless power receiving device 103 may determine the attribute (e.g., folding angle, folding form, sliding distance, or sliding form) associated with the relative position between the housings, which has less priority, as the attribute to be changed, based on determining that other attributes (e.g., distance in Table 1) with higher priorities need not be changed.

In an embodiment, referring to FIG. 15A, the wireless power receiving device 103 may identify folding angle as the attribute to be changed and obtain the current value for the folding angle between the two housings 1510a and 1520a using the sensor 520 (e.g., the first sensor). The wireless power receiving device 103 may identify a reference value for the folding angle based on information stored in the memory 540 (e.g., the test data 1000 described in connection with FIG. 10A or the artificial intelligence models 1030 described in connection with FIG. 10B) as described above, based on determining folding angle as the attribute to be changed.

In another embodiment, referring to FIG. 15B, the wireless power receiving device 103 may identify folding form as the attribute to be changed among the plurality of attributes and obtain the current value for the folding form associated with three housings 1510b, 1520b, and 1530b (e.g., a value indicating that two housings 1510b and 1520b among the three housings 1510b, 1520b, and 1530b contact in the z-fold electronic device) using the sensor (e.g., the first sensor). Based on determining folding form as the attribute to be changed, the wireless power receiving device 103 may identify the reference value for the folding form (e.g., the value indicating that each of the three housings 1510b, 1520b, and 1530b does not contact in the z-fold electronic device) based on information stored in the memory 540 (e.g., the test data 1000 described in connection with FIG. 10A or the artificial intelligence models 1030 described in connection with FIG. 10B) as described above.

In another embodiment, referring to FIG. 15C, the wireless power receiving device 103 may identify sliding form as the attribute to be changed among the plurality of attributes and obtain the current value for the sliding form (e.g., a value indicating the closed form in which no slide is performed) using a sensor (e.g., the first sensor). As described above, the wireless power receiving device 103 may identify a reference value for the sliding form (e.g., a value indicating the open state in which a slide is performed) based on information stored in the memory 540 (e.g., the test data 1000 described in connection with FIG. 10A or the artificial intelligence models 1030 described in connection with FIG. 10B) as described above, based on determining sliding form as the attribute to be changed.

According to various embodiments, the wireless power receiving device 103 may identify a specific attribute to be changed among attributes (e.g., folding angle, folding form, sliding distance, or sliding form) associated with the relative position between the housings among the plurality of attributes based on the type of the wireless power receiving device 103 being a foldable electronic device or rollable electronic device. For example, the foldable electronic device may determine the attribute to be changed only from among folding angle and folding form. As another example, the rollable electronic device may determine the attribute to be changed only from among sliding distance and sliding form.

According to various embodiments, in operation 1411, the wireless power receiving device 103 may provide content for changing the first attribute between the first housing and the second housing based on the difference between the first value and the reference value. For example, the wireless power receiving device 103 may obtain content (e.g., screen) for changing the attribute (e.g., folding angle, folding form, or sliding form) and output it through the output device 545 (e.g., a display). For example, as illustrated in 1503a of FIG. 15A, 1503b of FIG. 15B, and 1503c of FIG. 15C, the screen may include information about the current state 1531a, 1531b, or 1531c, including an image corresponding to the value of the current attribute and the full charge time, information about the optimal state 1532a, 1532b, or 1532c, including an image corresponding to the reference value (i.e., the value to which it is to be changed) of the attribute (e.g., folding angle, folding form, or sliding form) and text for the full charge time according to a change in attribute, and text instructing to change the specific attribute (e.g., "change angle," "change form (e.g., folded form (or folding form) or sliding form)"). As another example, as illustrated in FIG. 15D, the wireless power receiving device 103 may provide information corresponding to a plurality of values between the current value and reference value of the attributes (e.g., information about a plurality of states between the current value of the folding angle and the reference value of the folding angle).

According to various embodiments, in operation 1413, the wireless power receiving device 103 may again identify whether the charging efficiency is less than the threshold and, unless the charging efficiency is less than the threshold (or equal to or greater than the threshold), provide content indicating that the charging efficiency is greater than or equal to the threshold in operation 1415. For example, based on the provision of content, the user may change the folding angle as illustrated in 1504a of FIG. 15A, change the folding form as illustrated in 1504b of FIG. 15B, or change the sliding form as illustrated in 1504c of FIG. 15C. Alternatively, without being limited to those described, the wireless power receiving device 103 may perform the operation of automatically changing the corresponding attribute (e.g., folding angle, folding form, or sliding form) based on a user input on the content (e.g., an input to allow a change in attribute). The wireless power receiving device 103 may again receive wireless power after the attribute is changed as illustrated in 1505a of FIG. 15A, 1505b of FIG. 15B, and 1505c of FIG. 15C and calculate the charging efficiency corresponding to the received wireless power. In case the recalculated charging efficiency is greater than or equal to the threshold, the wireless power receiving device 103 may provide content indicating that the charging efficiency is greater than or equal to the threshold as illustrated in 1506a of FIG. 15A, 1506b of FIG. 15B, and 1506c of FIG. 15C. For example, referring to 1506a of FIG. 15A, 1506b of FIG. 15B, and 1506c of FIG. 15C, the screen indicating that the charging efficiency is greater than or equal to the threshold may include an image corresponding to the reference value (i.e., the changed value) of the attribute (e.g., folding angle, folding form, or sliding form), text for the full charge time according to the change in attribute, and text indicating that the attribute is successfully changed (e.g., "angle successfully changed," or "form successfully changed").

Meanwhile, according to various embodiments, the wireless power receiving device 103 may again perform operations 1407 to 1411 in case the charging efficiency is less than the threshold, providing content for changing the attribute associated with the relative position between the housings. For example, as described above, the wireless power receiving device 103 may identify an attribute with a lower priority based on priorities different from the currently changed attribute and perform the operation of providing content based on the current value and reference value of the identified attribute with the lower priority.

Hereinafter, an example of the operation of the wireless power transmitting device 101 according to various embodiments is described.

According to various embodiments, the wireless power receiving device 103 may identify the current value of the attribute (e.g., distance, height, or angle) associated with the relative position of the wireless power receiving device 103 with respect to the wireless power transmitting device 101 in case the charging efficiency is less than the threshold and provide content for changing the attribute associated with the relative position based on identifying the current value.

Figure 16:
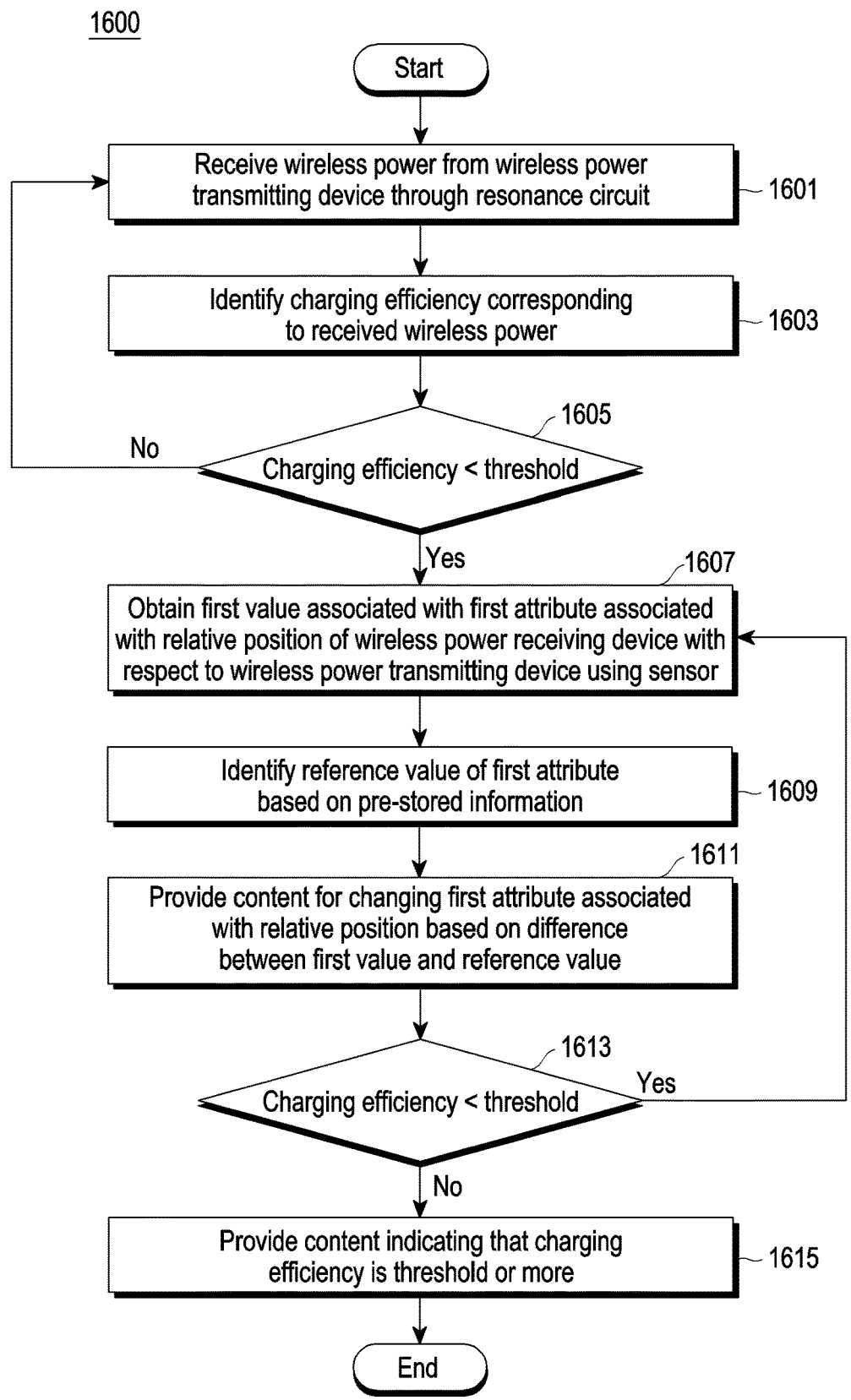
FIG. 16 is a flowchart illustrating an example of the operation of a wireless power receiving device according to various embodiments.

FIG. 16 is a flowchart 1600 illustrating an example of an operation of a wireless power receiving device 103 according to various embodiments. The operations illustrated in FIG. 16 are not limited to the illustrated order but may rather be performed in other various orders. According to various embodiments, more or less operations than those of FIG. 16 may be performed.

Figure 17A:
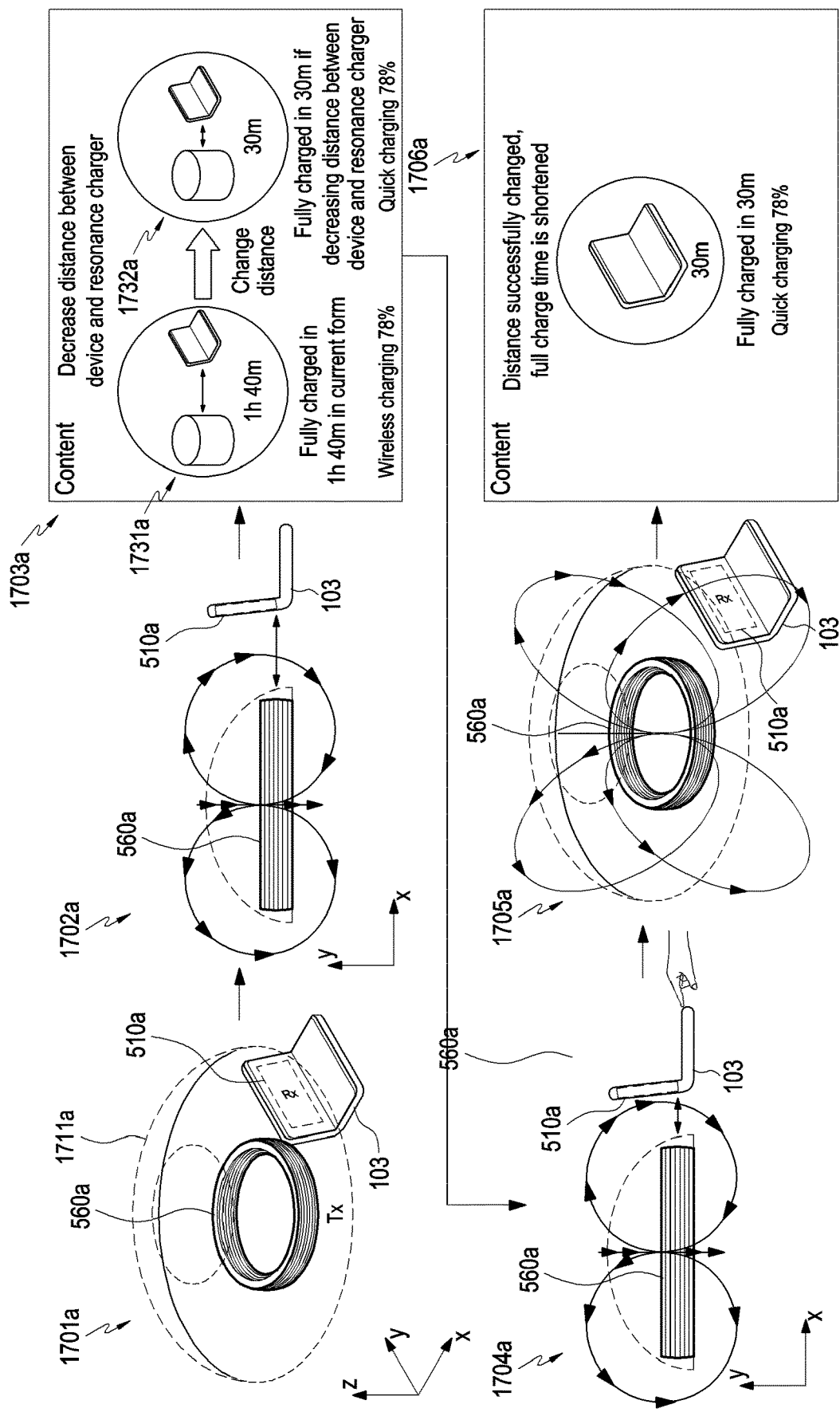
FIG. 17A is a view illustrating an example of the operation of providing content for changing a relative distance of a wireless power receiving device according to various embodiments.
Figure 17B:
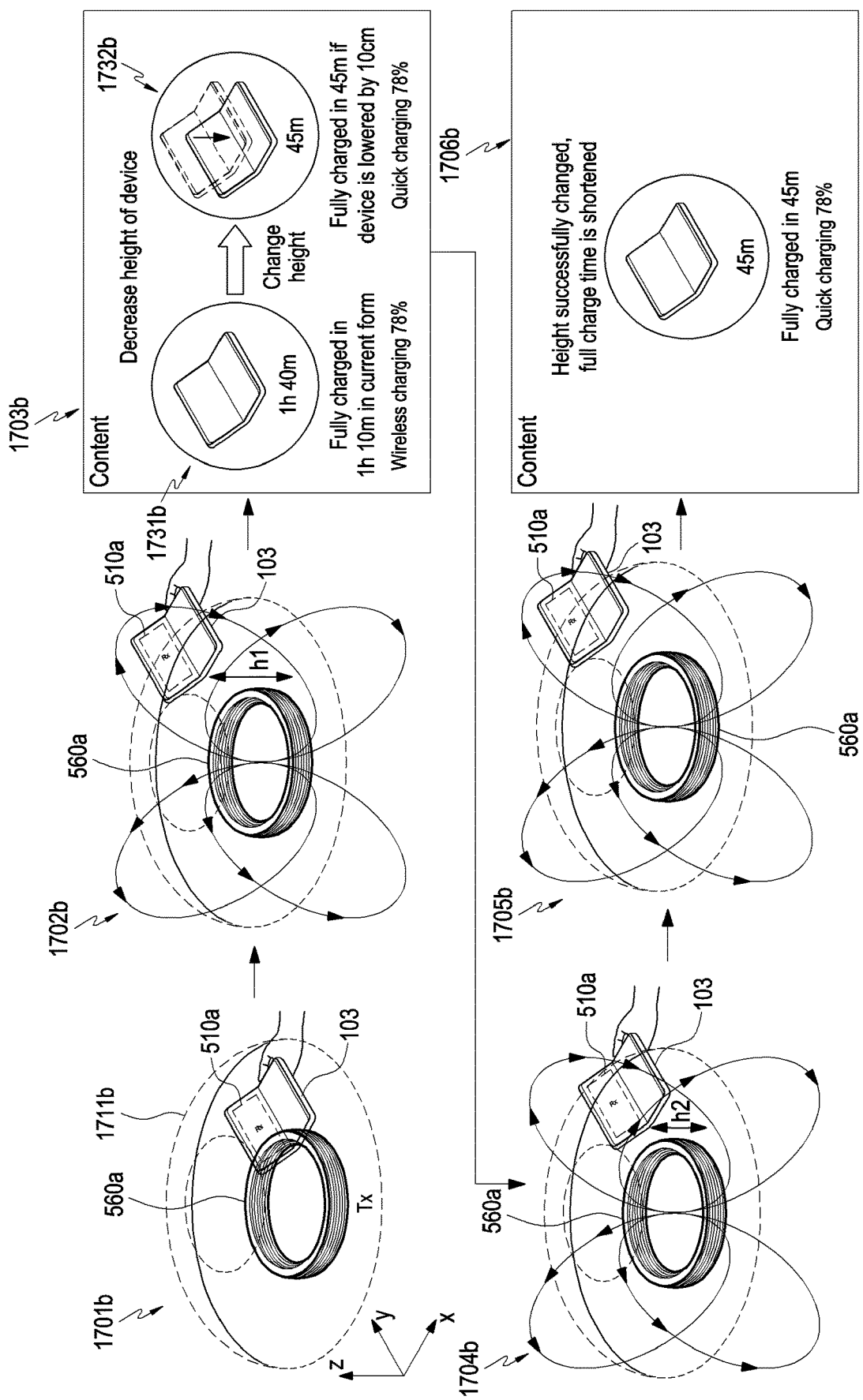
FIG. 17B is a view illustrating an example of the operation of providing content for changing a relative height of a wireless power receiving device according to various embodiments.
Figure 17C:
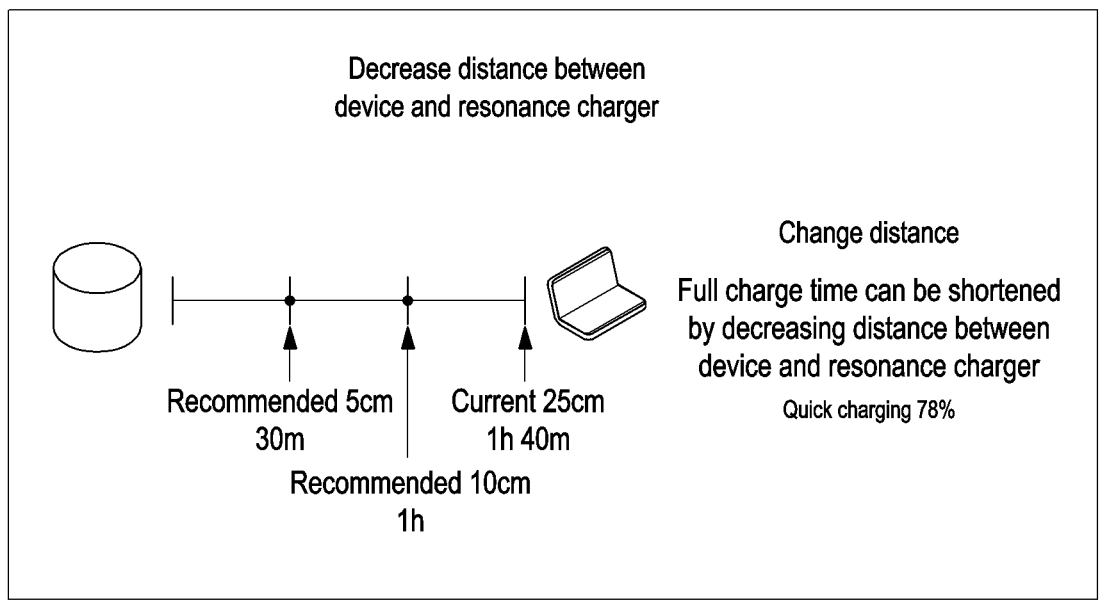
FIG. 17C is a view illustrating another example of content according to various embodiments.

FIG. 17A is a view illustrating an example of the operation of providing content for changing the relative distance of a wireless power receiving device 103 according to various embodiments. FIG. 17B is a view illustrating an example of the operation of providing content for changing a relative height of a wireless power receiving device 103 according to various embodiments. FIG. 17C is a view illustrating another example of content according to various embodiments.

According to various embodiments, in operation 1601, the wireless power receiving device 103 may receive (or control the wireless power receiving device 103 (e.g., a switch) to wirelessly receive power) wireless power from the wireless power transmitting device 101 through the resonance circuit 401 and, in operation 1603, identify the charging efficiency corresponding to the received wireless power, and in operation 1605, determine whether the charging efficiency is less than a threshold. For example, as illustrated in 1701a and 1702a in FIG. 17A and 1701b to 1702b in FIG. 17B, if the wireless power receiving device 103 is positioned within the charging range 1711a or 1711b of the wireless power transmitting device 101, a current may be induced in the resonance circuit 510a of the wireless power receiving device 103 by the magnetic field formed in the resonance circuit 560a of the wireless power transmitting device 101. As described above, the wireless power receiving device 103 may electrically connect (e.g., switch control) the rectifier 510b, charger 510d, and battery 511, controlling to allow the battery 511 to be charged with the current received from the resonance circuit 510a. The wireless power receiving device 103 may identify the charging efficiency corresponding to the received wireless power as in the above-described operations 703 and 705.

According to various embodiments, if the charging efficiency is less than the threshold, the wireless power receiving device 103 may obtain a first value associated with a first attribute associated with relative positions between the wireless power transmitting device 101 and the wireless power receiving device 103 using a sensor in operation 1607 and identify a reference value of the first attribute based on pre-stored information in operation 1609. For example, the wireless power receiving device 103 may identify the attribute associated with the relative positions between the wireless power transmitting device 101 and the wireless power receiving device 103 as the attribute to be changed among the plurality of attributes and identify the value of the attribute (e.g., distance, height, or angle) associated with the relative positions using the sensor 520. The operation of determining the attribute to be changed among the plurality of attributes by the wireless power receiving device 103 may be performed as described above, and no duplicate description is thus given. For example, the wireless power receiving device 103 may identify the attribute (e.g., distance, height, or angle) associated with the relative positions of the wireless power transmitting device 101 and the wireless power receiving device 103 as the attribute to be changed, based on a result of the operation of determining the attribute to be changed based on the priority for each of the plurality of attributes.

In an embodiment, referring to FIG. 17A, the wireless power receiving device 103 may identify distance as the attribute to be changed among the plurality of attributes and obtain the current value d1 for the distance using the sensor 520 (e.g., the second sensor). The wireless power receiving device 103 may identify a reference value d2 for the distance based on information stored in the memory (e.g., the test data 1000 described in connection with FIG. 10A or the artificial intelligence models 1030 described in connection with FIG. 10B) as described above, based on determining distance as the attribute to be changed.

In another embodiment, referring to FIG. 17B, the wireless power receiving device 103 may identify height as the attribute to be changed among the plurality of attributes and obtain the current value h1 for the height using the sensor 520 (e.g., the second sensor). The wireless power receiving device 103 may identify a reference value h2 for the height based on information stored in the memory (e.g., the test data 1000 described in connection with FIG. 10A or the artificial intelligence models 1030 described in connection with FIG. 10B) as described above, based on determining height as the attribute to be changed.

According to various embodiments, in operation 1611, the wireless power receiving device 103 may provide content for changing the first attribute associated with the relative position of the wireless power receiving device 103 with respect to the wireless power transmitting device 101 based on the difference between the first value and the reference value. For example, the wireless power receiving device 103 may obtain content (e.g., screen) for changing the attribute (e.g., distance or height) as illustrated in 1703a of FIG. 17A and 1703b of FIG. 17B and output it through the output device 545 (e.g., a display). For example, as illustrated in 1703a of FIG. 17A and 1703b of FIG. 17B, the screen may include information 1731a and 1731b about the current state, including an image corresponding to the value of the current attribute and the full charge time, information 1732a and 1732b about the optimal state, including an image corresponding to the reference value (i.e., the value to which it is to be changed) of the attribute (e.g., distance or height) and text for the full charge time according to a change in attribute, and text instructing to change the specific attribute (e.g., "change distance," or "change height"). As another example, as illustrated in FIG. 17C, the wireless power receiving device 103 may provide information corresponding to a plurality of values between the current value and reference value of the attributes (e.g., information about a plurality of states between the current value of the distance and the reference value of the distance).

According to various embodiments, in operation 1613, the wireless power receiving device 103 may again identify whether the charging efficiency is less than the threshold and, unless the charging efficiency is less than the threshold (or equal to or greater than the threshold), provide content indicating that the charging efficiency is greater than or equal to the threshold in operation 1615. For example, based on the provision of content, the user may change the distance (e.g., increase the distance) as illustrated in 1704a of FIG. 17A or change the height (e.g., decrease the height) as illustrated in 1704b of FIG. 17B. Alternatively, without being limited to those described, the wireless power receiving device 103 may perform the operation of automatically changing the corresponding attribute (e.g., distance or height) based on a user input on the content (e.g., an input to allow a change in attribute). The wireless power receiving device 103 may again receive wireless power after the attribute is changed as illustrated in 1705a of FIG. 17A and 1705b of FIG. 17B and calculate the charging efficiency corresponding to the received wireless power. In case the recalculated charging efficiency is greater than or equal to the threshold, the wireless power receiving device 103 may provide content indicating that the charging efficiency is greater than or equal to the threshold as illustrated in 1706a of FIG. 17A and 1706b of FIG. 17B. For example, referring to 1706a of FIG. 17A and 1706b of FIG. 17B, the screen indicating that the charging efficiency is greater than or equal to the threshold may include an image corresponding to the reference value (i.e., the changed value) of the attribute (e.g., distance and height), text for the full charge time according to the change in attribute, and text indicating that the attribute is successfully changed (e.g., "distance successfully changed," or "height successfully changed").

Meanwhile, according to various embodiments, the wireless power receiving device 103 may again perform operations 1707 to 1711 in case the charging efficiency is less than the threshold, providing content for changing the attribute associated with the relative position between the housings.

Hereinafter, an example of the operation of the wireless power transmitting device 101 according to various embodiments is described.

According to various embodiments, the wireless power receiving device 103 may identify the current value of the direction of rotation of the wireless power receiving device 103 in case the charging efficiency is less than the threshold and may provide content for changing the direction of rotation based on the identification of the current value.

Figure 18:
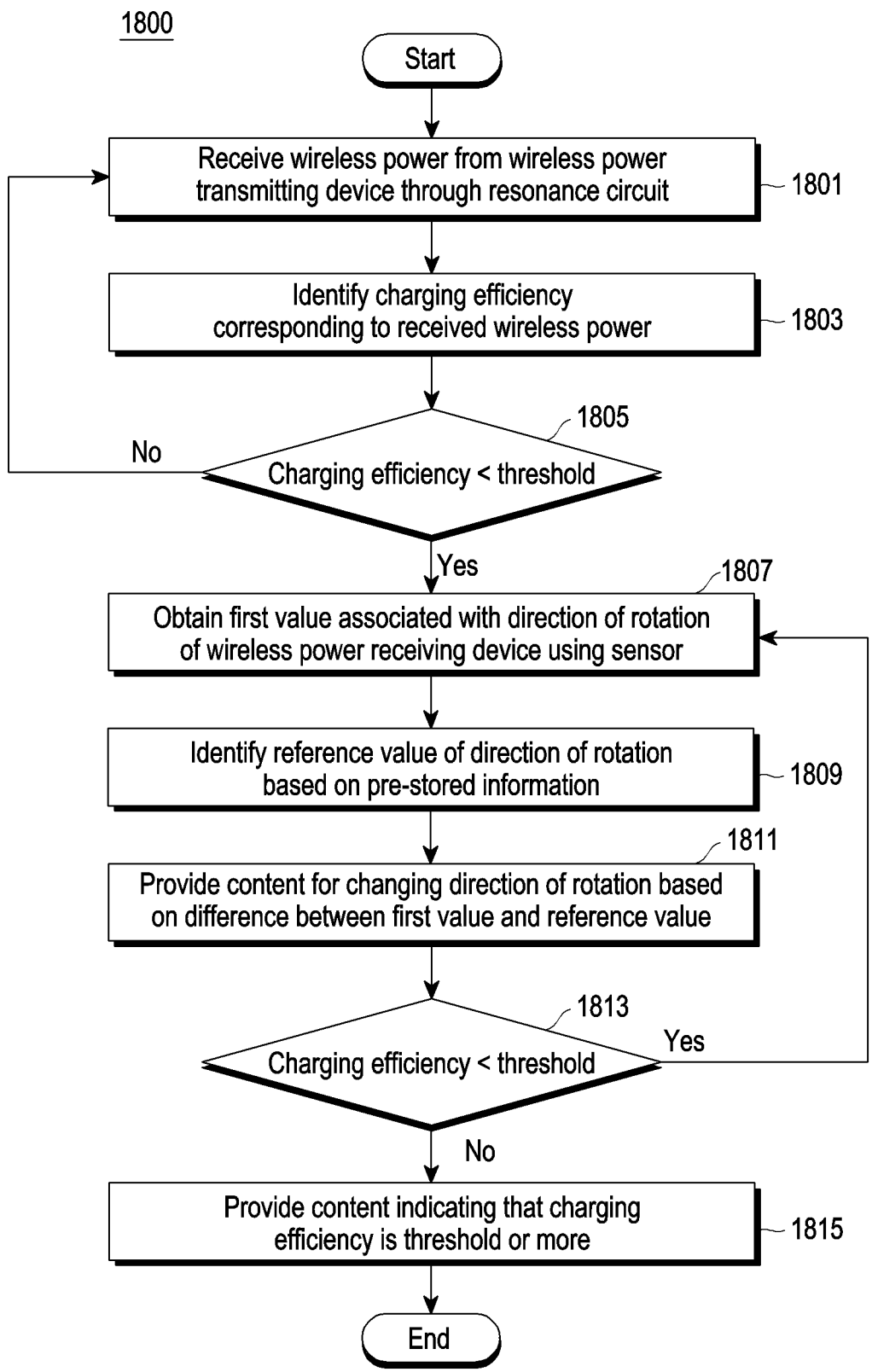
FIG. 18 is a flowchart illustrating an example of the operation of a wireless power receiving device according to various embodiments.

FIG. 18 is a flowchart 1800 illustrating an example of an operation of a wireless power receiving device 103 according to various embodiments. The operations illustrated in FIG. 18 are not limited to the illustrated order but may rather be performed in other various orders. According to various embodiments, more or less operations than those of FIG. 18 may be performed.

Figure 19:
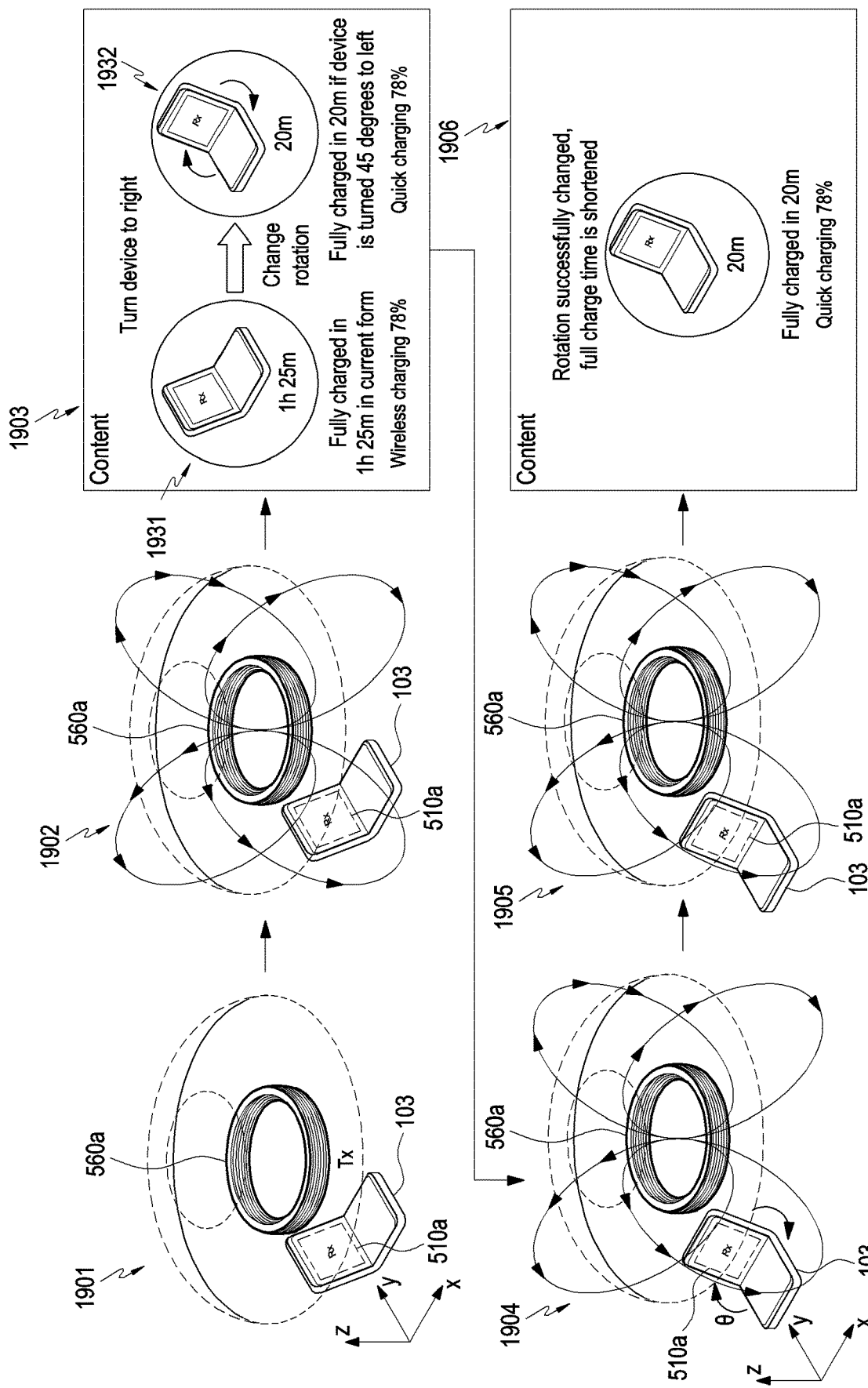
FIG. 19 is a view illustrating an example of the operation of providing content for changing a relative distance of a wireless power receiving device according to various embodiments.

FIG. 19 is a view illustrating an example of the operation of providing content for changing the relative distance of a wireless power receiving device 103 according to various embodiments.

According to various embodiments, in operation 1801, the wireless power receiving device 103 may receive (or control the wireless power receiving device 103 (e.g., a switch) to wirelessly receive power) wireless power from the wireless power transmitting device 101 through the resonance circuit 401 and, in operation 1803, identify the charging efficiency corresponding to the received wireless power, and in operation 1805, determine whether the charging efficiency is less than a threshold. For example, as illustrated in 1901 and 1902 of FIG. 19, if the wireless power receiving device 103 is positioned within the charging range of the wireless power transmitting device 101, a current may be induced in the resonance circuit 510a of the wireless power receiving device 103 by the magnetic field formed in the resonance circuit 560a of the wireless power transmitting device 101. As described above, the wireless power receiving device 103 may electrically connect (e.g., switch control) the rectifier 510*b*, charger 510*d*, and battery 511, controlling to allow the battery 511 to be charged with the current received from the resonance circuit 510*a*. The wireless power receiving device 103 may identify the charging efficiency corresponding to the received wireless power as in the above-described operations 703 and 705 of the wireless power receiving device 103.

According to various embodiments, if the charging efficiency is less than the threshold, the wireless power receiving device 103 may obtain a first value associated with the direction of rotation using a sensor in operation 1807 and identify a reference value of the direction of rotation based on pre-stored information in operation 1809. For example, the wireless power receiving device 103 may identify direction of rotation (or angle of rotation) as the attribute to be changed among the plurality of attributes and identify the current value of the direction of rotation using the sensor (e.g., the second sensor). Alternatively, the wireless power receiving device 103 may receive the current value of the direction of rotation from the wireless power transmitting device 101. The operation of determining the attribute to be changed among the plurality of attributes by the wireless power receiving device 103 may be performed as described above, and no duplicate description is thus given. For example, the wireless power receiving device 103 may identify direction of rotation as the attribute to be changed, based on a result of the operation of determining the attribute to be changed based on the priority of each of the plurality of attributes. Referring to FIG. 18, the wireless power receiving device 103 may identify a reference value for the direction of rotation based on information stored in the memory (e.g., the test data 1000 described in connection with FIG. 10A or the artificial intelligence models 1030 described in connection with FIG. 10B) as described above, based on determining direction of rotation as the attribute to be changed.

According to various embodiments, in operation 1811, the wireless power receiving device 103 may provide content for changing the first attribute associated with the relative position of the wireless power receiving device 103 with respect to the wireless power transmitting device 101 based on the difference between the first value and the reference value. For example, the wireless power receiving device 103 may obtain content (e.g., screen) for changing the direction of rotation as illustrated in 1903 of FIG. 19 and output it through the output device 545 (e.g., a display). For example, referring to 1903 of FIG. 19, the screen may include information about the current state 1931 including an image corresponding to the value of direction of rotation and the full charge time, information 1932 about the optimal state including an image corresponding to the reference value (i.e., the value to which it is to be changed) of the direction of rotation and text for the full charge time according to a change in attribute, and text instructing to change the direction of rotation.

According to various embodiments, in operation 1813, the wireless power receiving device 103 may again identify whether the charging efficiency is less than the threshold and, unless the charging efficiency is less than the threshold (or equal to or greater than the threshold), provide content indicating that the charging efficiency is greater than or equal to the threshold in operation 1815. For example, the user may change the direction of rotation (e.g., turn clockwise) as illustrated in 1904 of FIG. 19, based on the provision of content. The wireless power receiving device 103 may again receive wireless power after the direction of rotation is changed as illustrated in 1905 of FIGS. 19 and 1705*b* of FIG. 17B and calculate the charging efficiency corresponding to the received wireless power. In case the recalculated charging efficiency is greater than or equal to the threshold, the wireless power receiving device 103 may provide content indicating that the charging efficiency is greater than or equal to the threshold as illustrated in 1906 of FIG. 19. For example, referring to 1906 of FIG. 19, the screen indicating that the charging efficiency is greater than or equal to the threshold may include an image corresponding to the reference value (i.e., the changed value) of the direction of rotation and text for the full charge time according to a change in direction of rotation.

Meanwhile, according to various embodiments, the wireless power receiving device 103 may again perform operations 1807 to 1811 in case the charging efficiency is less than the threshold, providing content for changing the attribute associated with the relative position between the housings.

Hereinafter, an example of the operation of the wireless power transmitting device 101 according to various embodiments is described.

According to various embodiments, in case the charging efficiency is less than the threshold, the wireless power receiving device 103 may provide content for changing the plurality of attributes associated with charging efficiency.

Figure 20:
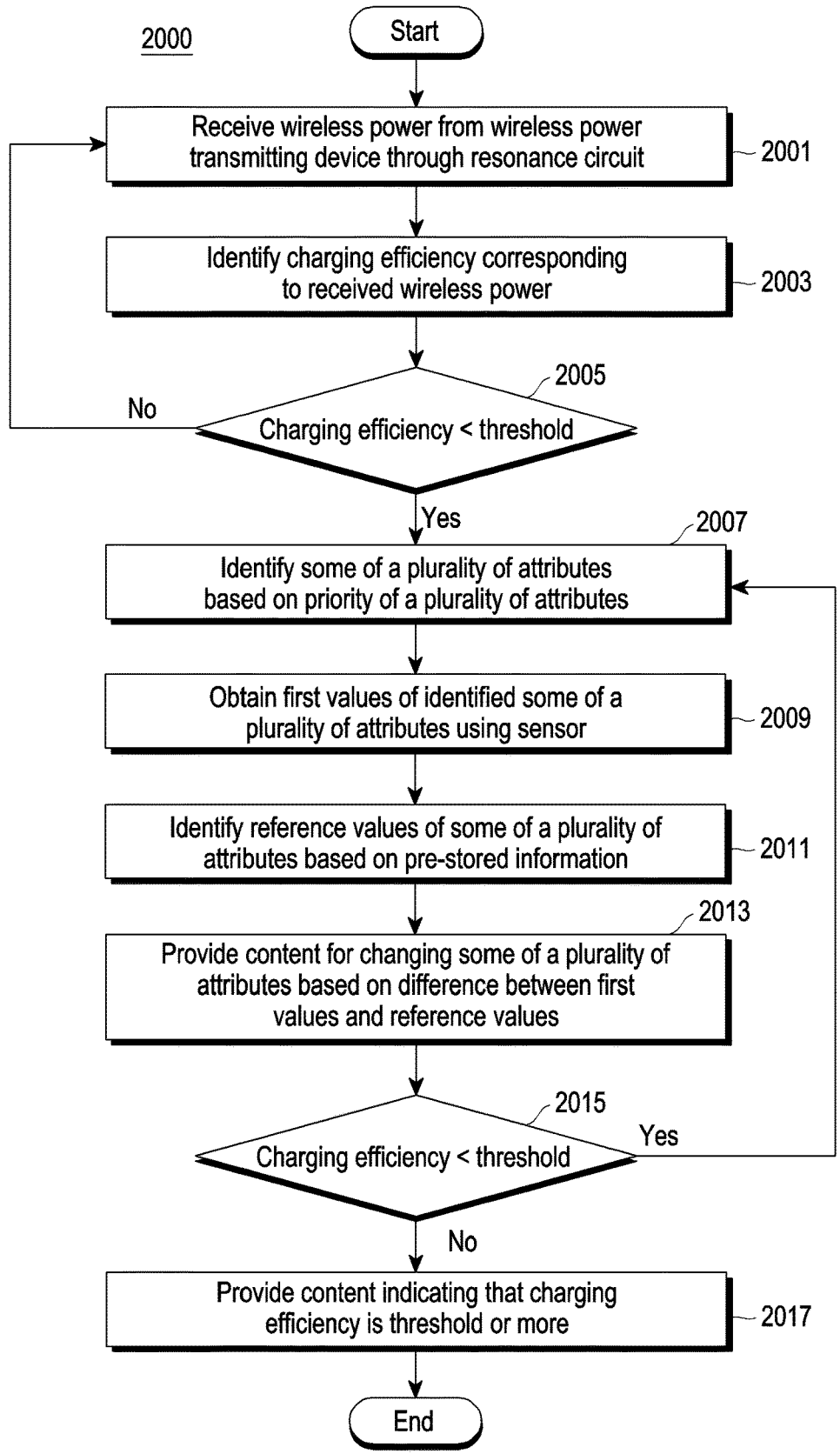
FIG. 20 is a flowchart illustrating an example of the operation of a wireless power receiving device according to various embodiments.

FIG. 20 is a view illustrating an example of the operation of providing content for changing a plurality of attributes of a wireless power receiving device according to various embodiments. The operations illustrated in FIG. 20 are not limited to the illustrated order but may rather be performed in other various orders. According to various embodiments, more or less operations than those of FIG. 20 may be performed. FIG. 20 is described below with reference to FIG. 21.

Figure 21:
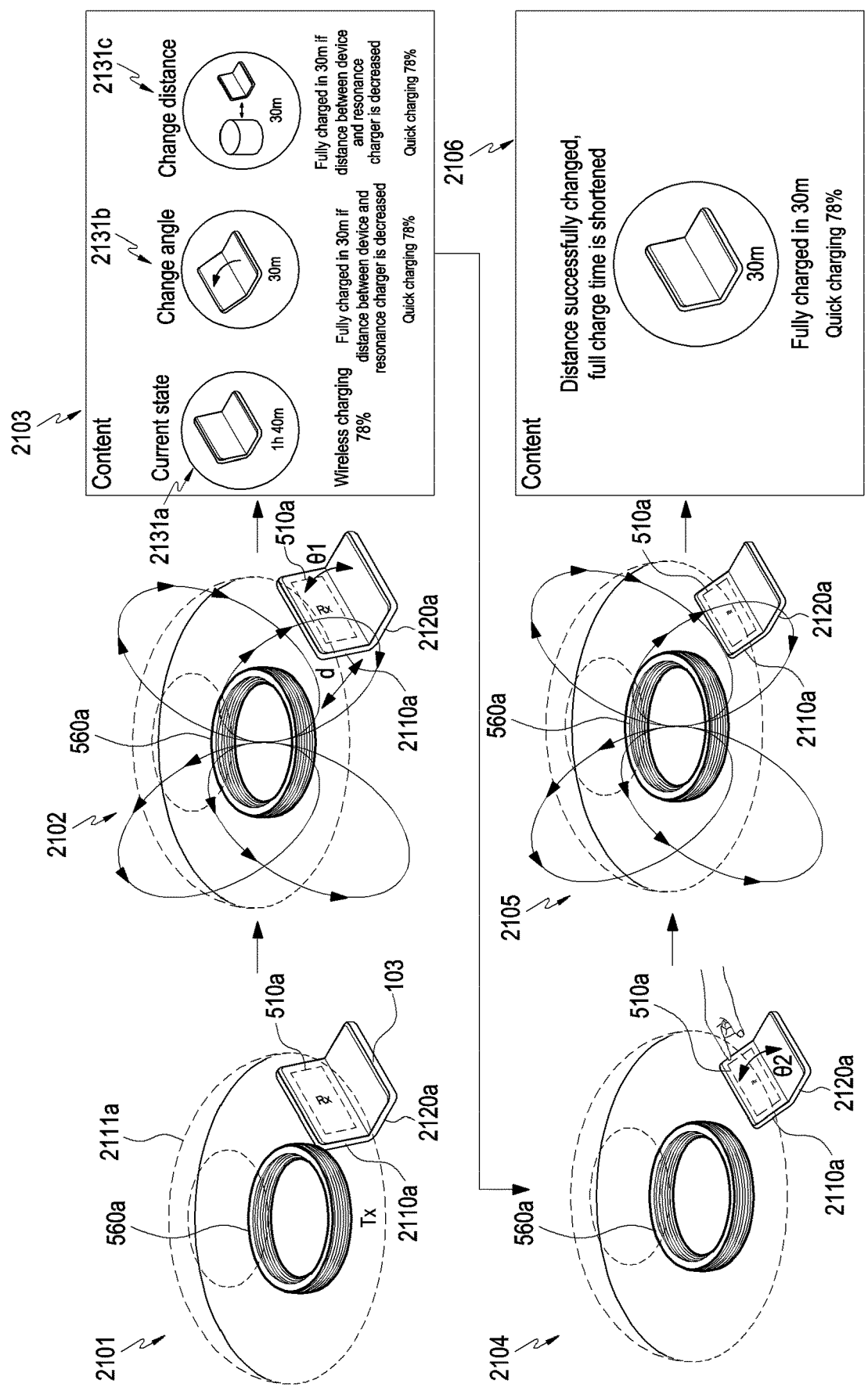
FIG. 21 is a view illustrating an example of the operation of providing content for changing a plurality of attributes of a wireless power receiving device according to various embodiments.

FIG. 21 is a view illustrating an example of the operation of providing content for changing a plurality of attributes of a wireless power receiving device according to various embodiments.

According to various embodiments, in operation 2001, the wireless power receiving device 103 may receive (or control the wireless power receiving device 103 (e.g., a switch) to wirelessly receive power) wireless power from the wireless power transmitting device 101 through the resonance circuit 401 and, in operation 2003, identify the charging efficiency corresponding to the received wireless power, and in operation 2005, determine whether the charging efficiency is less than a threshold. For example, as illustrated in 2101 and 2102 of FIG. 21, if the wireless power receiving device 103 is positioned within the charging range of the wireless power transmitting device 101, a current may be induced in the resonance circuit 510*a* of the wireless power receiving device 103 by the magnetic field formed in the resonance circuit 560*a* of the wireless power transmitting device 101. As described above, the wireless power receiving device 103 may electrically connect (e.g., switch control) the rectifier 510*b*, charger 510*d*, and battery 511, controlling to allow the battery 511 to be charged with the current received from the resonance circuit 510*a*. The wireless power receiving device 103 may identify the charging efficiency corresponding to the received wireless power as in the above-described operations 703 and 705 of the wireless power receiving device 103.

According to various embodiments, in case the charging efficiency is less than the threshold, the wireless power receiving device 103 may identify (or determine) some of the plurality of attributes based on the priority of the plurality of attributes in operation 2007. For example, the wireless power receiving device 103 may determine some attributes from among the plurality of attributes as the attributes to be changed based on the priority for each attribute described in Table 2. As an example, the wireless power receiving device 103 may determine a designated number of attributes in order of priority. When determining two attributes, the wireless power receiving device 103 may determine relative distance, which has the highest priority, as the attribute to be changed and determine folding angle which has a lower priority. Alternatively, when there is an attribute that does not need to be changed among the determined attributes, the wireless power receiving device 103 may determine an attribute with a further lower priority as the attribute to be changed. For example, when the folding angle does not need to be changed (e.g., when the difference between the current value and the reference value is less than a threshold), the wireless power receiving device 103 may determine relative height, which has lower priority, instead of folding angle, as the attribute to be changed.

According to various embodiments, the wireless power receiving device 103 may obtain some first values among the identified plurality of attributes using a sensor in operation 2009 and may identify reference values of some of the plurality of attributes based on previously stored information in operation 2011. For example, the wireless power receiving device 103 may identify values for the attributes to be changed among the plurality of attributes using the sensor 520 and identify the reference value for the attributes based on information stored in the memory (e.g., the test data 1000 described in connection with FIG. 10A or the artificial intelligence models 1030 described in connection with FIG. 10B) as described above.

According to various embodiments, in operation 2013, the wireless power receiving device 103 may provide content for changing some of the plurality of attributes based on the difference between the first values and the reference values. For example, the wireless power receiving device 103 may obtain content (e.g., screen) for changing the plurality of attributes (e.g., folding angle and distance) as illustrated in 2003 of FIG. and output it through the output device 545 (e.g., a display). For example, referring to 2003 of FIG. 20, the screen may include information 2131a about the current state, including the current full charge time, an image 2131b corresponding to the reference value (i.e., the value to which it is to be changed) of the folding angle, an image 2131c corresponding to the reference value of the distance, and text instructing to change the attributes (e.g., folding angle and distance).

According to various embodiments, in operation 2015, the wireless power receiving device 103 may again identify whether the charging efficiency is less than the threshold and, unless the charging efficiency is less than the threshold (or equal to or greater than the threshold), provide content indicating that the charging efficiency is greater than or equal to the threshold in operation 2017. For example, based on the provision of content, the user may change the folding angle, of the folding angle and the distance (e.g., from a first angle θ1 to a second angle θ2) as illustrated in 2104 of FIG. 21. The wireless power receiving device 103 may again receive wireless power after the folding angle is changed as illustrated in 2105 of FIGS. 21 and 1705b of FIG. 17B and calculate the charging efficiency corresponding to the received wireless power. In case the recalculated charging efficiency is greater than or equal to the threshold, the wireless power receiving device 103 may provide content indicating that the charging efficiency is greater than or equal to the threshold as illustrated in 2106 of FIG. 21. For example, referring to 2106 of FIG. 21, the screen indicating that the charging efficiency is greater than or equal to the threshold may include an image corresponding to the reference value (i.e., the changed value) of the folding angle and text for the full charge time according to a change in folding angle.

Meanwhile, according to various embodiments, the wireless power receiving device 103 may again perform operations 2007 to 2013 in case the charging efficiency is less than the threshold, providing content for changing the attribute associated with the relative position between the housings.

The following description of the electronic device 2201 may be applied to the description of the wireless power receiving device 103 and/or the wireless power receiving device 101.

Figure 22:
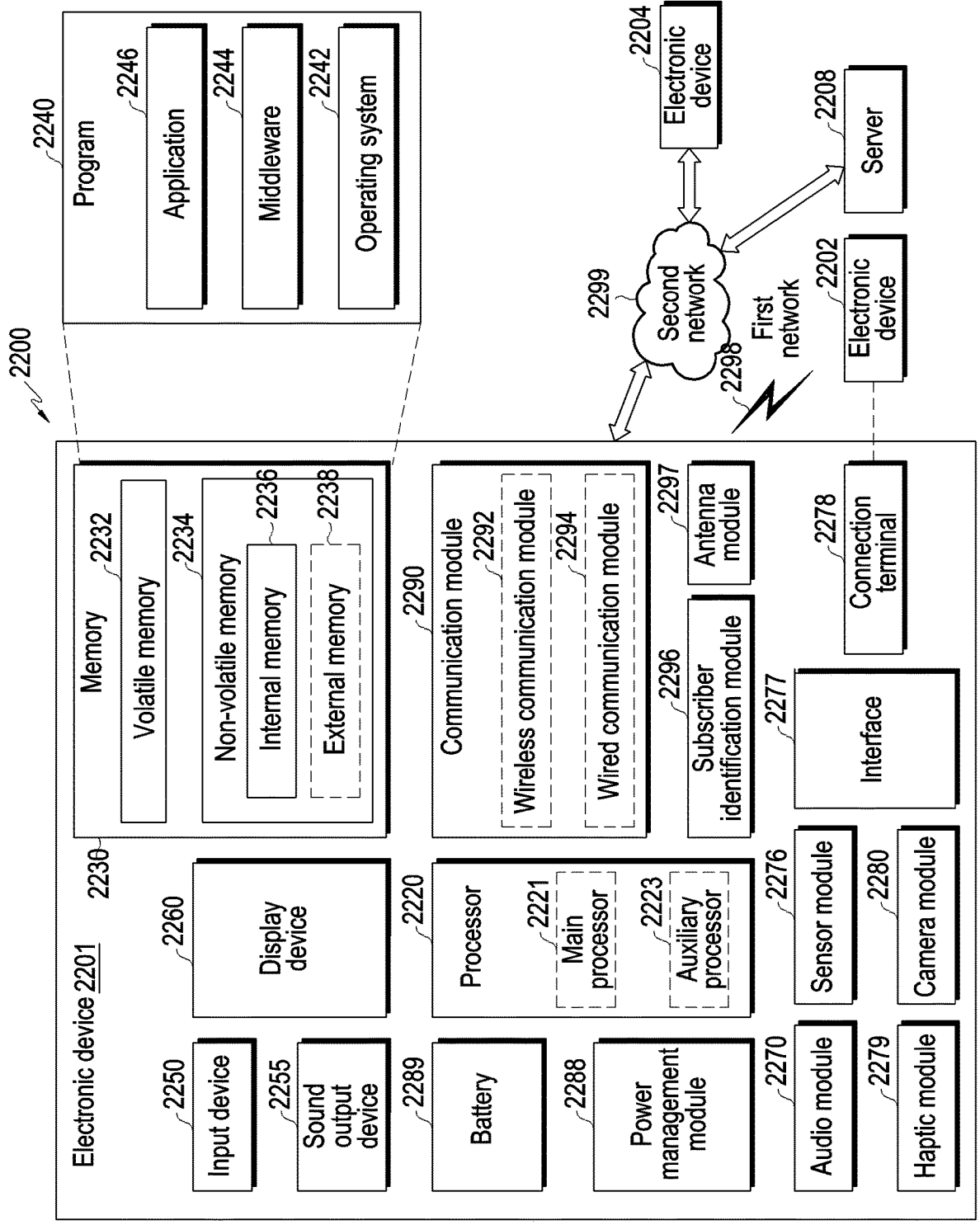
FIG. 22 is a block diagram illustrating an electronic device in a network environment according to various embodiments.

FIG. 22 is a block diagram illustrating an electronic device 2201 in a network environment 2200 according to various embodiments.

Referring to FIG. 22, the electronic device 2201 in the network environment 2200 may communicate with at least one of an electronic device 2202 via a first network 2298 (e.g., a short-range wireless communication network), or an electronic device 2204 or a server 2208 via a second network 2299 (e.g., a long-range wireless communication network). According to an embodiment, the electronic device 2201 may communicate with the electronic device 2204 via the server 2208. According to an embodiment, the electronic device 2201 may include a processor 2222, memory 2230, an input module 2250, a sound output module 2255, a display module 2260, an audio module 2270, a sensor module 2276, an interface 2277, a connecting terminal 2278, a haptic module 2279, a camera module 2280, a power management module 2288, a battery 2289, a communication module 2290, a subscriber identification module (SIM) 2296, or an antenna module 2297. In some embodiments, at least one (e.g., the connecting terminal 2278) of the components may be omitted from the electronic device 2201, or one or more other components may be added in the electronic device 101. According to an embodiment, some (e.g., the sensor module 2276, the camera module 2280, or the antenna module 2297) of the components may be integrated into a single component (e.g., the display module 2260).

The processor 20222020 may execute, for example, software (e.g., a program 2240) to control at least one other component (e.g., a hardware or software component) of the electronic device 2201 coupled with the processor 20222020, and may perform various data processing or computation. According to one embodiment, as at least part of the data processing or computation, the processor 20222020 may store a command or data received from another component (e.g., the sensor module 2276 or the communication module 2290) in volatile memory 2232, process the command or the data stored in the volatile memory 2232, and store resulting data in non-volatile memory 2234. According to an embodiment, the processor 2220 may include a main processor 2221 (e.g., a central processing unit (CPU) or an application processor (AP)), or an auxiliary processor 2223 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 2201 includes the main processor 2221 and the auxiliary processor 2223, the auxiliary processor 2223 may be configured to use lower power than the main processor 2221 or to be specified for a designated function. The auxiliary processor 2223 may be implemented as separate from, or as part of the main processor 2221.

The auxiliary processor 2223 may control at least some of functions or states related to at least one component (e.g., the display module 2260, the sensor module 2276, or the communication module 2290) among the components of the electronic device 2201, instead of the main processor 2221 while the main processor 2221 is in an inactive (e.g., sleep) state, or together with the main processor 2221 while the main processor 2221 is in an active state (e.g., executing an application). According to an embodiment, the auxiliary processor 2223 (e.g., an image signal processor or a communication processor) may be implemented as part of another component (e.g., the camera module 2280 or the communication module 2290) functionally related to the auxiliary processor 123. According to an embodiment, the auxiliary processor 2223 (e.g., the neural processing unit) may include a hardware structure specified for artificial intelligence model processing. The artificial intelligence model may be generated via machine learning. Such learning may be performed, e.g., by the electronic device 2201 where the artificial intelligence is performed or via a separate server (e.g., the server 2208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2230 may store various data used by at least one component (e.g., the processor 2220 or the sensor module 2276) of the electronic device 2201. The various data may include, for example, software (e.g., the program 2240) and input data or output data for a command related thereto. The memory 2230 may include the volatile memory 2232 or the non-volatile memory 2234.

The program 2240 may be stored in the memory 2230 as software, and may include, for example, an operating system (OS) 2242, middleware 2244, or an application 2246.

The input module 2250 may receive a command or data to be used by other component (e.g., the processor 2220) of the electronic device 2201, from the outside (e.g., a user) of the electronic device 2201. The input module 2250 may include, for example, a microphone, a mouse, a keyboard, keys (e.g., buttons), or a digital pen (e.g., a stylus pen).

The sound output module 2255 may output sound signals to the outside of the electronic device 2201. The sound output module 2255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2260 may visually provide information to the outside (e.g., a user) of the electronic device 2201. The display 2260 may include, for example, a display, a hologram device, or a projector and control circuitry to control a corresponding one of the display, hologram device, and projector. According to an embodiment, the display 2260 may include a touch sensor configured to detect a touch, or a pressure sensor configured to measure the intensity of a force generated by the touch.

The audio module 2270 may convert a sound into an electrical signal and vice versa. According to an embodiment, the audio module 2270 may obtain the sound via the input module 2250, or output the sound via the sound output module 2255 or a headphone of an external electronic device (e.g., an electronic device 2202) directly (e.g., wiredly) or wirelessly coupled with the electronic device 2201.

The sensor module 2276 may detect an operational state (e.g., power or temperature) of the electronic device 2201 or an environmental state (e.g., a state of a user) external to the electronic device 101, and then generate an electrical signal or data value corresponding to the detected state. According to an embodiment, the sensor module 2276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2277 may support one or more specified protocols to be used for the electronic device 2201 to be coupled with the external electronic device (e.g., the electronic device 2202) directly (e.g., wiredly) or wirelessly. According to an embodiment, the interface 2277 may include, for example, a high definition multimedia interface (HDMI), a universal serial bus (USB) interface, a secure digital (SD) card interface, or an audio interface.

A connecting terminal 2278 may include a connector via which the electronic device 2201 may be physically connected with the external electronic device (e.g., the electronic device 2202). According to an embodiment, the connecting terminal 2278 may include, for example, a HDMI connector, a USB connector, a SD card connector, or an audio connector (e.g., a headphone connector).

The haptic module 2279 may convert an electrical signal into a mechanical stimulus (e.g., a vibration or motion) or electrical stimulus which may be recognized by a user via his tactile sensation or kinesthetic sensation. According to an embodiment, the haptic module 2279 may include, for example, a motor, a piezoelectric element, or an electric stimulator.

The camera module 2280 may capture a still image or moving images. According to an embodiment, the camera module 2280 may include one or more lenses, image sensors, image signal processors, or flashes.

The power management module 2288 may manage power supplied to the electronic device 2201. According to one embodiment, the power management module 2288 may be implemented as at least part of, for example, a power management integrated circuit (PMIC).

The battery 2289 may supply power to at least one component of the electronic device 2201. According to an embodiment, the battery 2289 may include, for example, a primary cell which is not rechargeable, a secondary cell which is rechargeable, or a fuel cell.

The communication module 2290 may support establishing a direct (e.g., wired) communication channel or a wireless communication channel between the electronic device 2201 and the external electronic device (e.g., the electronic device 2202, the electronic device 2204, or the server 2208) and performing communication via the established communication channel. The communication module 2290 may include one or more communication processors that are operable independently from the processor 2220 (e.g., the application processor (AP)) and supports a direct (e.g., wired) communication or a wireless communication.

According to an embodiment, the communication module 2290 may include a wireless communication module 2292 (e.g., a cellular communication module, a short-range wireless communication module, or a global navigation satellite system (GNSS) communication module) or a wired communication module 2294 (e.g., a local area network (LAN) communication module or a power line communication (PLC) module). A corresponding one of these communication modules may communicate with the external electronic device 2204 via a first network 2298 (e.g., a short-range communication network, such as Bluetooth™, wireless-fidelity (Wi-Fi) direct, or infrared data association (IrDA)) or a second network 2299 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 2292 may identify or authenticate the electronic device 2201 in a communication network, such as the first network 2298 or the second network 2299, using subscriber information (e.g., international mobile subscriber identity (IMSI)) stored in the SIM 2296.

The wireless communication module 2292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2292 may support a high-frequency band (e.g., the mmWave band) to achieve, e.g., a high data transmission rate. The wireless communication module 2292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2292 may support various requirements specified in the electronic device 2201, an external electronic device (e.g., the electronic device 2204), or a network system (e.g., the second network 2299). According to an embodiment, the wireless communication module 2292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2297 may transmit or receive a signal or power to or from the outside (e.g., the external electronic device). According to an embodiment, the antenna module 2297 may include one antenna including a radiator formed of a conductor or conductive pattern formed on a substrate (e.g., a printed circuit board (PCB)). According to an embodiment, the antenna module 2297 may include a plurality of antennas (e.g., an antenna array). In this case, at least one antenna appropriate for a communication scheme used in a communication network, such as the first network 2298 or the second network 2299, may be selected from the plurality of antennas by, e.g., the communication module 2290. The signal or the power may then be transmitted or received between the communication module 2290 and the external electronic device via the selected at least one antenna. According to an embodiment, other parts (e.g., radio frequency integrated circuit (RFIC)) than the radiator may be further formed as part of the antenna module 2297.

According to various embodiments, the antenna module 2297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2201 and the external electronic device 2204 via the server 2208 coupled with the second network 2299. The external electronic devices 2202 or 2204 each may be a device of the same or a different type from the electronic device 2201. According to an embodiment, all or some of operations to be executed at the electronic device 2201 may be executed at one or more of the external electronic devices 2202, 2204, or 2208. For example, if the electronic device 2201 should perform a function or a service automatically, or in response to a request from a user or another device, the electronic device 2201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2201. The electronic device 2201 may provide the outcome, with or without further processing of the outcome, as at least part of a reply to the request. To that end, a cloud computing, distributed computing, mobile edge computing (MEC), or client-server computing technology may be used, for example. The electronic device 2201 may provide ultra low-latency services using, e.g., distributed computing or mobile edge computing. In another embodiment, the external electronic device 2204 may include an internet-of-things (IoT) device. The server 2208 may be an intelligent server using machine learning and/or a neural network. According to an embodiment, the external electronic device 2204 or the server 2208 may be included in the second network 2299. The electronic device 2201 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2240) including one or more instructions that are stored in a storage medium (e.g., internal memory 2236 or external memory 2238) that is readable by a machine (e.g., the electronic device 2201). For example, a processor (e.g., the processor 2220) of the machine (e.g., the electronic device 2201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, there may be provided a wireless power receiving device (e.g., the wireless power receiving device 103 of FIG. 1) comprising a first housing (e.g., one housing 410a or 410b of FIGS. 4A to 4C), a second housing (e.g., another housing 420a, 420b, or 430b of FIGS. 4A to 4C) coupled to the first housing (e.g., one housing 410a or 410b of FIGS. 4A to 4C) to be changed in relative position with respect to the first housing (e.g., one housing 410a or 410b of FIGS. 4A to 4C), a first resonance circuit (e.g., the resonance circuit 510a of FIG. 5A) disposed in the first housing (e.g., one housing 410a or 410b of FIGS. 4A to 4C), and at least one processor (e.g., the processor 530 of FIG. 5A), wherein the at least one processor (e.g., the processor 530 of FIG. 5A) is configured further to control the wireless power receiving device (e.g., the wireless power receiving device 103 of FIG. 1) to wirelessly receive power from a wireless power transmitting device (e.g., the wireless power transmitting device 101 of FIG. 1) through the first resonance circuit (e.g., the resonance circuit 510a of FIG. 5A), identify a charging efficiency corresponding to the received wireless power, and in case the identified charging efficiency is less than a threshold, provide content for changing an angle between the first housing (e.g., one housing 410a or 410b of FIGS. 4A to 4C) and the second housing (e.g., another housing 420a, 420b, or 430b of FIGS. 4A to 4C).

According to various embodiments, there may be provided the wireless power receiving device (e.g., the wireless power receiving device 103 of FIG. 1) further comprising a second resonance circuit (e.g., the resonance circuit 510a of FIG. 5A) disposed in the second housing (e.g., another housing 420a, 420b, or 430b of FIGS. 4A to 4C), wherein the at least one processor (e.g., the processor 530 of FIG. 5A) is configured further to control the wireless power receiving device to wirelessly receive power from the wireless power transmitting device (e.g., the wireless power transmitting device 101 of FIG. 1) through the first resonance circuit and the second resonance circuit.

According to various embodiments, there may be provided the wireless power receiving device (e.g., the wireless power receiving device 103 of FIG. 1), wherein the at least one processor (e.g., the processor 530 of FIG. 5A) is configured further to, as at least part of providing the content for changing the angle between the first housing and the second housing, transmit information about the content to the wireless power transmitting device (e.g., the wireless power transmitting device 101 of FIG. 1).

According to various embodiments, there may be provided the wireless power receiving device (e.g., the wireless power receiving device 103 of FIG. 1), wherein the at least one processor (e.g., the processor 530 of FIG. 5A) is configured further to, in case the identified charging efficiency is less than the threshold, identify the angle between the first housing (e.g., one housing 410*a* or 410*b* of FIGS. 4A to 4C) and the second housing (e.g., another housing 420*a*, 420*b*, or 430*b* of FIGS. 4A to 4C), as an attribute to be changed among a plurality of attributes associated with the charging efficiency, and wherein the plurality of attributes include at least one of a distance from the wireless power receiving device (e.g., the wireless power receiving device 103 of FIG. 1) to the wireless power transmitting device (e.g., the wireless power transmitting device 101 of FIG. 1), a direction of the wireless power receiving device (e.g., the wireless power receiving device 103 of FIG. 1) with respect to the wireless power transmitting device (e.g., the wireless power transmitting device 101 of FIG. 1), the angle between the second housing (e.g., another housing 420*a*, 420*b*, or 430*b* of FIGS. 4A to 4C) and the first housing (e.g., one housing 410*a* or 410*b* of FIGS. 4A to 4C), a moving distance of the first housing (e.g., one housing 410*a* or 410*b* of FIGS. 4A to 4C) on the second housing (e.g., another housing 420*a*, 420*b*, or 430*b* of FIGS. 4A to 4C), a form of the wireless power receiving device (e.g., the wireless power receiving device 103 of FIG. 1) associated with the relative position of the first housing (e.g., one housing 410*a* or 410*b* of FIGS. 4A to 4C) with respect to the second housing (e.g., another housing 420*a*, 420*b*, or 430*b* of FIGS. 4A to 4C), or an angle of rotation, clockwise or counterclockwise on one plane, of the wireless power receiving device (e.g., the wireless power receiving device 103 of FIG. 1).

According to various embodiments, there may be provided the wireless power receiving device (e.g., the wireless power receiving device 103 of FIG. 1), wherein the at least one processor (e.g., the processor 530 of FIG. 5A) is configured further to identify the attribute to be changed among the plurality of attributes based on priority of the plurality of attributes, wherein the priority is associated with the charging efficiency, and identify the angle as the attribute to be changed, as at least part of identifying the attribute to be changed among the plurality of attributes.

According to various embodiments, there may be provided the wireless power receiving device (e.g., the wireless power receiving device 103 of FIG. 1) further comprising at least one sensor and a memory, wherein the at least one processor (e.g., the processor 530 of FIG. 5A) is configured further to identify a first value for the angle between the first housing (e.g., one housing 410*a* or 410*b* of FIGS. 4A to 4C) and the second housing (e.g., another housing 420*a*, 420*b*, or 430*b* of FIGS. 4A to 4C) using the at least one sensor, and identify the angle as the attribute to be changed based on comparison between the first value and a second value of the angle pre-stored in the memory, as at least part of identifying the attribute to be changed among the plurality of attributes, wherein the second value is associated with a higher charging efficiency than the identified charging efficiency.

According to various embodiments, there may be provided the wireless power receiving device (e.g., the wireless power receiving device 103 of FIG. 1) further comprising a memory and at least one sensor, wherein the at least one processor (e.g., the processor 530 of FIG. 5A) is configured further to identify a first value for the angle between the first housing (e.g., one housing 410*a* or 410*b* of FIGS. 4A to 4C) and the second housing (e.g., another housing 420*a*, 420*b*, or 430*b* of FIGS. 4A to 4C) using the at least one sensor, identify a second value for the angle stored in the memory, the second value being associated with a higher charging efficiency than the identified charging efficiency, and provide the content based on the first value and the second value.

According to various embodiments, there may be provided the wireless power receiving device (e.g., the wireless power receiving device 103 of FIG. 1), wherein the at least one processor (e.g., the processor 530 of FIG. 5A) is configured further to store, in the memory, a plurality of data associated with the higher charging efficiency than the identified charging efficiency, wherein each of the plurality of data includes a value for the angle and a value for at least some of the plurality of attributes other than the angle, and identify the second value for the angle based on the plurality of data.

According to various embodiments, there may be provided the wireless power receiving device (e.g., the wireless power receiving device 103 of FIG. 1), wherein the at least one processor (e.g., the processor 530 of FIG. 5A) is configured further to identify a third value for the at least some of the plurality of attributes other than the angle using the at least one sensor, and identify first data corresponding to the third value for the at least some of the plurality of data and identify the second value for the angle included in the first data, as at least part of identifying the second value for the angle based on the plurality of data.

According to various embodiments, there may be provided the wireless power receiving device (e.g., the wireless power receiving device 103 of FIG. 1), wherein the at least one processor (e.g., the processor 530 of FIG. 5A) is configured further to store a plurality of artificial intelligence models (AI) in the memory, wherein each of the plurality of AI models is implemented to output a value for the attribute to be changed in response to receiving a value of the at least some of the plurality of attributes other than the attribute to be changed, identify a third value for the at least some of the plurality of attributes other than the angle using the at least one sensor, and obtain the second value for the angle based on inputting the third value to the plurality of AI models.

According to various embodiments, there may be provided the wireless power receiving device (e.g., the wireless power receiving device 103 of FIG. 1) further comprising a display, a speaker, and a vibrator, wherein the at least one processor (e.g., the processor 530 of FIG. 5A) is configured further to provide the content using at least one of the display, the speaker, or the vibrator, wherein the content includes at least one piece of information for changing the first value for the angle to the second value.

According to various embodiments, there may be provided the wireless power receiving device (e.g., the wireless power receiving device 103 of FIG. 1), wherein the at least one processor (e.g., the processor 530 of FIG. 5A) is configured further to, as at least part of providing the content, display, on the display, a screen including a first image associated with the wireless power receiving device (e.g., the wireless power receiving device 103 of FIG. 1), text for a first full charge time corresponding to the first value, a second image associated with the wireless power receiving device (e.g., the wireless power receiving device 103 of FIG. 1) corresponding to the second value, and text for a second full charge time corresponding to the second value.

According to various embodiments, there may be provided the wireless power receiving device (e.g., the wireless power receiving device 103 of FIG. 1), wherein the at least one processor (e.g., the processor 530 of FIG. 5A) is configured further to control the wireless power receiving device (e.g., the wireless power receiving device 103 of FIG. 1) to wirelessly receive first power from the wireless power transmitting device (e.g., the wireless power transmitting device 101 of FIG. 1) after providing the content, identify a first charging efficiency corresponding to the first power and, in case the first charging efficiency is greater than or equal to the threshold, provide first content indicating that the first charging efficiency is greater than or equal to the threshold.

According to various embodiments, there may be provided the wireless power receiving device (e.g., the wireless power receiving device 103 of FIG. 1), wherein in case the first charging efficiency is less than the threshold, the at least one processor (e.g., the processor 530 of FIG. 5A) is configured further to provide second content for changing an attribute, different from the angle, among the plurality of attributes.

According to various embodiments, there may be provided the wireless power receiving device (e.g., the wireless power receiving device 103 of FIG. 1) further comprising a communication circuit, wherein the at least one processor (e.g., the processor 530 of FIG. 5A) is configured further to transmit information about a type of the wireless power receiving device (e.g., the wireless power receiving device 103 of FIG. 1) to the wireless power transmitting device (e.g., the wireless power transmitting device 101 of FIG. 1) through the communication circuit, receive, through the communication circuit, a message including information indicating that providing the content from the wireless power receiving device (e.g., the wireless power receiving device 103 of FIG. 1) is needed, based on transmitting the information about the type of the wireless power receiving device (e.g., the wireless power receiving device 103 of FIG. 1), and provide the content based on receiving the message.

According to various embodiments, there may be provided the wireless power receiving device (e.g., the wireless power receiving device 103 of FIG. 1) further comprising a communication circuit, wherein the at least one processor (e.g., the processor 530 of FIG. 5A) is configured further to control the wireless power receiving device (e.g., the wireless power receiving device 103 of FIG. 1) to wirelessly receive first power from the wireless power receiving device (e.g., the wireless power receiving device 103 of FIG. 1) after providing the content, identify a first charging efficiency corresponding to the first power, and in case the identified first charging efficiency is greater than or equal to the threshold, transmit, to the wireless power transmitting device (e.g., the wireless power transmitting device 101 of FIG. 1), information indicating that the provision of the content for changing the angle is performed, along with information associated with the received first power.

According to various embodiments, there may be provided the wireless power receiving device (e.g., the wireless power receiving device 103 of FIG. 1), wherein the at least one processor (e.g., the processor 530 of FIG. 5A) is configured further to identify, as the attribute to be changed, one of the distance from the wireless power receiving device (e.g., the wireless power receiving device 103 of FIG. 1) to the wireless power transmitting device (e.g., the wireless power transmitting device 101 of FIG. 1), the direction of the wireless power receiving device (e.g., the wireless power receiving device 103 of FIG. 1) with respect to the wireless power transmitting device (e.g., the wireless power transmitting device 101 of FIG. 1), the moving distance of the first housing (e.g., one housing 410a or 410b of FIGS. 4A to 4C) on the second housing (e.g., another housing 420a, 420b, or 430b of FIGS. 4A to 4C), the form of the wireless power receiving device (e.g., the wireless power receiving device 103 of FIG. 1) associated with the relative position of the first housing (e.g., one housing 410a or 410b of FIGS. 4A to 4C) with respect to the second housing (e.g., another housing 420a, 420b, or 430b of FIGS. 4A to 4C), or the angle of rotation on the one plane of the wireless power receiving device (e.g., the wireless power receiving device 103 of FIG. 1), other than the angle among the plurality of attributes, and provide first content for changing the identified one.

According to various embodiments, there may be provided a wireless power receiving device (e.g., the wireless power receiving device 103 of FIG. 1) comprising a first housing (e.g., one housing 420c of FIG. 4D), a second housing (e.g., another housing 410c of FIG. 4D) coupled to the first housing (e.g., one housing 420c of FIG. 4D) to be changed in relative position with respect to the first housing (e.g., one housing 420c of FIG. 4D), a first resonance circuit (e.g., the resonance circuit 510a of FIG. 5A) disposed in the first housing (e.g., one housing 420c of FIG. 4D), and at least one processor (e.g., the processor 530 of FIG. 5A). The at least one processor (e.g., the processor 530 of FIG. 5A) may be configured to control the wireless power receiving device (e.g., the wireless power receiving device 103 of FIG. 1) to wirelessly receive power from a wireless power transmitting device (e.g., the wireless power transmitting device 101 of FIG. 1) through the first resonance circuit (e.g., the resonance circuit 510a of FIG. 5A), identify a charging efficiency corresponding to the received wireless power, and in case the identified charging efficiency is less than a threshold, provide content for moving the second housing (e.g., another housing 410c of FIG. 4D). The second housing (e.g., another housing 410c of FIG. 4D) is moved on the first housing (e.g., one housing 420c of FIG. 4D).

According to various embodiments, there may be provided a wireless power receiving device (e.g., the wireless power receiving device 103 of FIG. 1) comprising a first housing (e.g., one housing 410a, 410b, or 410c of FIGS. 4A to 4D), a second housing (e.g., another housing 420a, 420b, 430b, or 420c of FIGS. 4A to 4D) coupled to the first housing (e.g., one housing 410a, 410b, or 410c of FIGS. 4A to 4D) to be changed in relative position with respect to the first housing (e.g., one housing 410a, 410b, or 410c of FIGS. 4A to 4D), a first resonance circuit (e.g., the resonance circuit 510a of FIG. 5A) disposed in the first housing (e.g., one housing 410a, 410b, or 410c of FIGS. 4A to 4D), and at least one processor (e.g., the processor 530 of FIG. 5A). The at least one processor (e.g., the processor 530 of FIG. 5A) may be configured to control the wireless power receiving device (e.g., the wireless power receiving device 103 of FIG. 1) to wirelessly receive power from a wireless power transmitting device (e.g., the wireless power transmitting device 101 of FIG. 1) through the first resonance circuit (e.g., the resonance circuit 510a of FIG. 5A), identify a charging efficiency corresponding to the received wireless power, and in case the identified charging efficiency is less than a threshold, provide content for changing an angle of rotation in one direction of the wireless power receiving device (e.g., the wireless power receiving device 103 of FIG. 1).

According to various embodiments, there may be provided a wireless power transmitting device (e.g., the wireless power transmitting device 101 of FIG. 1) comprising a communication circuit, at least one resonance circuit, and at least one processor (e.g., the processor 530 of FIG. 5A). The at least one processor (e.g., the processor 530 of FIG. 5A) may be configured to detect a wireless power receiving device (e.g., the wireless power receiving device 103 of FIG. 1) based on periodically applying first power to the at least one resonance circuit, receive information about a type of the wireless power receiving device (e.g., the wireless power receiving device 103 of FIG. 1) from the wireless power receiving device (e.g., the wireless power receiving device 103 of FIG. 1) through the communication circuit based on detecting the wireless power receiving device (e.g., the wireless power receiving device 103 of FIG. 1), identify that the type of the wireless power receiving device (e.g., the wireless power receiving device 103 of FIG. 1) is at least one of a foldable electronic device or a rollable electronic device based on the received information, and transmit, to the wireless power receiving device (e.g., the wireless power receiving device 103 of FIG. 1), a charging function control signal including information triggering to allow the wireless power receiving device (e.g., the wireless power receiving device 103 of FIG. 1) to provide content associated with charging efficiency through the communication circuit based on the identification.

According to various embodiments, there may be provided the wireless power transmitting device (e.g., the wireless power transmitting device 101 of FIG. 1), wherein the at least one processor (e.g., the processor 530 of FIG. 5A) is configured to apply second power to the at least one resonance circuit (the resonance circuit 510a of FIG. 5A) to wirelessly transmit power to the wireless power receiving device (e.g., the wireless power receiving device 103 of FIG. 1), receive a signal including information associated with the second power from the wireless power receiving device (e.g., the wireless power receiving device 103 of FIG. 1) through the communication circuit based on applying the second power, when the signal includes information indicating that provision of the content is performed, and perform at least one operation associated with applying the second power.

What is claimed is:

1. A wireless power receiving device comprising:
a first housing;
a second housing coupled to the first housing to be changed in relative position with respect to the first housing;
a first resonance circuit disposed in the first housing;
memory storing instructions; and
at least one processor, wherein the instructions, when executed by the at least one processor, cause the wireless power receiving device to:
wirelessly receive power from a wireless power transmitting device through the first resonance circuit,
identify a charging efficiency corresponding to the wirelessly received power,
in case the identified charging efficiency is less than a threshold, identify an angle between the first housing and the second housing, as an attribute to be changed among a plurality of attributes associated with the charging efficiency, and
provide content for changing the identified angle between the first housing and the second housing.

2. The wireless power receiving device of claim 1, further comprising:
a second resonance circuit disposed in the second housing,
wherein the at least one processor is further configured to:
control the wireless power receiving device to wirelessly receive power from the wireless power transmitting device through the first resonance circuit and the second resonance circuit.

3. The wireless power receiving device of claim 1, wherein the instructions, when executed by the at least one processor, cause the wireless power receiving device to:
as at least part of providing the content for changing the identified angle between the first housing and the second housing, transmit information about the content to the wireless power transmitting device.

4. The wireless power receiving device of claim 1, wherein the plurality of attributes include at least one of a distance from the wireless power receiving device to the wireless power transmitting device, a direction of the wireless power receiving device with respect to the wireless power transmitting device, the angle between the second housing and the first housing, a moving distance of the first housing on the second housing, a form of the wireless power receiving device associated with the relative position of the first housing with respect to the second housing, or an angle of rotation, clockwise or counterclockwise on one plane, of the wireless power receiving device.

5. The wireless power receiving device of claim 1, wherein the instructions, when executed by the at least one processor, cause the wireless power receiving device to:
identify the attribute to be changed among the plurality of attributes based on priority of the plurality of attributes, wherein the priority is associated with the charging efficiency, and
identify the angle as the attribute to be changed, as at least part of identifying the attribute to be changed among the plurality of attributes.

6. The wireless power receiving device of claim 5, further comprising:
at least one sensor;
wherein the instructions, when executed by the at least one processor, cause the wireless power receiving device to:
identify a first value for the angle between the first housing and the second housing using the at least one sensor, and
identify the angle as the attribute to be changed based on a comparison between the first value and a second value of the angle pre-stored in the memory, as at least part of identifying the attribute to be changed among the plurality of attributes, wherein the second value is associated with a higher charging efficiency than the identified charging efficiency.

7. The wireless power receiving device of claim 1, further comprising:
at least one sensor,
wherein the instructions, when executed by the at least one processor, cause the wireless power receiving device to:
identify a first value for the angle between the first housing and the second housing using the at least one sensor, identify a second value for the angle stored in the memory, the second value being associated with a higher charging efficiency than the identified charging efficiency, and provide the content based on the first value and the second value.

8. The wireless power receiving device of claim 7, wherein the instructions, when executed by the at least one processor, cause the wireless power receiving device to:

store, in the memory, a plurality of data associated with the higher charging efficiency than the identified charging efficiency, wherein each of the plurality of data includes a value for the angle and a value for at least some of the plurality of attributes other than the angle, and identify the second value for the angle based on the plurality of data.

9. The wireless power receiving device of claim 8, wherein the instructions, when executed by the at least one processor, cause the wireless power receiving device to:

identify a third value for the at least some of the plurality of attributes other than the angle using the at least one sensor, and identify first data corresponding to the third value for the at least some of the plurality of data and identify the second value for the angle included in the first data, as at least part of identifying the second value for the angle based on the plurality of data.

10. The wireless power receiving device of claim 7, wherein the instructions, when executed by the at least one processor, cause the wireless power receiving device to:

store a plurality of artificial intelligence (AI) models in the memory, wherein each of the plurality of AI models is implemented to output a value for the attribute to be changed in response to receiving a value of at least some of the plurality of attributes other than the attribute to be changed, identify a third value for the at least some of the plurality of attributes other than the angle using the at least one sensor, and obtain the second value for the angle based on inputting the third value to the plurality of AI models.

11. The wireless power receiving device of claim 7, further comprising:

a display;

a speaker; and a vibrator, wherein the instructions, when executed by the at least one processor, cause the wireless power receiving device to:

provide the content using at least one of the display, the speaker, or the vibrator, wherein the content includes at least one piece of information for changing the first value for the angle to the second value.

12. The wireless power receiving device of claim 11, wherein the instructions, when executed by the at least one processor, cause the wireless power receiving device to:

as at least part of providing the content, display, on the display, a screen including a first image associated with the wireless power receiving device text for a first full charge time corresponding to the first value, a second image associated with the wireless power receiving device corresponding to the second value, and text for a second full charge time corresponding to the second value.

13. The wireless power receiving device of claim 1, wherein the instructions, when executed by the at least one processor, cause the wireless power receiving device to:

wirelessly receive first power from the wireless power transmitting device after providing the content, identify a first charging efficiency corresponding to the first power, in case the first charging efficiency is greater than or equal to the threshold, provide first content indicating that the first charging efficiency is greater than or equal to the threshold, and in case the first charging efficiency is less than the threshold, provide second content for changing an attribute, different from the angle, among the plurality of attributes.

14. The wireless power receiving device of claim 1, wherein the instructions, when executed by the at least one processor, cause the wireless power receiving device to:

wirelessly receive first power from the wireless power transmitting device after providing the content, identify a first charging efficiency corresponding to the first power and, in case the first charging efficiency is the threshold or more, provide first content indicating that the first charging efficiency is the threshold or more.

15. The wireless power receiving device of claim 1, further comprising:

a communication circuit;

wherein the instructions, when executed by the at least one processor, cause the wireless power receiving device to:

transmit information about a type of the wireless power receiving device to the wireless power transmitting device through the communication circuit, receive, through the communication circuit, a message including information indicating that providing the content from the wireless power receiving device is needed, based on transmitting the information about the type of the wireless power receiving device, and provide the content based on receiving the message.

16. The wireless power receiving device of claim 1, further comprising:

a communication circuit;

wherein the instructions, when executed by the at least one processor, cause the wireless power receiving device is further configured to:

wirelessly receive first power from the wireless power receiving device after providing the content, identify a first charging efficiency corresponding to the first power, and in case the identified first charging efficiency is greater than or equal to the threshold, transmit, to the wireless power transmitting device, information indicating that provision of the content for changing the angle is performed, along with information associated with the received first power.

17. The wireless power receiving device of claim 1, wherein the instructions, when executed by the at least one processor, cause the wireless power receiving device to:

identify, as the attribute to be changed, one of a distance from the wireless power receiving device to the wireless power transmitting device, a direction of the wireless power receiving device with respect to the wireless power transmitting device, a moving distance of the first housing on the second housing, a form of the wireless power receiving device associated with the relative position of the first housing with respect to the second housing, or an angle of rotation on one plane of the wireless power receiving device, other than the angle among the plurality of attributes, and provide first content for changing the identified one.

18. A wireless power receiving device comprising:

a first housing;

a second housing coupled to the first housing to be changed in relative position with respect to the first housing;

a first resonance circuit disposed in the first housing;

memory storing instructions; and at least one processor, wherein the instructions, when executed by the at least one processor, cause the wireless power receiving device to:

wirelessly receive power from a wireless power transmitting device through the first resonance circuit, identify a charging efficiency corresponding to the wirelessly received power, and in case the identified charging efficiency is less than a threshold, identify a moving distance of the first housing on the second housing, as an attribute to be changed among a plurality of attributes associated with the charging efficiency, and provide content for moving the second housing on the first housing based on the identified moving distance of the first housing on the second housing, as the attribute to be changed.

19. A wireless power receiving device, comprising:

a first housing;

a second housing coupled to the first housing to be changed in relative position with respect to the first housing;

a first resonance circuit disposed in the first housing;

a rectifier configured to rectify power received from the first resonance circuit;

memory storing instructions; and at least one processor, wherein the instructions, when executed by the at least one processor, cause the wireless power receiving device to:

wirelessly receive power from a wireless power transmitting device through the first resonance circuit, identify a charging efficiency corresponding to the wirelessly received power, in case the identified charging efficiency is less than a threshold, identify an angle of rotation in a direction of the wireless power receiving device, as an attribute to be changed among a plurality of attributes associated with the charging efficiency, and provide content for changing the identified angle of rotation in the direction of the wireless power receiving device.

* * * * *